United States Patent

Aoyagi et al.

(10) Patent No.: US 7,468,803 B2
(45) Date of Patent: Dec. 23, 2008

(54) IMAGE PROCESSING APPARATUS AND IMAGE PROCESSING METHOD

(75) Inventors: Takeshi Aoyagi, Tokyo (JP); Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1076 days.

(21) Appl. No.: 10/369,729

(22) Filed: Feb. 21, 2003

(65) Prior Publication Data

US 2003/0164975 A1 Sep. 4, 2003

(30) Foreign Application Priority Data

Feb. 21, 2002 (JP) ............................. 2002-045073

(51) Int. Cl.
*G06F 11/07* (2006.01)
*H04N 1/21* (2006.01)
*H04N 1/32* (2006.01)
*H04N 1/41* (2006.01)
*H04N 1/415* (2006.01)

(52) U.S. Cl. ............... 358/1.15; 358/404; 358/1.17; 358/426.01; 358/426.12; 358/426.14

(58) Field of Classification Search ............... None
See application file for complete search history.

(56) References Cited

U.S. PATENT DOCUMENTS

| 5,513,279 | A | 4/1996 | Yoshinari |
| 6,108,459 | A | 8/2000 | Tsuji et al. ................... 382/300 |
| 6,999,626 | B2 * | 2/2006 | Andrew ....................... 382/235 |
| 7,227,998 | B2 * | 6/2007 | Nakayama et al. ........... 382/232 |
| 2003/0002743 | A1 | 1/2003 | Ohta et al. ................... 382/239 |
| 2003/0043905 | A1 | 3/2003 | Nakayama et al. ..... 375/240.04 |
| 2003/0086127 | A1 | 5/2003 | Ito et al. ....................... 358/462 |
| 2003/0086597 | A1 | 5/2003 | Ohta et al. ................... 382/131 |
| 2003/0118240 | A1 | 6/2003 | Satoh et al. .................. 382/239 |
| 2005/0071371 | A1 * | 3/2005 | Woodhouse ............. 707/104.1 |
| 2005/0105125 | A1 * | 5/2005 | Park et al. ................... 358/1.15 |

FOREIGN PATENT DOCUMENTS

| JP | 10051776 | | 2/1998 |
| JP | 2001-045301 | | 2/2001 |
| JP | 2001188661 A | * | 7/2001 |
| JP | 2001332976 | | 11/2001 |
| JP | 2003078770 | | 3/2003 |

* cited by examiner

*Primary Examiner*—Edward L Coles
*Assistant Examiner*—Myles D Robinson
(74) *Attorney, Agent, or Firm*—Fitzpatrick, Cella, Harper & Scinto

(57) ABSTRACT

Provided are an image processing apparatus and image processing method capable of processing image data as packet data, and compressing the image data in real time to a data amount within the storage capacity of a memory. Image data in the form of packet data is divided into a plurality of blocks by a block forming circuit (102), and compressed at a first compression ratio by a DCT circuit (104), quantizing circuit (105), and Huffman encoding circuit (106) for each block. A counter (108) measures the data amount of the compressed image data. If the measured data amount is equal to or larger than a predetermined value, the image data stored in a memory (112) is recompressed at a second compression ratio as a higher compression ratio by a Huffman decoding circuit (113), bit shifting circuit (114), and Huffman encoding circuit (115).

21 Claims, 43 Drawing Sheets

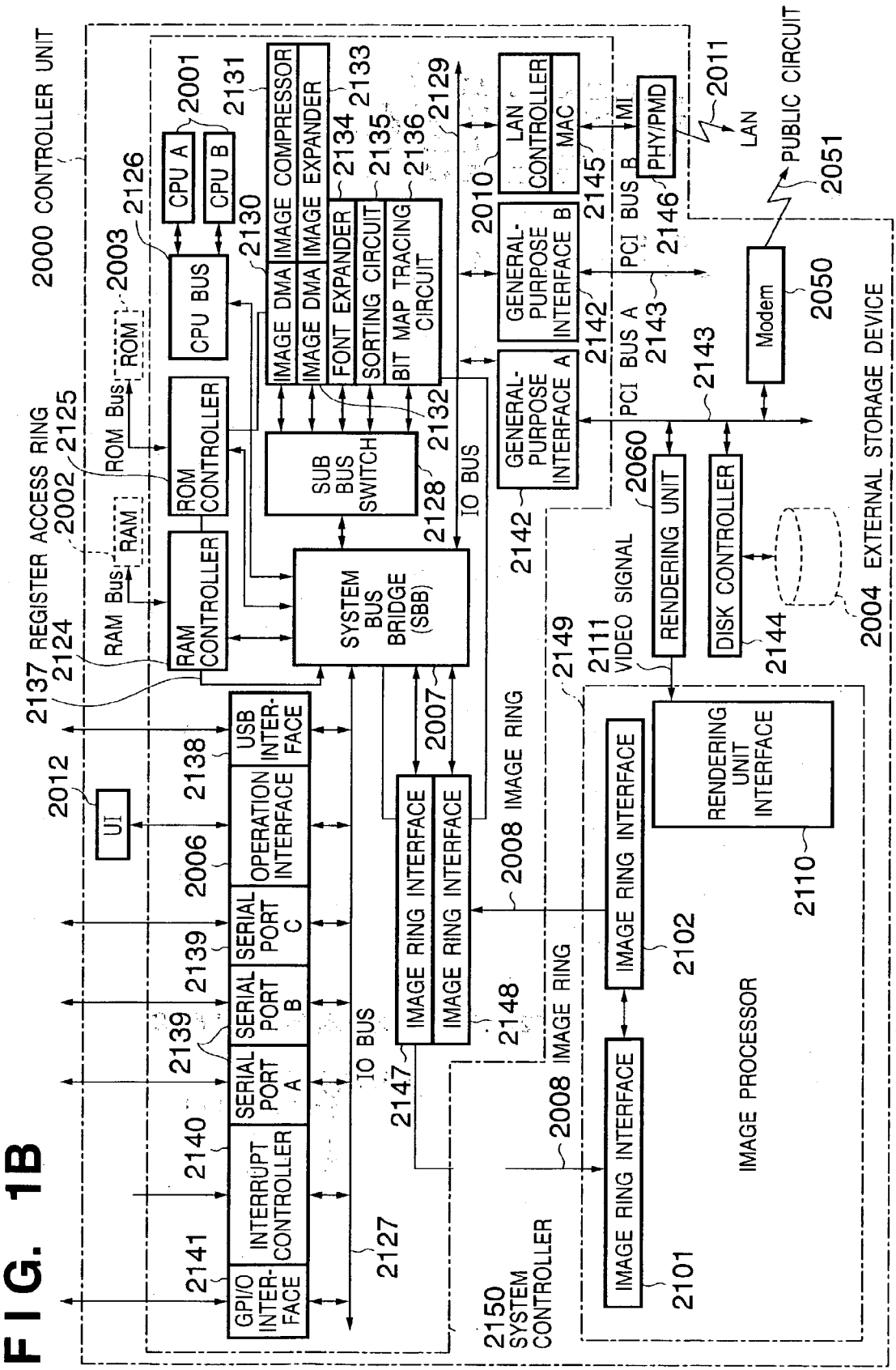

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 8

| AC COEFFICIENTS | | SSSS |
|---|---|---|
| −1, | 1 | 1 |
| −3, −2 | 2, 3 | 2 |
| −7, ⋯−4 | 4, ⋯7 | 3 |
| −15, ⋯−8 | 8, ⋯15 | 4 |
| −31, ⋯−16 | 16, ⋯31 | 5 |
| −63, ⋯−32 | 32, ⋯63 | 6 |
| −127, ⋯−64 | 64, ⋯127 | 7 |
| −255, ⋯−128 | 128, ⋯255 | 8 |
| −511, ⋯−256 | 256, ⋯511 | 9 |
| −1023, ⋯−512 | 512, ⋯1023 | 10 |
| −2047, ⋯−1024 | 1024, ⋯2047 | 11 |
| −4095, ⋯−2048 | 2048, ⋯4095 | 12 |
| −8191, ⋯−4096 | 4096, ⋯8191 | 13 |
| −16383, ⋯−8192 | 8192, ⋯16383 | 14 |
| −32767, ⋯−16384 | 16384, ⋯32767 | 15 |

| | 0 | 1 | 2 | 3 | ... | 14 | 15 |
|---|---|---|---|---|---|---|---|
| 0 | EOB | | | | SSSS | | |
| 1 | | NOT USED | | | | | CODES FOR COMBINATIONS OF NNNN AND SSSS |
| ⋮ | | | | | | | |
| 14 | | | | | | | |
| 15 | R16 | | | | | | |

NNNN
0 RUN IN ZIGZAG OPERATION

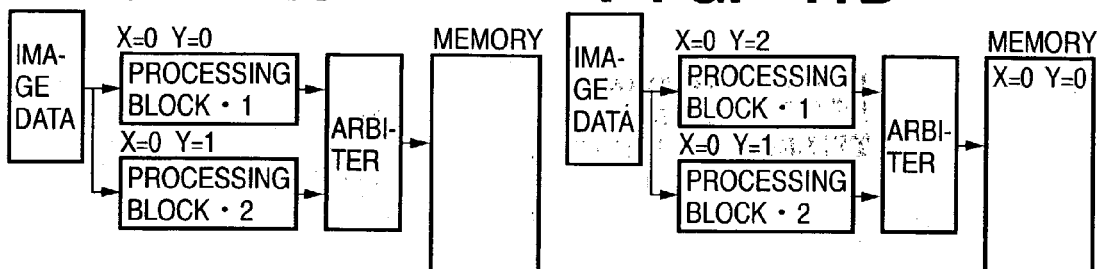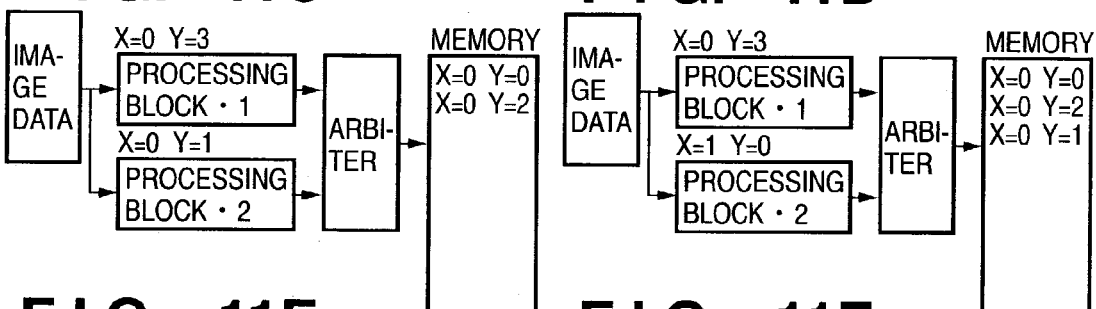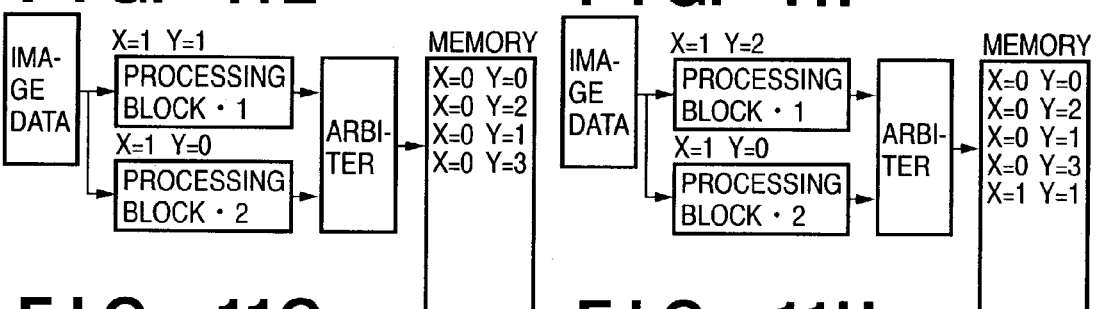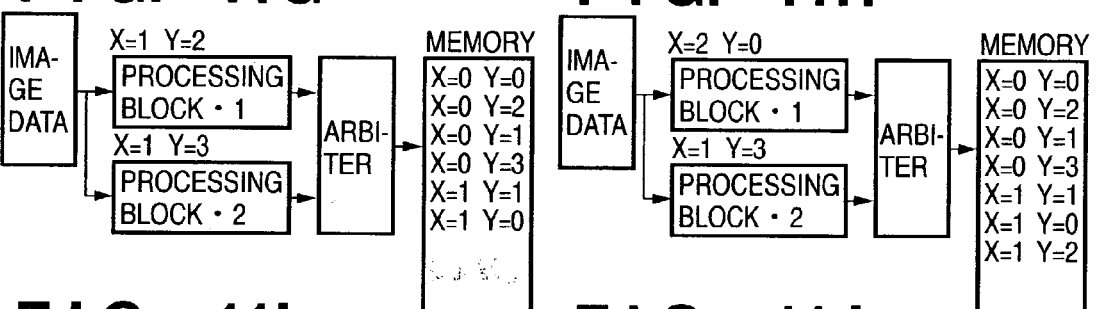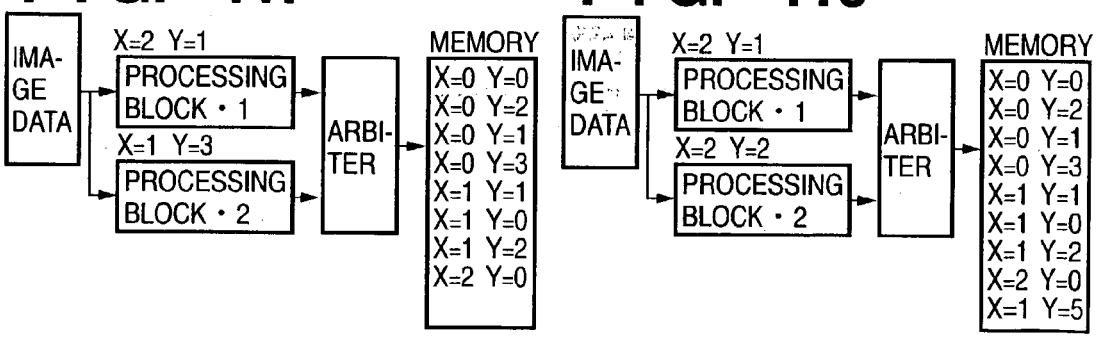

IMAGE PROCESSING APPARATUS AND IMAGE PROCESSING METHOD

FIELD OF THE INVENTION

The present invention relates to an image processing apparatus and image processing method of suitably compressing image data and storing the data in a memory having a limited capacity.

BACKGROUND OF THE INVENTION

In a general image processing system including a scanner and printer, image data read from the scanner is transmitted across a local area network (LAN) or the Internet, and image data received from the LAN or Internet is printed by using the printer. Also, image data read from the scanner is transmitted by using a facsimile apparatus (FAX), and image data received via a modem is printed by using the printer. In this way, various image data transfer processes using networks and the like are performed in recent years.

Likewise, in the image processing system described above, data conversion is performed for various image formats such as a page description language (PDL), input image data from the scanner, output image data from the printer, FAX image data, and image data to be stored in an image database server, and data transfer is performed to input and output these image data.

When the processing performance of the image processing system which frequently transfers image data as described above is taken into consideration, constantly processing a large amount of image data is a large disadvantage. This is so because image data input from the scanner recently has a very large data amount, since the number of colors is increased to express color images, the number of bits is increased to represent tone, and the resolution is also increased as the image quality is improved.

To process input image data from the scanner in the image processing system, therefore, the general approach is to reduce the data amount of the image data by data compression, temporarily store the compressed data in a memory, and further process the stored data in the image processing system. Of various data compression methods, a JPEG compression process is standardized as a data compression technique which matches the characteristic features of scanner image data. Presently, this JPEG compression process is generally used as an optimal compression method for grayscale images.

To copy input image data from a scanner or transfer the data to a certain destination across a LAN or the like, the input image is generally once stored in a memory or the like. This is so because when image data is to be copied a plurality of number of times or transferred to a plurality of destinations, it is possible to save the user the trouble of scanning the image data a plurality of number of times corresponding to the copy quantity or the number of transfer destinations. When stored in the memory, the image data is compressed by the JPEG compression process.

Accordingly, the storage capacity of the memory for storing compressed image data must be determined on the assumption that image data compressed to some extent is input. When image processing is to be performed for compressed image data, or when image data is to be printed from a printing apparatus, the image processing or printing is executed after the compressed image data is expanded.

In a compression coding method using the JPEG compression process, however, the compression ratio changes in accordance with the contents of original image data. Therefore, compression coding is not always performed at a predicted compression ratio. Accordingly, if image data is coded by compression at a compression ratio lower than a predicted compression ratio and this compressed image data is stored in a memory, the storage capacity of the memory is exceeded, so the compressed image data cannot be entirely stored.

In this case, it is necessary to recompress the image data by changing the predicted compression ratio to obtain compressed image data within the storage capacity of the memory. The predicted compression ratio is changed and the image data compression process is repeated by resetting and scanning the original a number of times, until the data amount of the image data to be stored falls within the storage capacity of the memory. This is a very cumbersome operation for the user of the image processing system.

In general, therefore, a plurality of Q tables each having a predicted compression ratio are used to perform image data compression coding by the following method, and the compressed image data is stored in a memory. For example, compression is first performed using a Q table having a predicted compression ratio of 1/2. If the compression-coded image data exceeds the storage capacity of the memory, the image data is recompressed by using a Q table having a predicted compression ratio of 1/4. If the compression-coded image data exceeds the storage capacity of the memory again, the image data is compressed by using a Q table having a predicted compression ratio of 1/8. In this manner, compression coding is performed by using a plurality of Q tables having different predicted compression ratios, until the compression-coded image data becomes equal to or smaller than the storage capacity of the memory.

Unfortunately, the following problems arise when compression is performed a plurality of number of times by using the image data compression method as described above. First, when compression is to be performed by changing the predicted compression ratio, image data must be re-scanned by a scanner. This repetitive scanning operation prolongs the time required to process the job. For example, when image data is to be scanned page by page, repetitive scanning may not be a very cumbersome operation. However, when a large amount of originals are to be continuously scanned by using an automatic sheet feeder or the like, the user must reset these originals, and this requires much labor of the user.

Second, it is sometimes necessary to prepare a plurality of Q tables in order to quantize image data. This increases the memory capacity for storing these Q tables. Also, the same Q tables as used in encoding must be used to decode image data, so a plurality of Q tables are required in the location of decoding. This also increases the memory capacity for storing the Q tables. Furthermore, compressing image data more than necessary lowers the image quality of the image data.

SUMMARY OF THE INVENTION

The present invention has been made in consideration of the above situation, and has as its object to provide an image processing apparatus and image processing method capable of compressing image data in real time into a data amount within the storage capacity of a memory, by processing the image data as packet data.

To achieve the above object, an image processing apparatus according to the present invention is characterized by comprising input means for inputting image data in the form of packet data, dividing means for dividing the input image data into predetermined blocks, compressing means for compressing the image data at a first compression ratio for each divided block, measuring means for measuring the data amount of the compressed data, first header information updating means for updating header information of the image data, storage means for storing the image data, output means for outputting the image data having the updated header information if the data amount of the image data is equal to or smaller than a predetermined value, recompressing means for recompressing the image data stored in the storage means at a second compression ratio higher than the first compression ratio if the data amount of the image data is equal to or larger than the predetermined value, and second header information updating means for updating header information of the recompressed image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A to 1C are block diagrams showing the whole configuration of an image processing apparatus according to an embodiment of the present invention;

FIG. 8 is a view for explaining Huffman coding in JPEG;

FIGS. 11A to 11J are views for simply explaining a method of storing packet data in a memory in an image processing apparatus of the first embodiment;

DETAILED DESCRIPTION OF THE PREFERRED EMBODIMENTS

Preferred embodiments of the present invention will now be described in detail in accordance with the accompanying drawings.

First Embodiment

Figure 1A:
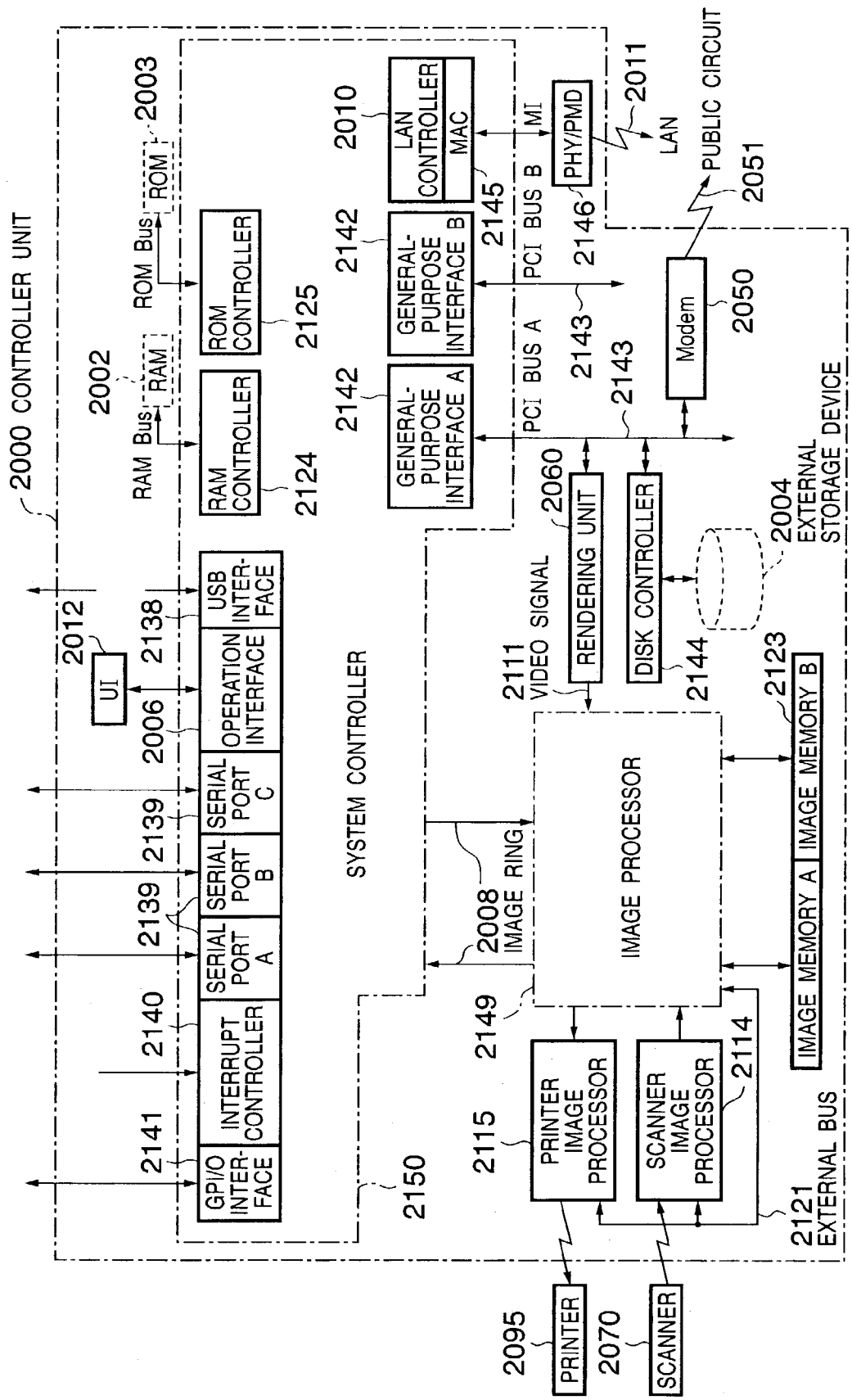
Figure 1C:
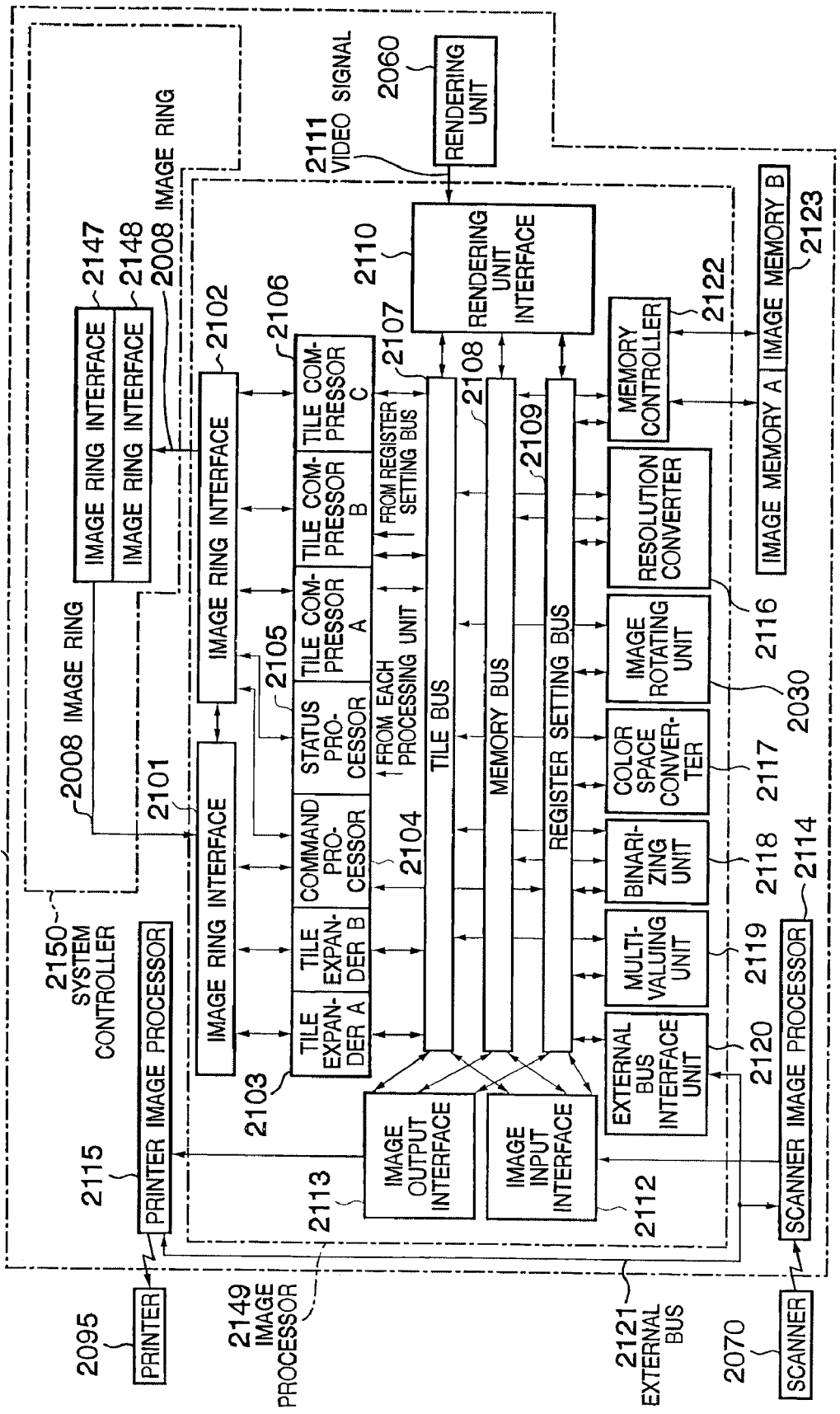

FIGS. 1A to 1C are block diagrams showing the whole configuration of an image processing apparatus according to an embodiment of the present invention. Referring to FIGS. 1A to 1C, a controller unit 2000 is connected to a scanner 2070 as an image input device and a printer 2095 as an image output device. This controller unit 2000 is connected to a LAN 2011 and public telephone line (WAN) 2051 and performs, e.g., inputting and outputting of image information and device information, and image rasterization of PDL data.

In this controller unit 2000, CPUs 2001 are processors which control the whole image processing apparatus. In this embodiment, two CPUs (CPUA and CPUB) are used as the CPUs 2001. These two CPUs 2001 are connected to a common CPU bus (CPUBUS) 2126 which is connected to a system bus bridge (SBB) 2007.

This system bus bridge 2007 is a bus switch and connected to the CPU bus 2126, a RAM controller 2124, a ROM controller 2125, I/O buses 2127 and 2129, a sub bus switch 2128, and image ring interfaces 2147 and 2148.

The sub bus switch 2128 is a second bus switch and connected to image DMAs 2130 and 2132, a font expander 2134, a sorting circuit 2135, and bit map tracing circuit 2136. This sub bus switch 2128 mediates output memory access requests from these DMAs, and connects them to the system bus bridge 2007.

A RAM 2002 is a system work memory for the CPUs 2001 to operate, and is also an image memory for temporarily storing image data. This RAM 2002 is controlled by the RAM controller 2124. In this embodiment, a direct RDRAM is used.

A ROM 2003 is a boot ROM storing a boot program of this image processing apparatus. This ROM 2003 is controlled by the ROM controller 2125.

The image DMA 2130 is connected to an image compressor 2131. On the basis of information set via a register access ring 2137, this image DMA 2130 controls the image compressor 2131 to read out uncompressed data on the RAM 2002, compress the readout data, and write the compressed data back in the memory. In this embodiment, JPEG is used as a compression algorithm.

The image DMA 2132 is connected to an image expander 2133. On the basis of information set via the register access ring 2137, this image DMA 2132 controls the image expander 2133 to read out compressed data on the RAM 2002, expand the readout data, and write the expanded data back in the memory. In this embodiment, JPEG is used as an expansion algorithm.

The font expander 2134 expands compressed font data stored in the ROM 2003 or RAM 2002, on the basis of a font code contained in PDL data externally transferred via a LAN controller 2010. In this embodiment, an FBE algorithm is used.

The sorting circuit 2135 rearranges objects in a display list generated when PDL data is to be rasterized. The bit map tracing circuit 2136 extracts edge information from bit map data.

The I/O bus 2127 is a kind of an internal I/O bus and connected to a controller of a USB bus as a standard bus, a USB interface 2138, general-purpose serial ports 2139 (general-purpose serial ports A, B, and C), an interrupt controller 2140, and a GPI/O interface 2141. This I/O bus 2127 includes a bus arbiter (not shown).

An operation unit interface 2006 is an interface with an operation unit (UI) 2012, and outputs image data to be displayed on the operation unit 2012 to the operation unit 2012. Also, this operation unit interface 2006 transfers, to the CPUs 2001, information input from the operation unit 2012 by the user of this image processing apparatus.

The I/O bus 2129 is a kind of an internal I/O bus, and connected to general-purpose bus interfaces 2142 (general-purpose bus interfaces A and B) and the LAN controller 2010. This I/O bus 2129 includes a bus arbiter (not shown). The general-purpose bus interfaces 2142 form a bus bridge which is made up of the two identical bus interfaces A and B and supports a standard I/O bus. In this embodiment, a PCI bus 2143 is used.

An external storage device 2004 stores system software, image data, and the like. In this embodiment, this external storage device 2004 is a hard disk drive and connected to one PCI bus 2143 (PCI bus A) via a disk controller 2144. The LAN controller 2010 is connected to the LAN 2011 via an MAC circuit 2145 and PHY/PMD circuit 2146, and exchanges information. A modem 2050 is connected to the public telephone line 2051, and exchanges information.

The image ring interfaces 2147 and 2148 are connected to the system bus bridge 2007 and image rings 2008 which transfer image data at high speed. These image ring interfaces 2147 and 2148 are DMA controllers which transfer data which is compressed after being divided into tiles between the RAM 2002 and a tile image processor 2149.

The image rings 2008 are a pair of unidirectional connecting paths. These image rings 2008 are connected to tile expanders 2103, a command processor 2104, a status processor 2105, and tile compressors 2106 via image ring interfaces 2101 and 2102 in the image processor 2149. Note that this embodiment uses two tile expanders 2103 (tile expanders A and B) and three tile compressors 2106 (tile compressors A, B, and C).

The tile expanders 2103 are connected to the image ring interface 2101 and also connected to a tile bus 2107. These tile expanders 2103 form a bus bridge which expand compressed image data input from the image ring 2008 and transfers the expanded data to the tile bus 2107. In this embodiment, JPEG processing is used as the image data compression/expansion algorithm.

The tile compressors 2106 are connected to the image ring interface 2102 and also connected to the tile bus 2107. These tile compressors 2106 form a bus bridge which compresses uncompressed image data input from the tile bus 2107 and transfers the compressed data to the image ring 2008. In this embodiment, JPEG processing is used as the image data compression/expansion algorithm. The tile compressors 2106 are connected to a register setting bus 2109, and receive various kinds of settings about processing executed in the tile compressors 2106, from a command processor 2104 via the register setting bus 2109.

Figure 2:
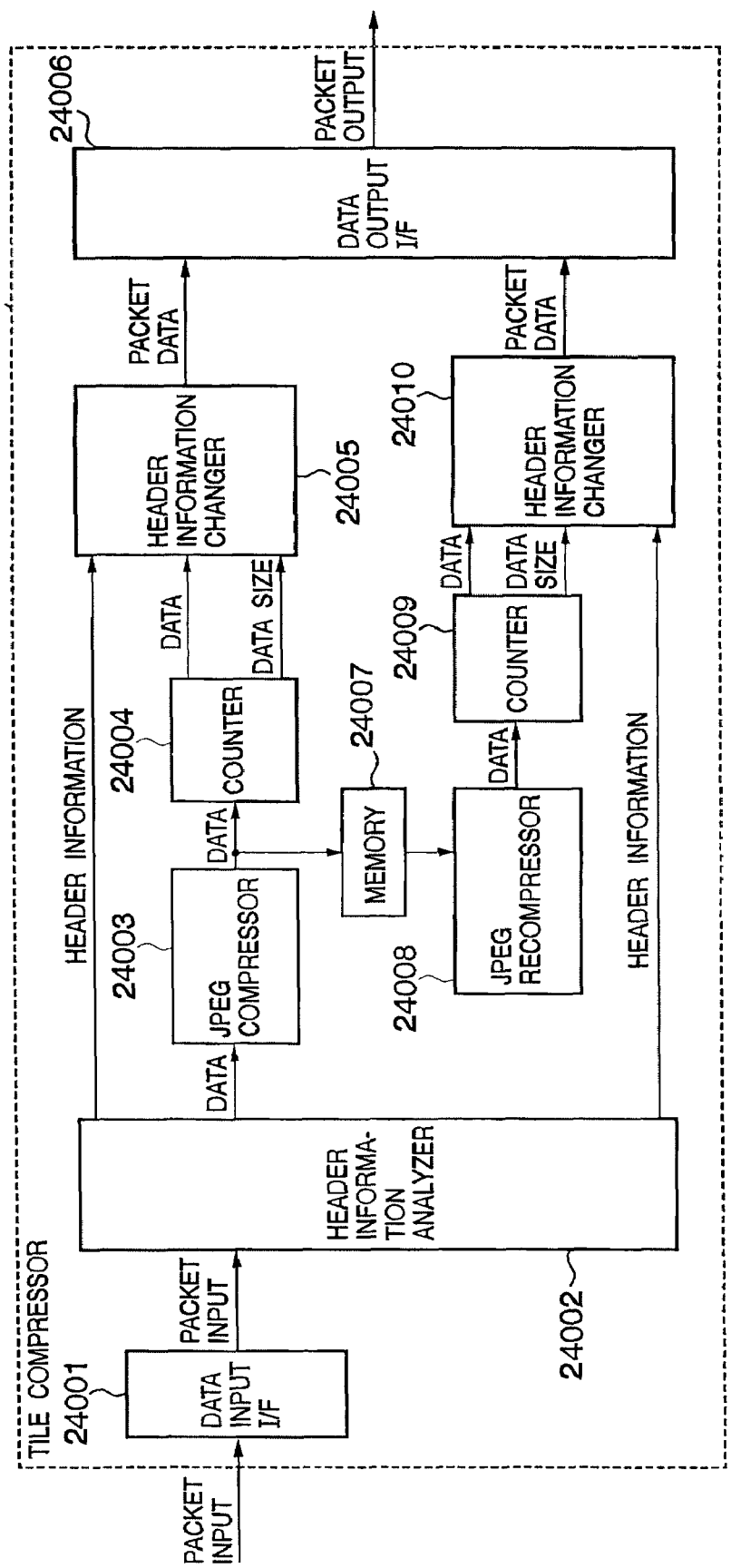
FIG. 2 is a block diagram for explaining the internal arrangement of a tile compressor 2106 of the image processing apparatus according to the embodiment.

The internal arrangement of the tile compressor 2106 will be explained below. FIG. 2 is a block diagram for explaining the internal arrangement of the tile compressor 2106 of the image processing apparatus according to this embodiment. Referring to FIG. 2, a data input interface (I/F) 24001 inputs packeted image data (to be refeffed to as "data" hereinafter) from the tile bus 2107.

A header information analyzer 24002 is connected to the data input I/F 24001. This header information analyzer 24002 reads out information of a header portion of packet data, and outputs the readout information as header information to header information changers 24005 and 24010. Information of a data portion is input to a JPEG compressor 24003 where the information is compression-coded. Details of this compression coding by JPEG will be explained later.

The compression-coded data is output to a counter 24004 and input to a memory 24007. The counter 24004 calculates the data amount of the compressed data, and outputs the information as a data size together with the data to the header information changer 24005.

The header information changer 24005 changes the data size information in the header portion of the packet data to a compressed size, and rewrites a compress flag to display the compressed data. This header information having the changed contents is input to a data output interface (I/F) 24006, and output as packet data to the image ring interface 2102.

The memory 24007 stores data compressed by the JPEG compressor 24003. If the compressed data size counted by the counter 24004 is larger than a preset predicted compression value, the header information changer 24005 discards the data. The compressed data stored in the memory 24007 is supplied to a JPEG recompressor 24008 recompressed by a higher compression ratio, and output to a counter 24009.

This counter 24009 counts the data amount of the compressed data, and outputs the information as a data size together with the data to the header information changer 24010. The header information changer 24010 changes the data size information in the header portion of the packet data to a recompressed size, and rewrites information such as a compress flag to display the compressed data. The header information having the changed contents is input to the data output, interface 24006 and output as packet data to the image ring interface 2102.

Referring to FIG. 1, the command processor 2104 is connected to the image ring interfaces 2101 and 2102, and also connected to a register setting bus 2109. This command processor 2104 writes a register set request, which is issued by the CPUs 2001 and input via the image ring 2008, into a corresponding block connected to the register setting bus 2109. Also, on the basis of a register read request issued by the CPUs 2001, the command processor 2104 reads out information from a corresponding register via the register setting bus 2109, and transfers the readout information to the image ring interface 2102.

The status processor 2105 monitors information of each image processor, generates an interrupt packet for issuing interrupt to the CPUs 2001, and outputs the packet to the image ring interface 2102.

In addition to the above blocks, the tile bus 2107 is connected to the following functional blocks: a rendering unit interface 2110, image input interface 2112, image output interface 2113, multi-valuing unit 2119, binarizing unit 2118, color space converter 2117, image rotating unit 2030, and resolution converter 2116.

The rendering unit interface 2110 inputs a bit map image generated by a rendering unit 2060 (to be described later). The rendering unit 2060 and rendering unit interface 2110 are connected by a general video signal 2111. This rendering unit interface 2110 is also connected to the memory bus 2108 and register setting bus 2109, in addition to the tile bus 2107. The rendering unit interface 2110 converts the structure of an input raster image into that of a tile image by a predetermined method set via the register setting bus 2109, and at the same time synchronizes clocks. The rendering unit interface 2110 outputs the image to the tile bus 2107.

The image input interface 2112 receives raster image data subjected to correction image processing by a scanner image processor 2114 (to be described later), performs structure conversion into a tile image and clock synchronization by a predetermined method set via the register setting bus 2109, and outputs the image to the tile bus 2107.

The image output interface 2113 receives tile image data from the tile bus 2107, converts the structure into a raster image, changes the clock rate, and outputs the raster image to a printer image processor 2115.

The image rotating unit 2030 rotates image data. The resolution converter 2116 changes the resolution of image data. The color space converter 2117 performs color space conversion for color images and grayscale images. The binarizing unit 2118 binarizes multilevel (color or grayscale) images. The multi-valuing unit 2119 converts a binary image into multilevel data.

An external bus interface unit 2120 is a bus bridge for converting and outputting write and read requests issued by the CPUs 2001 to an external bus 2121 via the image ring interfaces 2101, 2102, 2147, and 2148, command processor 2104, and register setting bus 2109. In this embodiment, the external bus 2121 is connected to the printer image processor 2115 and scanner image processor 2114.

A memory controller 2122 is connected to the memory bus 2108. In accordance with a request from each image processor, the memory controller 2122 performs image data write, image data read, or, if necessary, refresh, for image memories 2123 including image memories A and B. In this embodiment, SDRAMs are used as the image memories 2123.

The scanner image processor 2114 performs correcting image processing for image data scanned by the scanner 2070 as an image input device. The printer image processor 2115 performs correction image processing for printer output, and outputs the result to the printer 2095.

Figure 3:
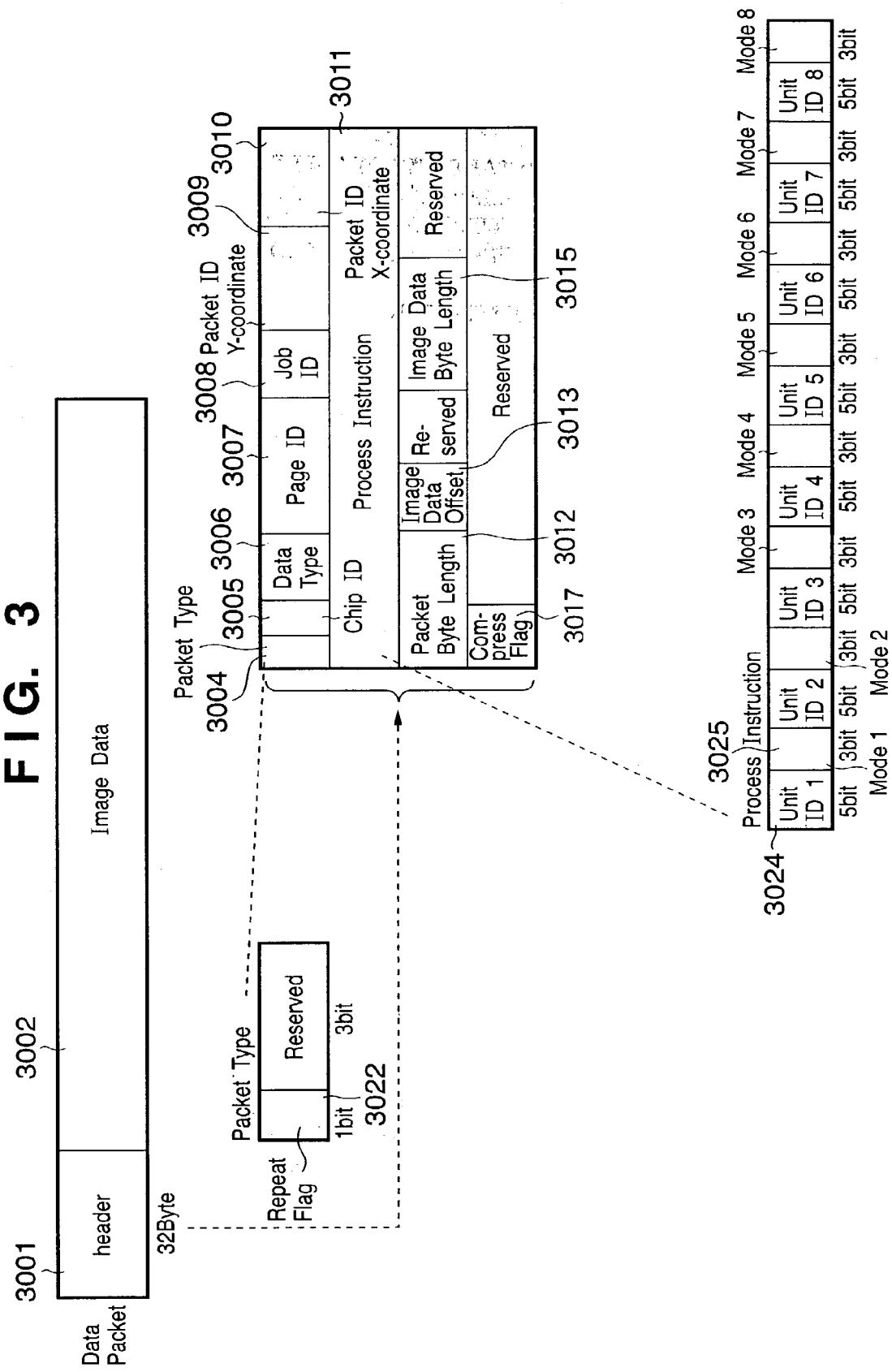
FIG. 3 is a schematic view for explaining the structure of packeted image data in the embodiment.

The rendering unit 2060 rasterizes a PDL code or intermediate display list into a bit map image. In the controller unit 2000 according to this embodiment, image data is transferred in a packeted form such as a data packet shown in FIG. 3. FIG. 3 is a schematic view for explaining the structure of packeted image data according to this embodiment. In this embodiment, image data is processed as it is divided into image data 3002 as tiles each having a size of 8 pixels×8 pixels. A data packet is formed by adding necessary header information (header) 3001 to this image data 3002.

Information contained in the header information 3001 will be described below. The type of packet is discriminated by packet type 3004 in the header information 3001. This packet type 3004 contains repeat flag 3022. If the image data 3002 of a data packet is the same as the image data of a data packet transmitted immediately before that, the repeat flag 3022 is set. Chip ID 3005 indicates the ID of a chip as a target to which the packet is to be transmitted. Data type 3006 indicates the type of data. Page ID 3007 indicates a page. Job ID 3008 is an ID for management by software.

A tile number is represented by $Y_n, X_n$ by combining a Y-direction tile coordinate (packet ID Y-coordinate) 3009 and X-direction tile coordinate (packet ID X-coordinate) 3010. Image data of a data packet can be either compressed or uncompressed. In this embodiment, a JPEG compression process is used as a compression algorithm. Compress flag 3017 indicates whether image data is compressed or uncompressed.

Process instruction 3011 is set in process order from the left-hand side. Each process unit shifts the process instruction to the left by eight bits after processing. This process instruction 3011 stores eight pairs of unit IDs 3024 and modes 3025.

Each unit ID 3024 designates a corresponding processing unit, and each mode 3025 designates the operation mode of a corresponding processing unit. Accordingly, one packet can be continuously processed by eight units.

A packet byte length 3012 indicates the total number of bytes of a packet. An image data byte length 3015 indicates the number of bytes of image data. An image data offset 3013 indicates offset from the start of a packet of each data.

Figure 4:
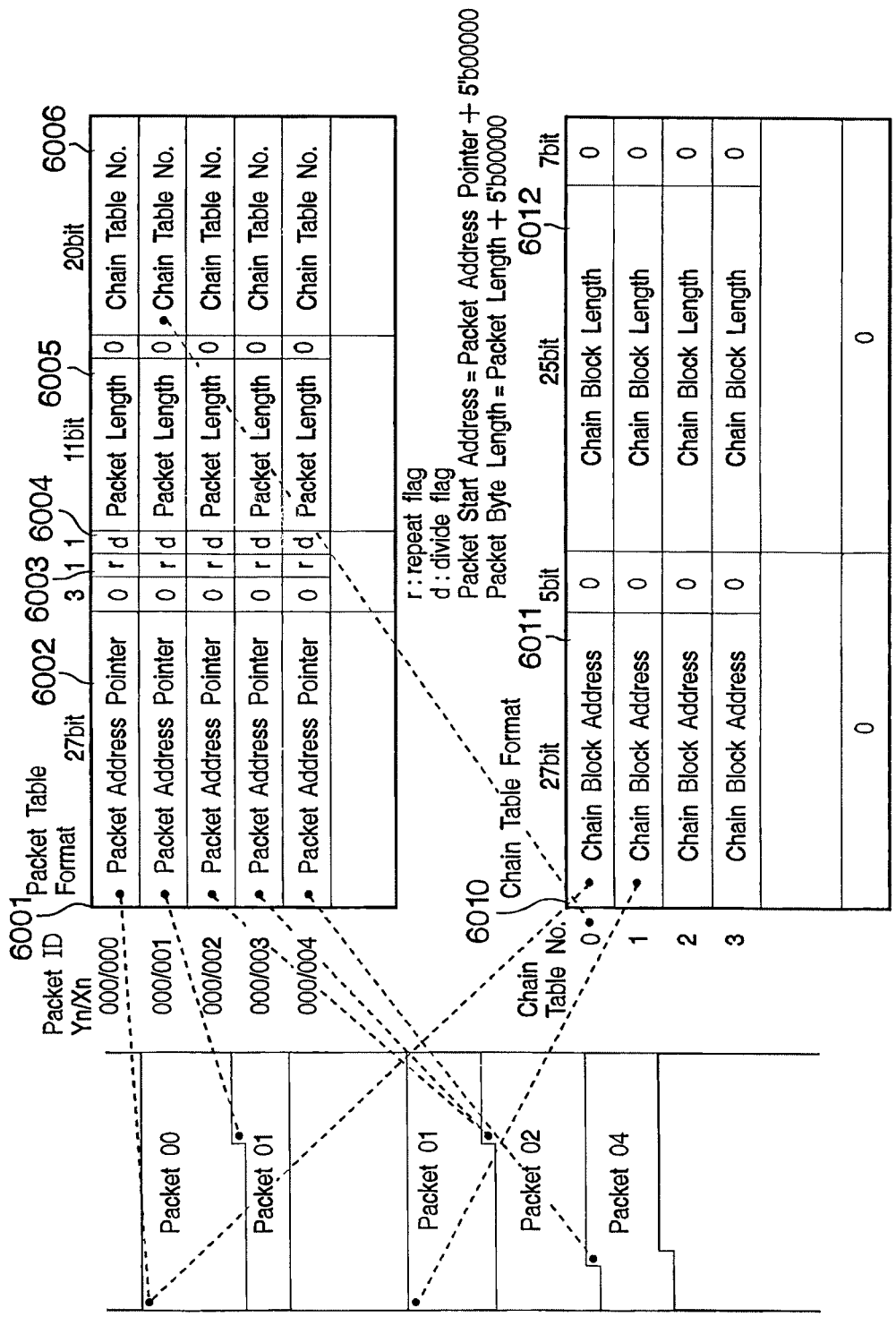
FIG. 4 is a schematic view for explaining a packet data management method.

A packet data management method will be explained below with reference to FIG. 4. FIG. 4 is a schematic view for explaining the packet data management method. Each packet data is managed by a packet table 6001. Components of this packet table 6001 are as follows. A packet start address 6002 and packet byte length (packet length) 6005 are obtained by adding five bits of 0 to the value of the table.

That is,

Packet Address Pointer (27 bits)+5b00000=Packet Start Address

Packet Length (11 bits)+5b00000=Packet Byte Length

Note that the packet table 6001 and a chain table 6010 are not separated.

The packet table 6001 is always arranged in the scanning direction, i.e., in the order of $Y_n/X_n$=000/000, 000/001, 000/002, . . . . An entry of this packet table 6001 uniquely indicates one tile. Also, an entry next to $Y_n/X_{max}$ is $Y_{n+1}/X_0$.

If a packet has exactly the same data as an immediately preceding packet, this packet is not recorded on the memory, and the same packet address pointer and packet length as those of the first entry are stored in the entry of the packet table 6001. That is, two table entries indicate one packet data. In this case, a repeat flag 6003 is set in the second table entry.

If a packet is divided into a plurality of portions by a chain DMA, a divide flag 6004 is set, and a chain table number 6006 of a chain block containing the start portion of this packet is set. An entry of the chain table 6010 is made up of chain block address 6011 and chain block length 6012. 0 is stored as both the address and block length in the last entry of the table.

When image data is to be processed by the image processing apparatus with the above configuration, the processing time extends if large-volume data is exchanged between the individual processing blocks. Therefore, image data is generally exchanged after being compression-coded, and the compression-coded image data is decoded before being actually output.

Image data supplied to the image processing apparatus from a facsimile apparatus (FAX), personal computer (PC), or image database across a network is compression-coded from the beginning and hence can be directly exchanged between the individual processing blocks. However, image data input from a scanner is first compression-coded and, after the information is stored in the memory, the compression-coded data is subjected to image processing. The flow of image data in this case will be explained below by using the components shown in FIG. 1.

When image data is input from the scanner 2070, the scanner image processor 2114 performs correction image processing for the scanned image data. This image data is input to the tile compressor 2106 through the image input interface 2112 and tile bus 2107. In this embodiment, the tile compressor A of the tile compressors 2106 performs compression coding by JPEG.

Figure 5:
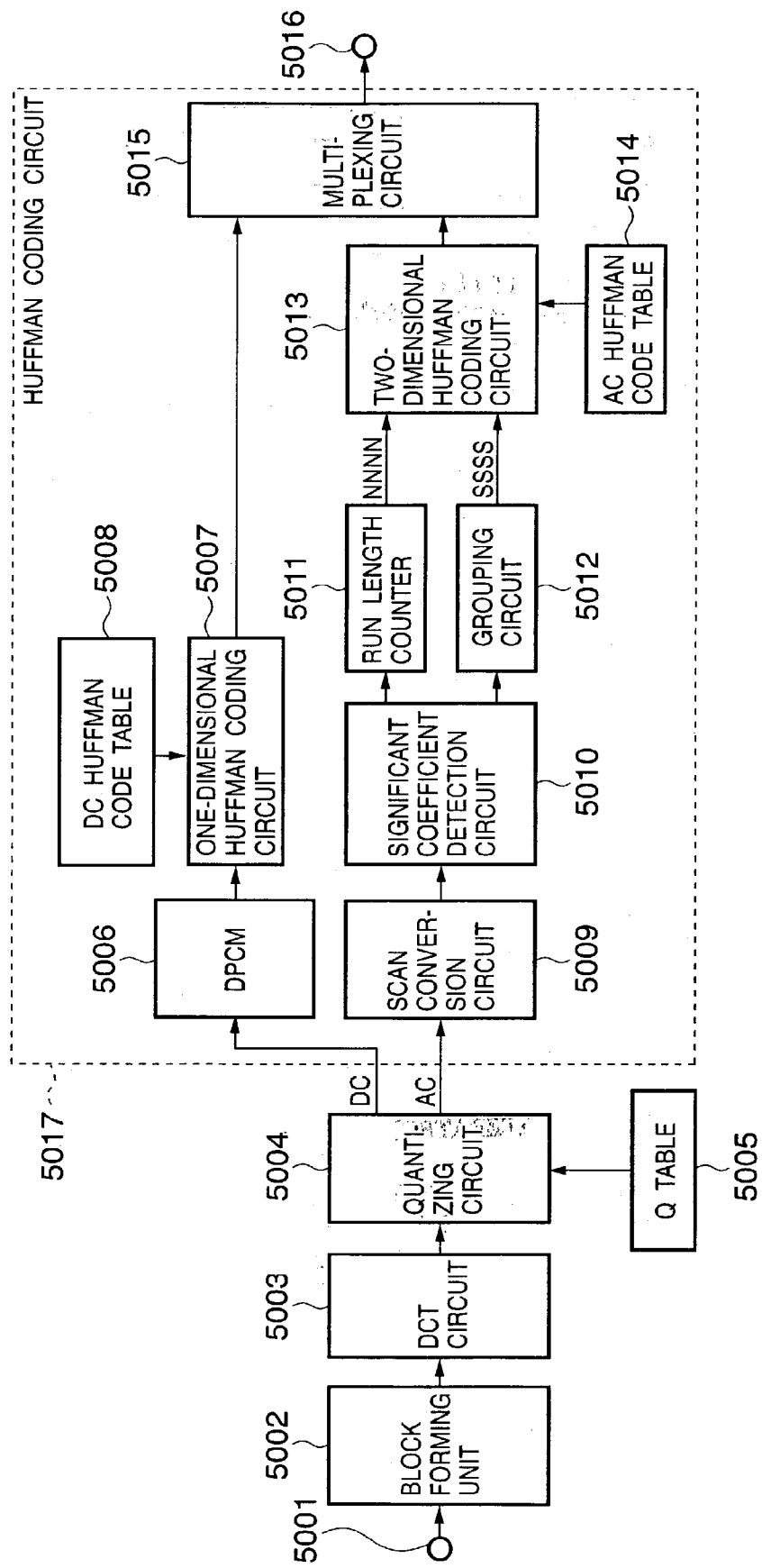
FIG. 5 is a block diagram of an apparatus for performing coding proposed by JPEG as an international standard system of color still image coding.

The mechanism of this JPEG compression method will be briefly explained below. FIG. 5 is a block diagram of an apparatus for performing coding proposed by JPEG (Joint Photographic Experts Group) as an international standard system of color still image coding. Referring to FIG. 5, input image data from an input terminal 5001 is cut into 8×8-pixel blocks by a block forming unit 5002. These blocks are subjected to discrete cosine transform (DCT) by a discrete cosine transform circuit 5003, and the transform coefficients are supplied to a quantizing circuit 5004. This quantizing circuit 5004 linearly quantizes the transform coefficients in accordance with quantization step information applied by a quantization table (Q table) 5005, and outputs the quantized coefficients to a Huffman coding circuit 5017.

The Huffman coding circuit 5017 performs the following processing. Of the quantized coefficients, a predictive coding circuit (DPCM) 5006 calculates a difference (prediction error) between a DC coefficient and the DC component of a preceding block, and supplies the difference to a one-dimensional Huffman coding circuit 5007.

Figures 6, 7:
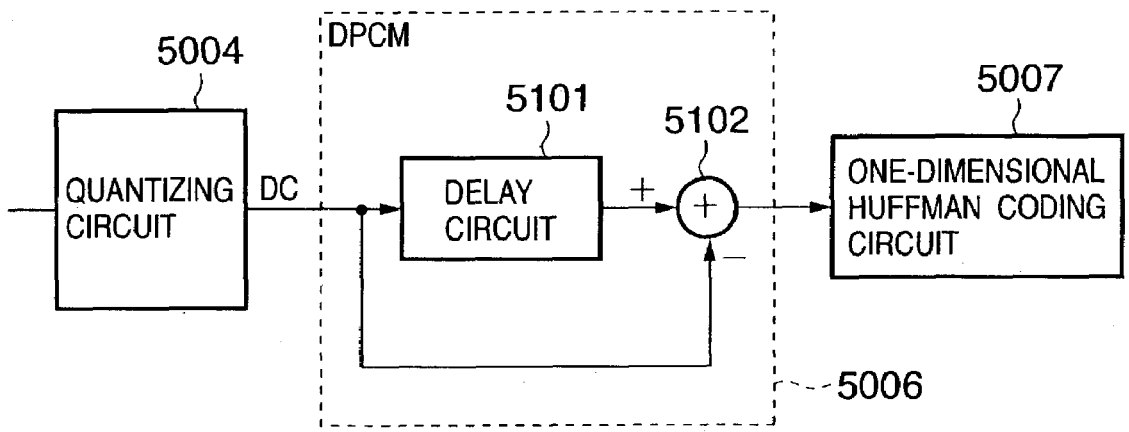
FIG. 6 is a block diagram for explaining details of the arrangement of a predictive coding circuit (DPCM) in JPEG.
FIG. 7 is a view for explaining the procedure of zigzag scan in JPEG.

FIG. 6 is a block diagram for explaining details of the arrangement of the predictive coding circuit (DPCM) 5006 of JPEG. Referring to FIG. 6, the DC coefficient quantized by the quantizing circuit 5004 is applied to a delay circuit 5101 and subtracter 5102. The delay circuit 5101 delays data by a time required for the DCT circuit 5003 to process one block, i.e., 8 pixels×8 pixels. This delay circuit 5101 supplies the DC coefficient of a preceding block to the subtracter 5102.

Accordingly, the subtracter 5102 outputs a difference (prediction error) from the DC coefficient of a preceding block. In this predictive coding, a preceding block value is used as a prediction value, so a predictor is formed in the delay circuit as described above. The one-dimensional Huffman coding circuit 5007 shown in FIG. 5 performs variable length coding, in accordance with a DC Huffman code table 5008, for the prediction error signal supplied from the predictive coding circuit 5006, and supplies the Huffman code to a multiplexing circuit 5015.

On the other hand, AC coefficients which are coefficients other than the DC coefficients and quantized by the quantizing circuit 5004 are scanned zigzag from low-order coefficients by a scan conversion circuit 5009. These scanned coefficients are supplied to a significant coefficient detection circuit 5010. FIG. 7 is a view for explaining the procedure of this zigzag scan by JPEG. In this zigzag scan, the results of two-dimensional DCT are scanned in ascending order of numbers (0 to 63) shown in FIG. 7, and converted into one-dimensional continuous data.

The significant coefficient detection circuit 5010 checks whether the quantized AC coefficient is "0". If the AC coefficient is "0", the significant coefficient detection circuit 5010 supplies a count-up signal to a run length counter 5011 to increment the counter value by one. If the AC coefficient is not "0", the significant coefficient detection circuit 5010 supplies a reset signal to the run length counter 5011 to reset the counter value. In addition, as shown in FIG. 8, a grouping circuit 5012 divides the coefficient into a group number SSSS and an additional bit. FIG. 8 is a view for explaining Huffman coding by JPEG. The group number SSSS is supplied to a Huffman coding circuit 5013, and the additional bit is supplied to the multiplexing circuit 5015.

Referring to FIG. 8, "EOB" is a delimiter indicating that coding of one block (8 pixels×8 pixels) is complete. "R16" is a code used when a 0 run is 16 or more. Referring to FIG. 5, the run length counter 5011 counts the run length of "0"s, and supplies a number NNNN of "0"s between significant coefficients other than "0"s to the two-dimensional Huffman coding circuit 5013. The two-dimensional Huffman coding circuit 5013 performs variable length coding for the supplied "0" run length NNNN and significant coefficient group number SSSS in accordance with an AC Huffman code table 5014, and supplies the AC Huffman code to the multiplexing circuit 5015.

The multiplexing circuit 5015 multiplexes the DC Huffman codes, AC Huffman codes, and additional bits of one block (8×8 input pixels). As a consequence, the compressed image data is output from an output terminal 5016. Accordingly, the memory capacity can be reduced by storing the output compressed data from the output terminal 5016 into the memory, and expanding the stored compressed data by an operation which is the reverse of the above operation when the stored data is to be read out.

In the tile compressor A of the tile compressors 2106 shown in FIG. 1, the compression-coded data is stored in the RAM 2002 via the image ring interfaces 2102 and 2148, system bus bridge 2007, and RAM controller 2124.

After that, this compressed data stored in the RAM 2002 is supplied to, e.g., the printer 2095 or a processing block for FAX transmission or transmission to a database connected to the LAN, via the system bus bridge 2007.

As the RAM 2002, a memory having an enough capacity to store image data must be used. In practice, however, no large-capacity memory can be used when the cost is taken into consideration. Therefore, a memory having an appropriate capacity is actually prepared on the assumption that data which is compression-coded to some extent is stored.

To process high-quality image data in subsequent processing blocks when compression is performed by JPEG in the image processing apparatus having the above arrangement, compression coding must be performed at as low a compression ratio as possible. That is, compression coding must be performed at a low compression ratio such that the data amount is storable by the capacity of the RAM 2002.

As described previously, therefore, the conventional method is to perform compression coding by switching a Q table to those having higher compression ratios one after another until the data amount becomes storable by the capacity of the RAM 2002. In this manner, compression coding is performed at a low compression ratio such that the data amount is storable by the capacity of the RAM 2002.

The present invention solves the above problem by using a plurality of encoding circuits, a plurality of decoding circuits, and a plurality of memories, and processing image data as packet data, thereby performing control so as not to generate compressed data exceeding the capacity of the memory. In addition, bit shift is performed instead of having a plurality of Q tables.

Figure 9:
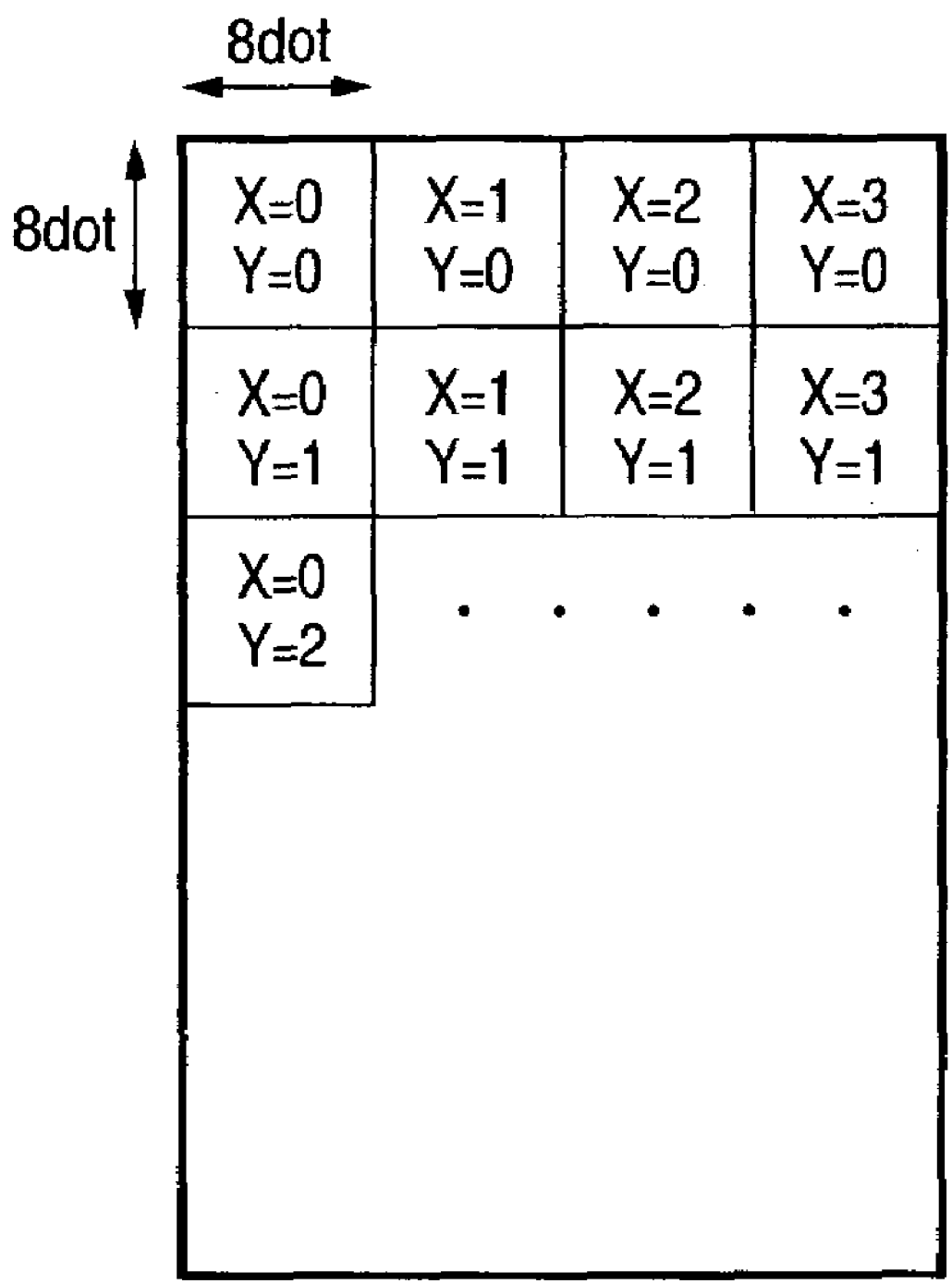
FIG. 9 is a view for explaining a method of dividing image data into tiles.
Figure 10:
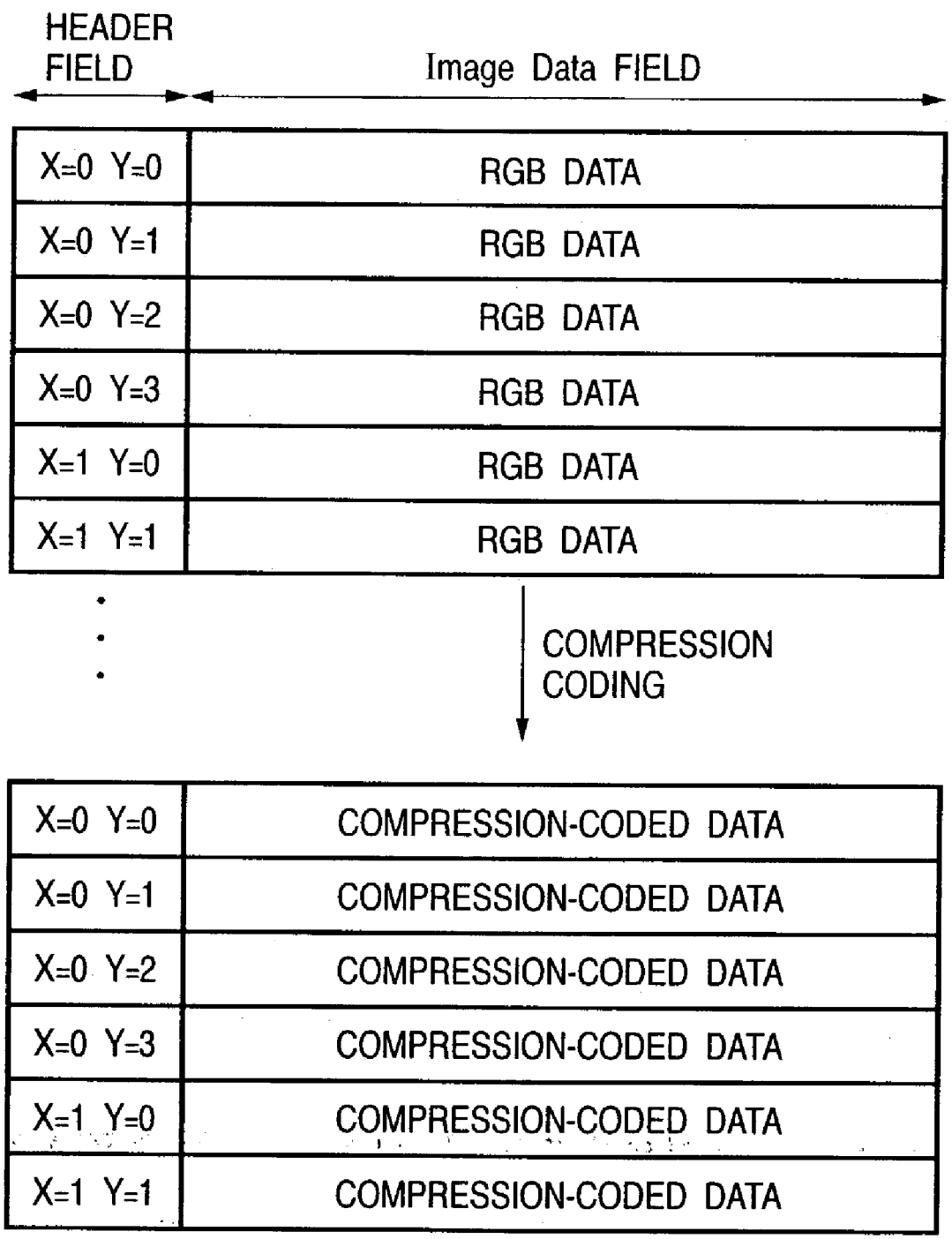
FIG. 10 is a schematic view for explaining the structure of packet data in the first embodiment.

In the first embodiment, image data is exchanged as data having the packet format described earlier. More specifically, as shown in FIG. 9, image data is divided into tiles each having 8 pixels×8 pixels to determine the X- and Y-coordinates, and the coordinate data is stored in a header portion. FIG. 9 is a view for explaining a method of dividing image data into tile units. FIG. 10 is a schematic view for explaining the structure of packet data in the first embodiment. Referring to FIG. 10, image data of one tile, i.e., 64 pixels is stored in an image data field. When image data is input from a scanner, RGB data is stored in this image data field. When this RGB data is compressed, the compressed encoded data is stored in the image data field.

The characteristic feature when processing is performed using the packet format will be described with reference to FIGS. 11A to 11J. FIGS. 11A to 11J are views for briefly explaining a method of storing packet data in a memory of the image processing apparatus according to the present invention. For example, as shown in FIG. 11A, assume that in this image processing apparatus, each tile data of one image data is processed by two processing blocks, and the processing result is stored in a memory via an arbiter.

An arbiter is a device which, until transfer of previously input packet format data is complete, stores data input next to the previously input data, and outputs the stored next data immediately after the previously input data is completely output, thereby inputting each block of the packet format to a memory.

Assume that in the image processing apparatus with the above arrangement, each packet data obtained by dividing image data is input to and processed by one of a processing block•1 and processing block•2 in which processing of a preceding tile is complete. In the first embodiment, assume also that the processing time of the processing block•1 is shorter than that of the processing block•2. In the following description, an embodiment in which image data having the structure as shown in FIG. 9 is divided into tiles and processed in this image processing apparatus will be explained with reference to FIGS. 11A to 11J.

First, in FIG. 11A, tile data having coordinates X=0 and Y=0 is input to the processing block•1, and tile data having coordinates X=0 and Y=1 is input to the processing block•2. In FIG. 11B, processing of the tile data having coordinates X=0 and Y=0 is complete in the processing block•1, the processed data is stored at an address 00 of the memory via the arbiter, and next tile data having coordinates X=0 and Y=2 is input. In the processing block•2, processing of the tile data having coordinates X=0 and Y=1 is continued.

In FIG. 11C, processing of the tile data having coordinates X=0 and Y=2 is complete in the processing block•1, the processed data is stored at an address 01 of the memory via the arbiter, and next tile data having coordinates X=0 and Y=3 is input. In the processing block•2, the tile data having coordinates X=0 and Y=1 is being processed.

In FIG. 11D, processing of the tile data having coordinates X=0 and Y=1 is complete in the processing block•2, the processed data is stored at an address 02 of the memory via the arbiter, and next tile data having coordinates X=1 and Y=0 is input. In the processing block•1, the tile data having coordinates X=0 and Y=3 is being processed.

In FIG. 11E, processing of the tile data having coordinates X=0 and Y=3 is complete in the processing block•1, the processed data is stored at an address 03 of the memory via the arbiter, and next tile data having coordinates X=1 and Y=1 is input. In the processing block•2, the tile data having coordinates X=1 and Y=0 is being processed.

In FIG. 11F, processing of the tile data having coordinates X=1 and Y=1 is complete in the processing block•1, the processed data is stored at an address 04 of the memory via the arbiter, and next tile data having coordinates X=1 and Y=2 is input. In the processing block•2, the tile data having coordinates X=1 and Y=0 is being processed.

In FIG. 11G, processing of the tile data having coordinates X=1 and Y=0 is complete in the processing block•2, the processed data is stored at an address 05 of the memory via the arbiter, and next tile data having coordinates X=1 and Y=3 is input. In the processing block•1, the tile data having coordinates X=1 and Y=2 is being processed.

In FIG. 11H, processing of the tile data having coordinates X=1 and Y=2 is complete in the processing block•1, the processed data is stored at an address 06 of the memory via the arbiter, and next tile data having coordinates X=2 and Y=0 is input. In the processing block•2, the tile data having coordinates X=1 and Y=3 is being processed.

In FIG. 11I, processing of the tile data having coordinates X=2 and Y=0 is complete in the processing block•1, the processed data is stored at an address 07 of the memory via the arbiter, and next tile data having coordinates X=2 and Y=1 is input. In the processing block•2, the tile data having coordinates X=1 and Y=3 is being processed.

In FIG. 11J, processing of the tile data having coordinates X=1 and Y=3 is complete in the processing block•2, the processed data is stored at an address 08 of the memory via the arbiter, and next tile data having coordinates X=2 and Y=2 is input. In the processing block•1, the tile data having coordinates X=2 and Y=1 is being processed. As described above, the processed data is stored in the memory such that the order of output tiles is different from the original tile order.

In the image processing apparatus as described above, if input image data has no packet format, this image data has no position information. Hence, the processed data cannot be restored to the same array as the original tile data. However, when image data has a packet format, position information (X- and Y-coordinate data) of each tile is added to a header portion. Also, an address on the memory where each tile is stored is managed by a packet table format. Therefore, tile data input to the memory in order different from the original order as described above can be output from the memory in the original order.

Figure 12:
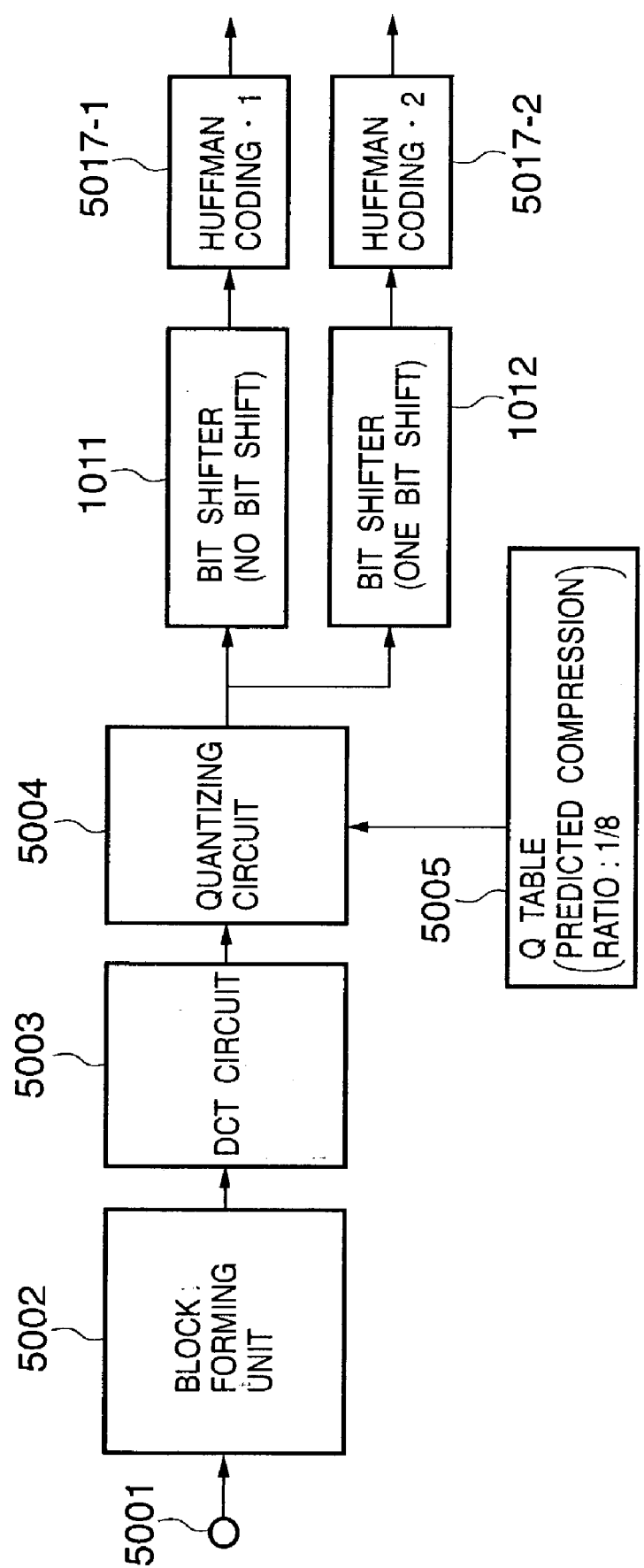
FIG. 12 is a block diagram showing the arrangement of a data compressing device including a bit shifter for shifting bits of quantized data when JPEG compression is to be performed.

The effect of shifting bits of quantized data by using a bit shifter in JPEG compression will be described below. FIG. 12 is a block diagram showing the arrangement of a data compression apparatus having a bit shifter for shifting bits of quantized data when JPEG compression is performed. In FIG. 12, the same reference numerals as in FIG. 5 denote blocks having the same functions as the blocks of the apparatus shown in FIG. 5, and a detailed explanation thereof will be omitted.

Also, a Q table 5005 used in the apparatus shown in FIG. 12 has a predicted compression ratio of 1/8. Furthermore, a bit shifter 1011 is so set as to perform no bit shift by a CPU (not shown). A bit shifter 1012 is so set as to perform 1-bit shift (1/2 operation) by the CPU (not shown). A circuit, which is similar to the Huffman coding circuit 5017 as shown in FIG. 5, is adapted to a Huffman coding-1 5017-1 and a Huffman coding-2 5017-2 as shown in FIG. 12.

Figure 13:
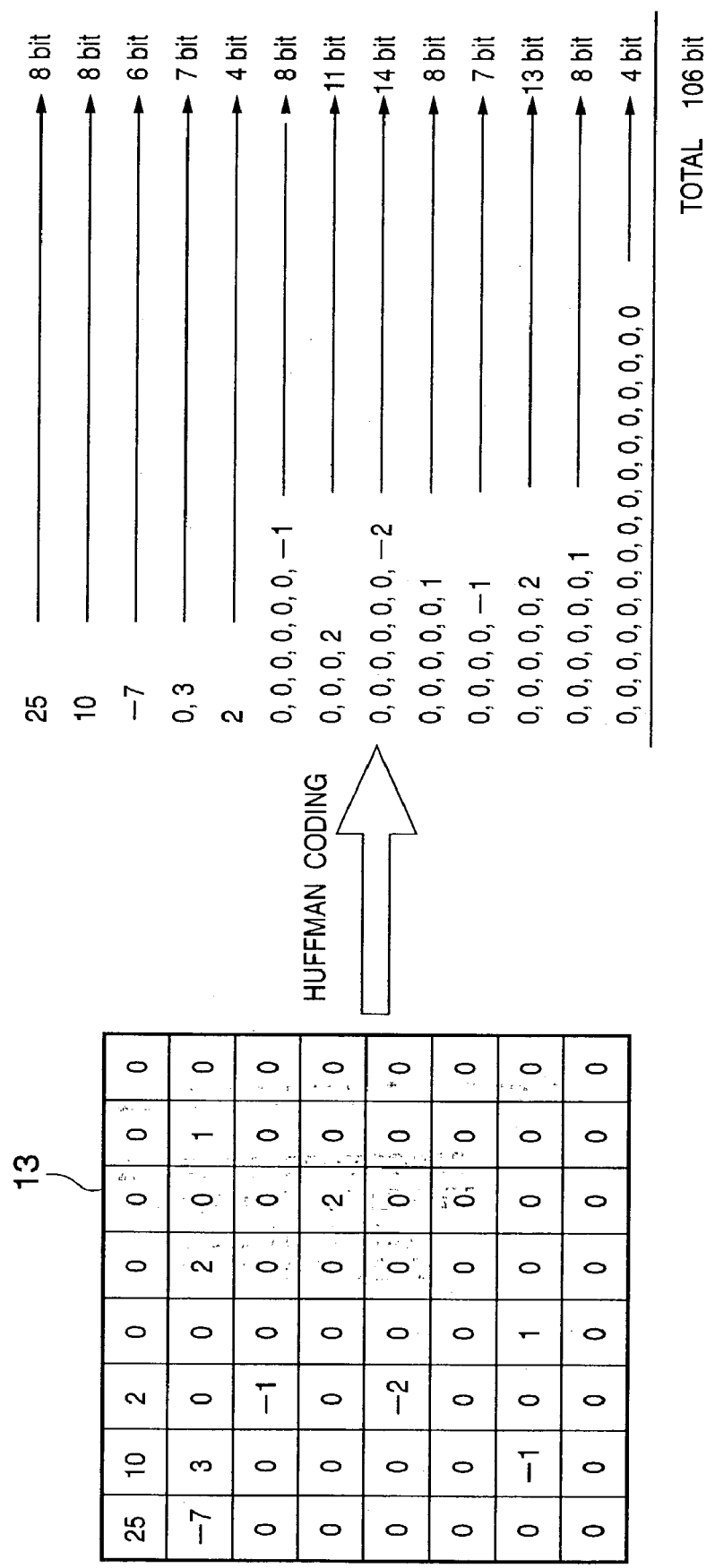
FIG. 13 is a view for explaining the result of Huffman coding of quantized data which is not bit-shifted.

Assume that a quantization result 13 as shown in FIG. 13 is obtained by quantizing certain image data by the above settings. FIG. 13 is a view for explaining the result of Huffman coding of quantized data with no bit shift. Since the bit shifter 1011 is so set as to perform no bit shift, the quantization result 13 is directly compression-coded by Huffman coding to generate 106-bit compressed data as shown in FIG. 13.

Figure 14:
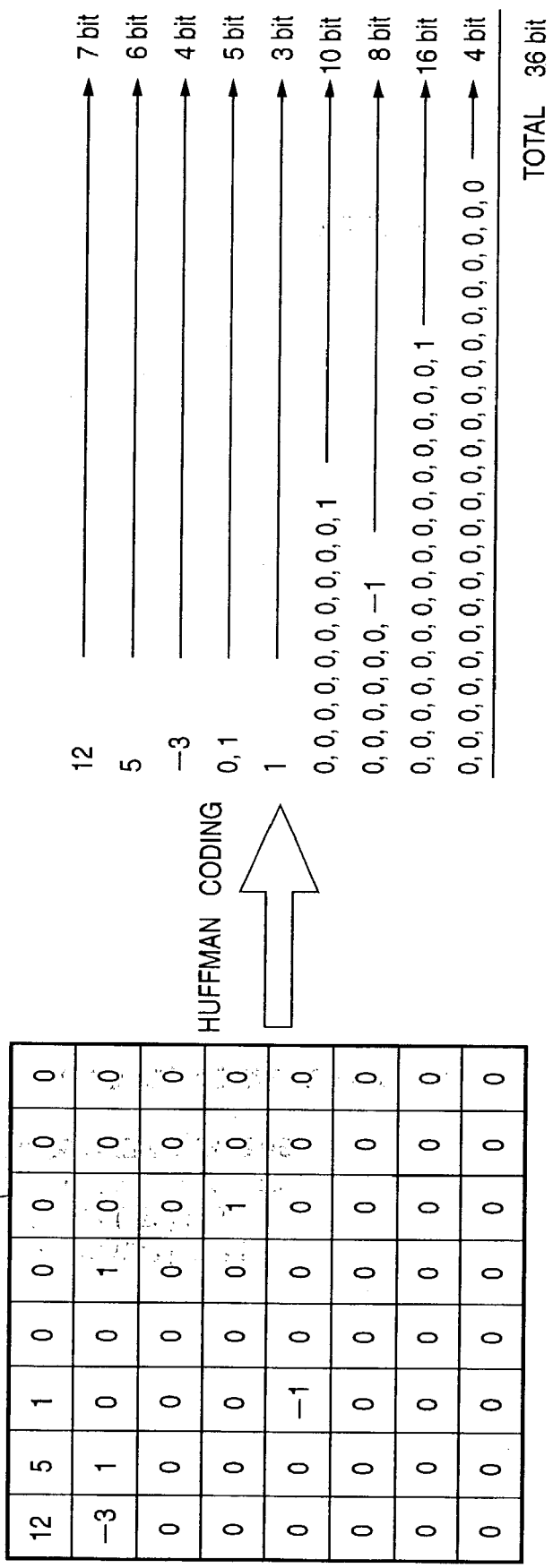
FIG. 14 is a view for explaining the result of Huffman coding of one-bit-shifted quantized data.

On the other hand, the bit shifter 1012 is so set as to perform bit shift. FIG. 14 is a view for explaining the result of Huffman coding of 1-bit-shifted quantized data. Assume, as shown in FIG. 14, that a quantization result 14 is output from the bit shifter 1012. As shown in FIG. 14, "1" and "−1" of quantized data change to "0" by 1-bit shift. Therefore, portions where "0"s continue increase when this quantized data is scanned zigzag to encode its arrangement. Accordingly, when this data is compression-coded by Huffman coding, 63-bit compressed data is obtained as shown in FIG. 14.

By the above method, compressed data is not accurately ½ when 1-bit shift is performed. However, a standard image is compressed to substantially ½ when processed.

Figure 15:
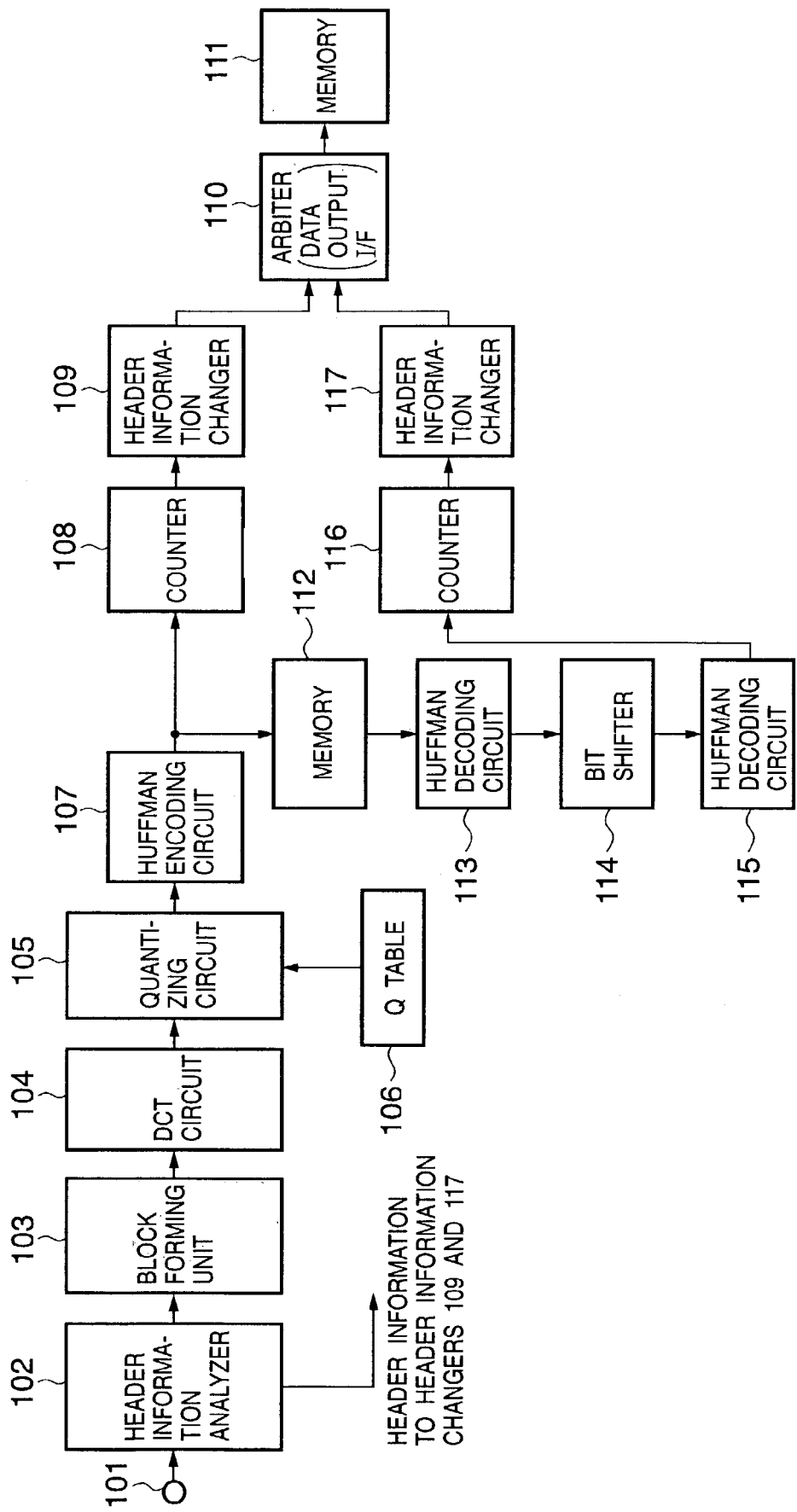
FIG. 15 is a block diagram showing details of the arrangement of a tile compressor A of tile compressors 2106 in the first embodiment.

FIG. 15 is a block diagram showing details of the arrangement of the tile compressor A of the tile compressors 2106 in the first embodiment. A data path from this tile compressor A to the RAM 2002 will be described below with reference to FIG. 15. In FIG. 15, a memory 111 corresponds to the RAM 2002 shown in FIG. 1. The image ring interfaces 2102 and 2148, system bus bridge 2007, and RAM controller 2124 are omitted from FIG. 15.

Referring to FIG. 15, an input terminal 101 is a data input interface for inputting image data from the tile bus 2107. A header information analyzer 102 reads out information of a header portion of input image data from this input terminal 101, and outputs as header information to header information changers 109 and 117.

The input image data is cut into 8×8-pixel blocks by a block forming unit 103. A discrete cosine transform (DCT) circuit 104 performs discrete cosine transform for these blocks, and the transform coefficients are supplied to a quantizing circuit 105. This quantizing circuit 105 linearly quantizes the transform coefficients in accordance with quantization step information applied by a quantization table (Q table) 106.

The output quantized data from the quantizing circuit 105 is input to a Huffman encoding circuit 107 where the data is compression-coded in accordance with the coding method described previously. The quantized data encoded by this Huffman encoding circuit 107 is input to a counter 108 which counts a data amount to which the image data is compressed. If this data amount is larger than a predetermined data amount, this information is notified to the CPU 2001, the data is discarded, and the next image data is subsequently processed.

The result of counting by the counter 108 and the compressed image data are input to the header information changer 109. This header information changer 109 rewrites information such as a compress flag and image data byte length, on the basis of the header information transferred from the header information analyzer 102 beforehand. If the result of counting by the counter 108 is larger than the predetermined data amount, this information is notified to the CPU 2001, header information corresponding to the data is discarded, and the next image data is subsequently processed.

The packet data whose header is rewritten by the header information changer 109 is stored in the memory 111 via an arbiter (data output I/F) 110.

The output encoded data from the Huffman encoding circuit 107 is also input to a memory 112. Note that inputting and outputting of data with respect to this memory 112 are controlled by the CPU 2001. Output data from the memory 112 is decoded into the original quantization table by a Huffman decoding circuit 113. The decoded data is shifted one bit (compressed to ½) by the bit shifter 114. The result of quantization shifted one bit by the bit shifter 114 is re-encoded by a Huffman encoding circuit 115.

This data encoded by the Huffman encoding circuit 115 is input to a counter 116 which counts a data amount to which this recompressed image data is compressed. If this data amount is larger than a predetermined data amount (e.g., the memory capacity), this information is notified to the CPU 2001, the data is discarded, and the next image data is subsequently processed. Note that this next image data is output from the memory 112.

The result of counting by the counter 116 and the compressed image data are input to the header information changer 117. This header information changer 117 rewrites information such as a compress flag and image data byte length, on the basis of the header information transferred from the header information analyzer 102 beforehand. The packet data whose header is written by the header information changer 117 is stored in the memory 111 via the arbiter (data output I/F) 110.

Figure 16:
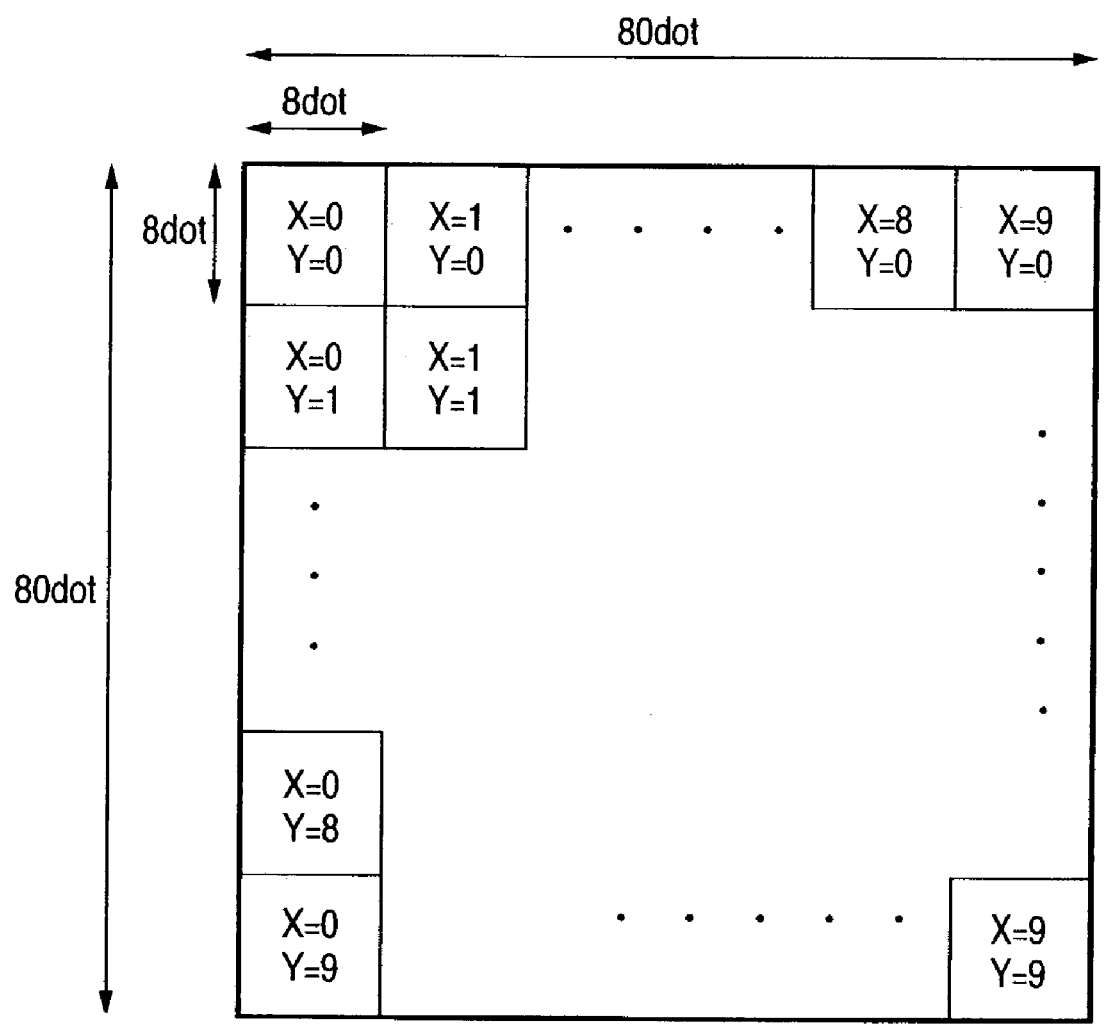
FIG. 16 is a schematic view for explaining an 80×80-pixel RGB multilevel color image used in the first embodiment.

A procedure of compressing data in real time at a minimal compression ratio by which the compressed data is storable in the memory 111 of the tile compressor A of the tile compressors 2106 having the above configuration will be explained below. FIG. 16 is a schematic view for explaining an RGB multilevel color image having 80 pixels×80 pixels used in the first embodiment. This image data shown in FIG. 16 has 8-bit data per pixel for each of R, G, and B, and can express 256 gray levels.

First, a memory capacity required when this image data in an uncompressed state is stored as packet data in the memory by adding the header information described previously to the data will be explained. The image data has a data amount of eight bits per pixel for each of R, G, and B, so the data amount of one pixel is 8 bits×3=24 bits (3 bytes). Since one packet is formed by 8 pixels×8 pixels, the data amount per packet is 8×8×3 bytes=192 bytes. Also, since 32-byte header information is added as described previously, the total data amount of one packet is 224 bytes. Accordingly, an image of 80 pixels× 80 pixels has data of 100 packets as a whole, so one uncompressed image data has a data amount of 224 bytes×100=22, 400 bytes.

For image data, a memory having a very large capacity must be prepared in practice because the data amount to be processed may increase when the number of gray levels per pixel or the resolution is increased, or large image data needs to be processed in some cases. Therefore, it is necessary to reduce the memory capacity or facilitate data handling by various data compression processes represented by JPEG.

An example of calculation of a capacity necessary for a memory on the assumption that data compression by which the predicted compression ratio is 1/4 is performed by JPEG processing will be described below. Assume that the original image data is 80×80-pixel image data having an 8-bit data amount per pixel for each of R, G, and B as described above. That is, the data amount per pixel is 8 bits×3=24 bits (3 bytes). Since one packet is formed by 8 pixels×8 pixels, the data amount per packet is 8×8×3 bytes=192 bytes.

In the first embodiment, the aforementioned packet data is compressed by JPEG processing. When the predicted compression ratio is set to 1/4 and the data is exactly compressed by this compression ratio, the data amount per packet is 192 bytes/4=48 bytes.

Also, when the 32-byte header information is added to each packet as described above, the data amount per packet is 80 bytes. Accordingly, 80×80-pixel image data has data of 100 packets as a whole, so one uncompressed image data has a data amount of 80 bytes×100=8,000 bytes. That is, to store data subjected to JPEC processing by a predicted compression ratio of 1/4 into a memory, an 8,000-byte memory need only be prepared.

FIGS. 17 to 24 are block diagrams for explaining the arrangement of the image processing apparatus for performing compression in real time at a minimal compression ratio with which the compressed data can be stored in the memory 112. Note that the first embodiment is based on the assumption that image data to be processed is a color image having a size of 80 pixels×80 pixels and 256 gray levels for each of R, G, and B. Assume also that the Q table 106 has a predicted compression ratio of 1/2. Furthermore, assume that the memory 111 has a capacity capable of storing packet data obtained by compressing original image data to ¼, i.e., a capacity of 8,000 bytes.

Referring to FIGS. 17 to 24, portions indicated by the solid lines represent paths through which data flows, and portions indicated by the dotted lines indicate paths through which no data flows in the state shown in each drawing. The contents of data processing in the individual blocks will be explained in turn.

Figure 17:
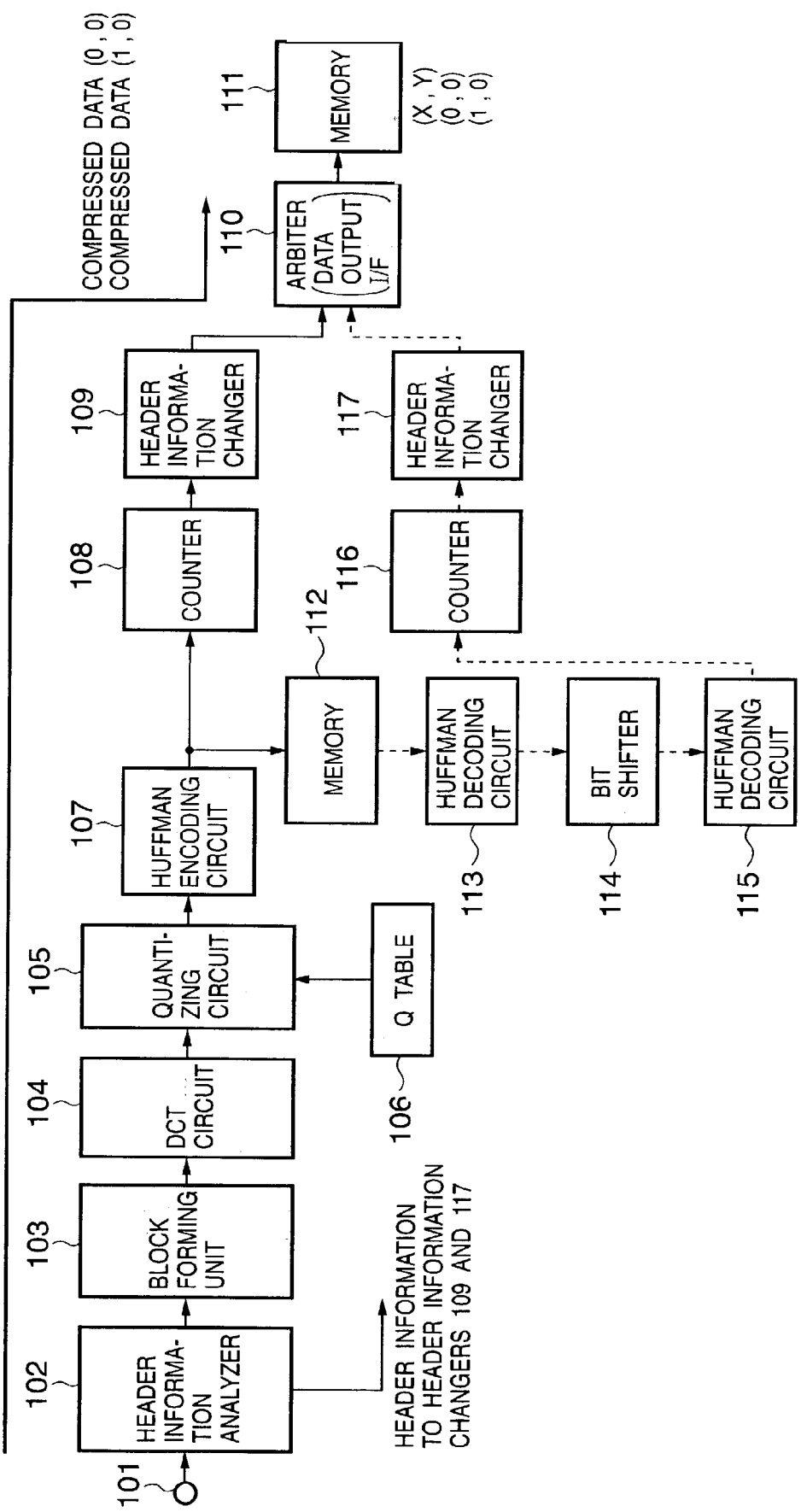
FIG. 17 is a view for explaining compression of image data having (0,0) and (1,0) as (X,Y) coordinates in packet data of 8×8-pixel blocks.

FIG. 17 is a view for explaining compression of image data having (X,Y) coordinates of (0,0) and (1,0), of packet data blocks each having 8 pixels×8 pixels. Referring to FIG. 17, image data is input from the input terminal 101, and information of a header portion of the data is read out. This data is processed by the block forming unit 103 and DCT circuit 104, and quantized by the quantizing circuit 105 by using the Q table 106 having a predicted compression ratio of 1/2. After that, the quantized data is encoded by the Huffman encoding circuit 107, and the encoded data is output to the counter 108 and memory 112.

The counter 108 counts the size of the compressed data. Assume that the block (0,0) is compressed to 45 bytes, and the block (1,0) is compressed to 39 bytes. In the first embodiment, the capacity of the memory 111 for storing compressed data is suitable for data compressed by a compression ratio of 1/4 or less. So, the compressed data amount of one block need only be 48 bytes or less. Accordingly, header information is added to each of the compressed data (0,0) and (1,0) as storable data, and the data is stored in the memory 111.

When the counter 108 determines that the compressed data is storable, the compressed data (0,0) and (1,0) compressed by the Q table whose predicted compression ratio is 1/2 and stored in the memory 112 are discarded, and the emptied spaces are used as free spaces for receiving the next data.

Figure 18:
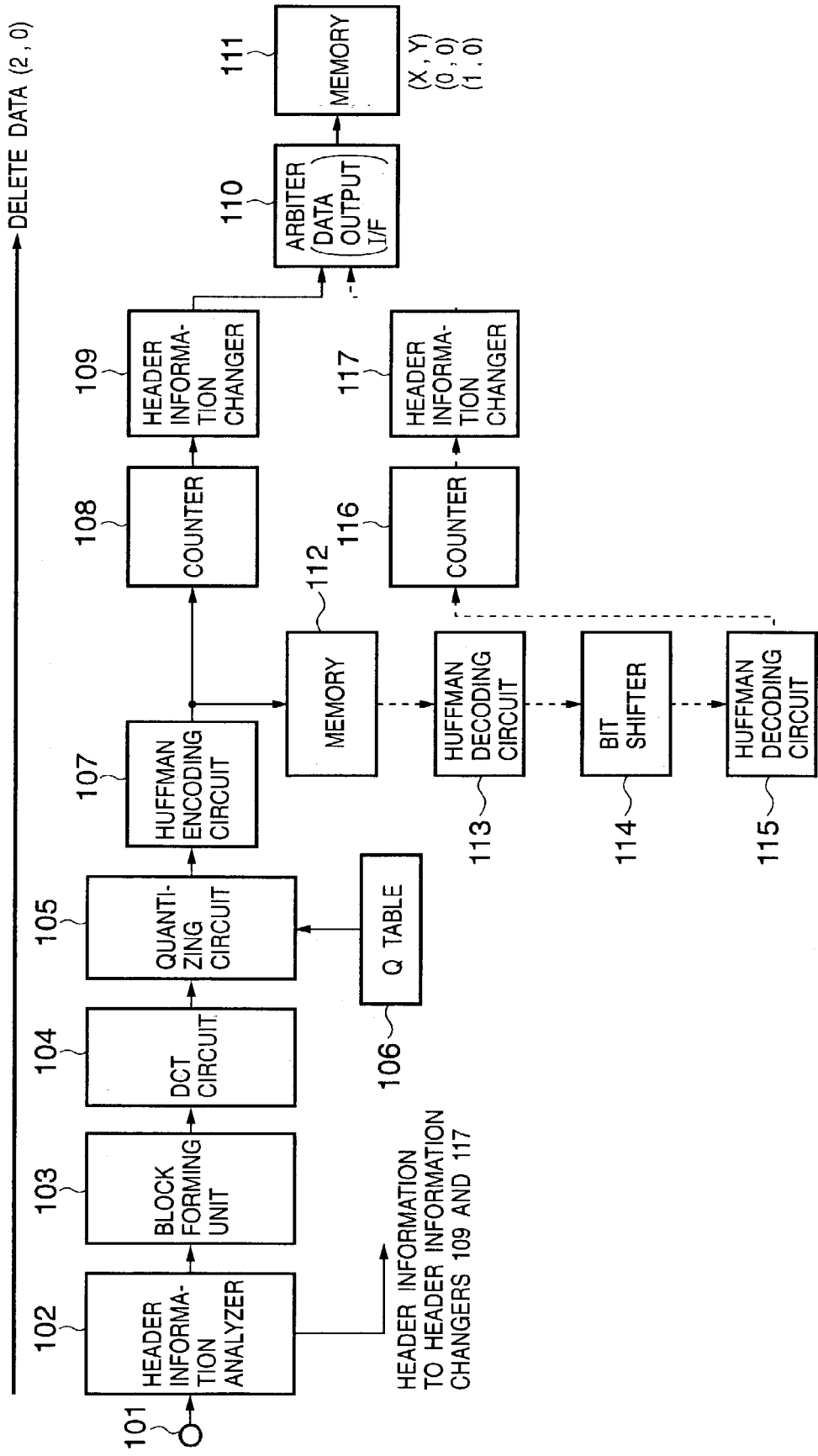
FIG. 18 is a view for explaining compression of image data having (2,0) as (X,Y) coordinates in packet data of 8×8-pixel blocks.

FIG. 18 is a view for explaining compression of image data having (X,Y) coordinates of (2,0), of a packet data block having 8 pixels×8 pixels. Referring to FIG. 18, image data is input from the input terminal 101, and information of a header portion of the data is read out. This data is processed by the block forming unit 103 and DCT circuit 104, and quantized by the quantizing circuit 105 by using the Q table 106 having a predicted compression ratio of 1/2 as described previously. After that, the quantized data is encoded by the Huffman encoding circuit 107, and the encoded data is output to the counter 108 and memory 112.

The counter 108 counts the size of the compressed data. Assume that the block (2,0) is compressed to 64 bytes. In the first embodiment as described above, the compressed data amount of one block must be 48 bytes or less. Accordingly, the counter 108 discards this compressed data (2,0) as unstorable data. Also, the header information (2,0) input to the header information changer 109 is similarly discarded, and the next block is subsequently processed.

Figure 19:
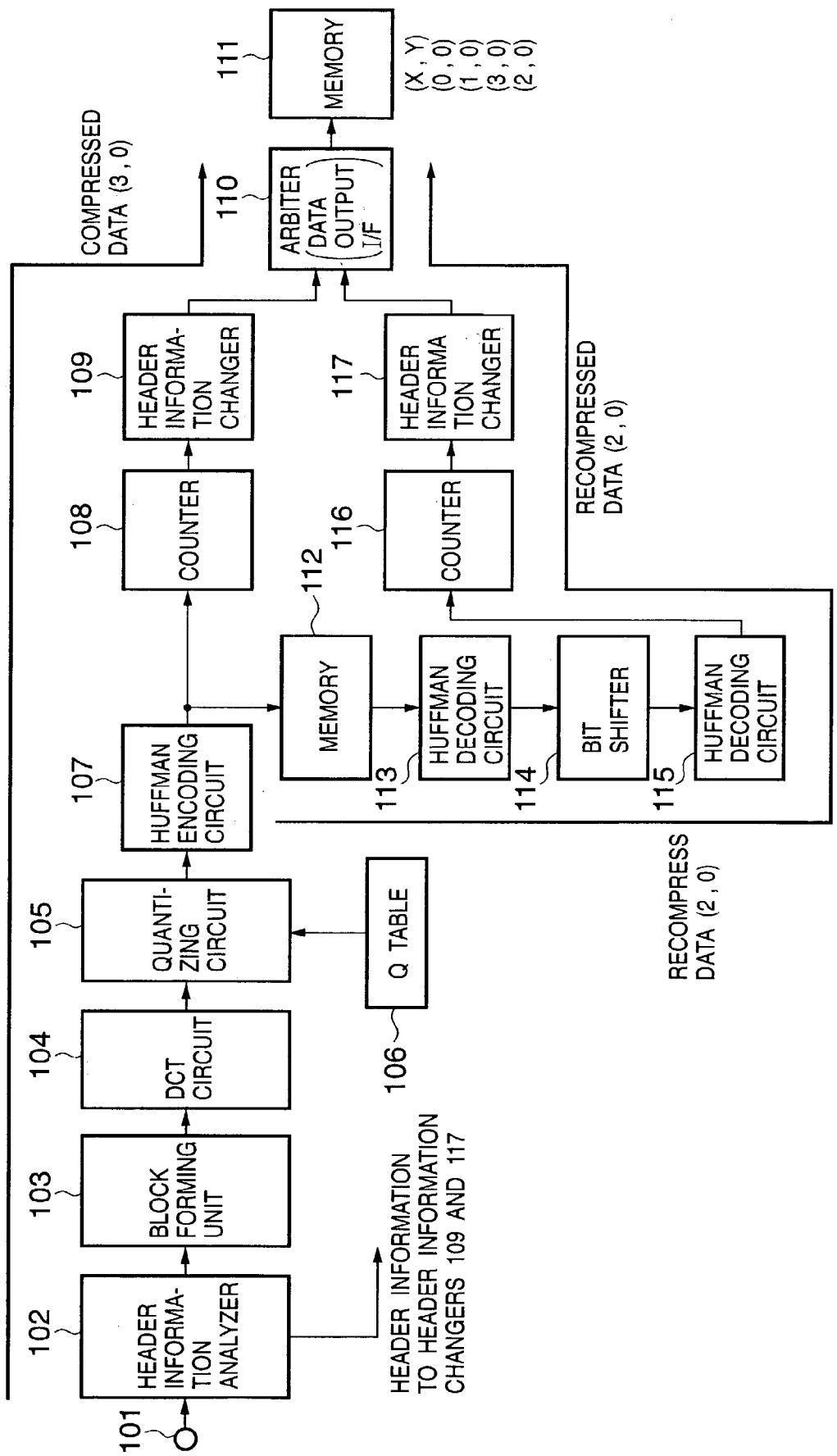
FIG. 19 is a view for explaining processing after a counter 108 determines that the compressed data (2,0) is unstorable.

FIG. 19 is a view for explaining processing after the counter 108 determines that the compressed data (2,0) is unstorable. Referring to FIG. 19, when the counter 108 determines that the compressed data is unstorable, the compressed data (2,0) compressed by the Q table whose predicted compression ratio is 1/2 and stored in the memory 112 is output to the Huffman decoding circuit 113. The decoded quantized data is shifted one bit by the bit shifter 114 to obtain a 1/2 data value. After that, this recompressed data is re-encoded by the Huffman encoding circuit 115 to have a data amount smaller than that of the data compressed by the Q table whose predicted compression ratio is 1/2 and stored in the memory 112. The encoded data is output to the counter 116.

Assume that the recompressed data is compressed to 35 bytes when the counter 116 counts the size of this recompressed data. Since this value is smaller than 48 bytes, the header information changer 117 adds header information to this recompressed data (2,0) as storable data, and stores the data in the memory 111.

When the counter 116 determines that the data is storable, the compressed data (2,0) compressed by the Q table whose predicted compression ratio is 1/2 and stored in the memory 112 is discarded, and the emptied space is used as a free space for receiving the next data.

In the first embodiment, the following compression process is performed while the above recompression process is being performed. That is, as shown in FIG. 19, when predetermined compression is performed for data of a block (3,0) and the data is compressed to 48 bytes or less, this packet data is stored in the memory 111.

If the compression of (3,0) is complete earlier than the recompression of (2,0), the compressed data (3,0) is stored in the memory 111 through the arbiter 110 earlier than the recompressed data (2,0). In this case, the locations of the data are switched at the addresses of the memory 111. As described previously, however, packet data in the memory 111 is managed by a packet table based on header information. Therefore, data can be output on the basis of the original block order when read out from the memory 111.

Figure 20:
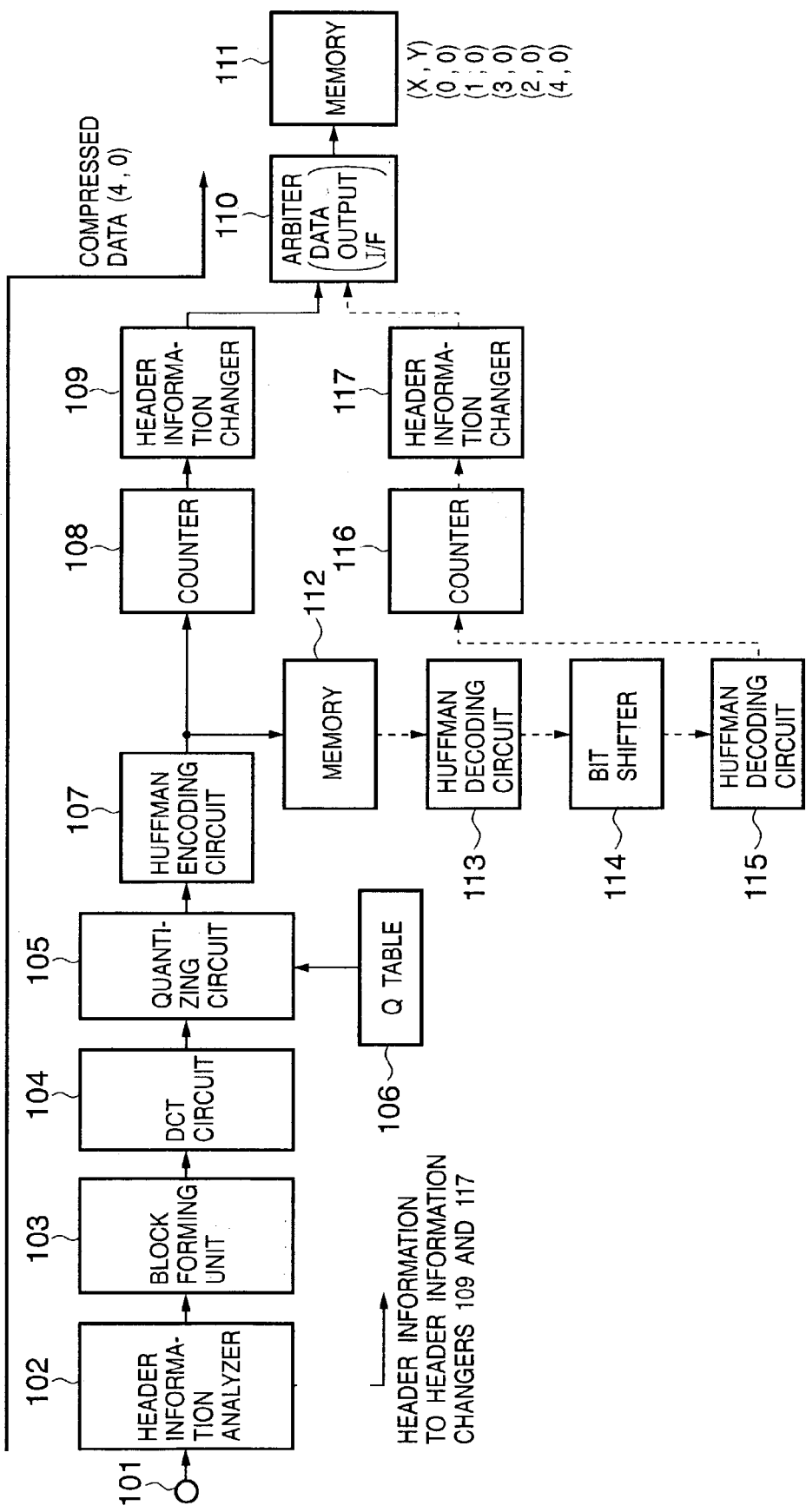
FIG. 20 is a view for explaining compression of data having (4,0) as (X,Y) coordinates in packet data of an 8×8-pixel block.

FIG. 20 is a view for explaining compression of data having (X,Y) coordinates of (4,0), of a packet data block having 8 pixels×8 pixels. Referring to FIG. 20, the compression ratio meets the condition as in the case of (0,0) or (1,0), and the data is stored in the memory 111 without any recompression.

Figure 21:
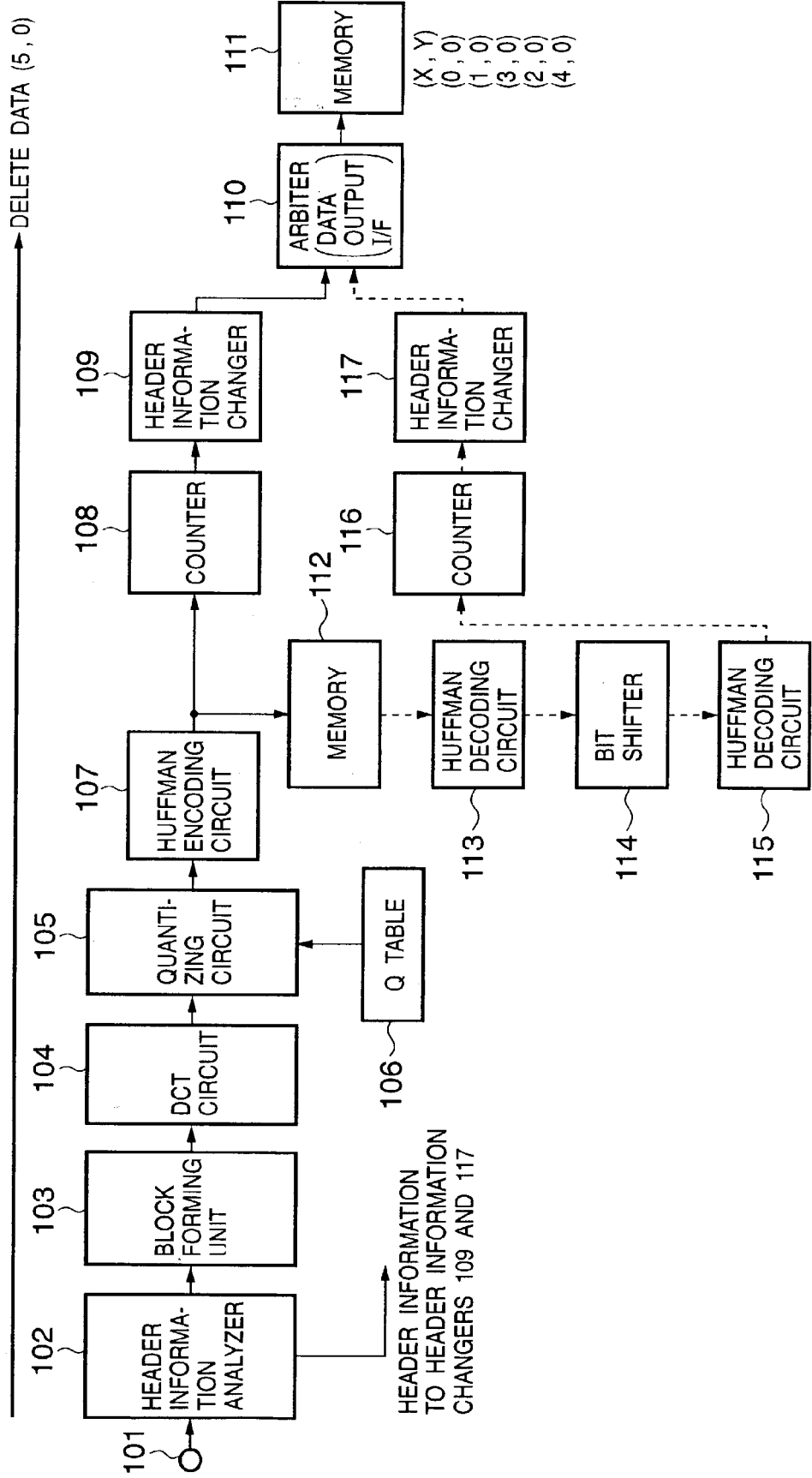
FIG. 21 is a view for explaining compression of image data having (5,0) as (X,Y) coordinates in packet data of an 8×8-pixel block.

FIG. 21 is a view for explaining compression of image data having (X,Y) coordinates of (5,0), of a packet data block having 8 pixels×8 pixels. Image data is input from the input terminal 101, and information of a header portion of the data is read out by the header information analyzer 102. This data is processed by the block forming unit 103 and DCT circuit 104, and quantized by the quantizing circuit 105 by using the Q table 106 having a predicted compression ratio of 1/2 as described previously. After that, the quantized data is encoded by the Huffman encoding circuit 107, and the encoded data is output to the counter 108 and memory 112.

The counter 108 counts the size of the compressed data. Assume that the block (5,0) is compressed to 90 bytes. In the first embodiment as described above, the compressed data amount of one block must be 48 bytes or less. Accordingly, the counter 108 discards this compressed data (5,0) as unstorable data. Also, the header information (5,0) input to the header information changer 109 is similarly discarded, and the next block is subsequently processed.

Figure 22:
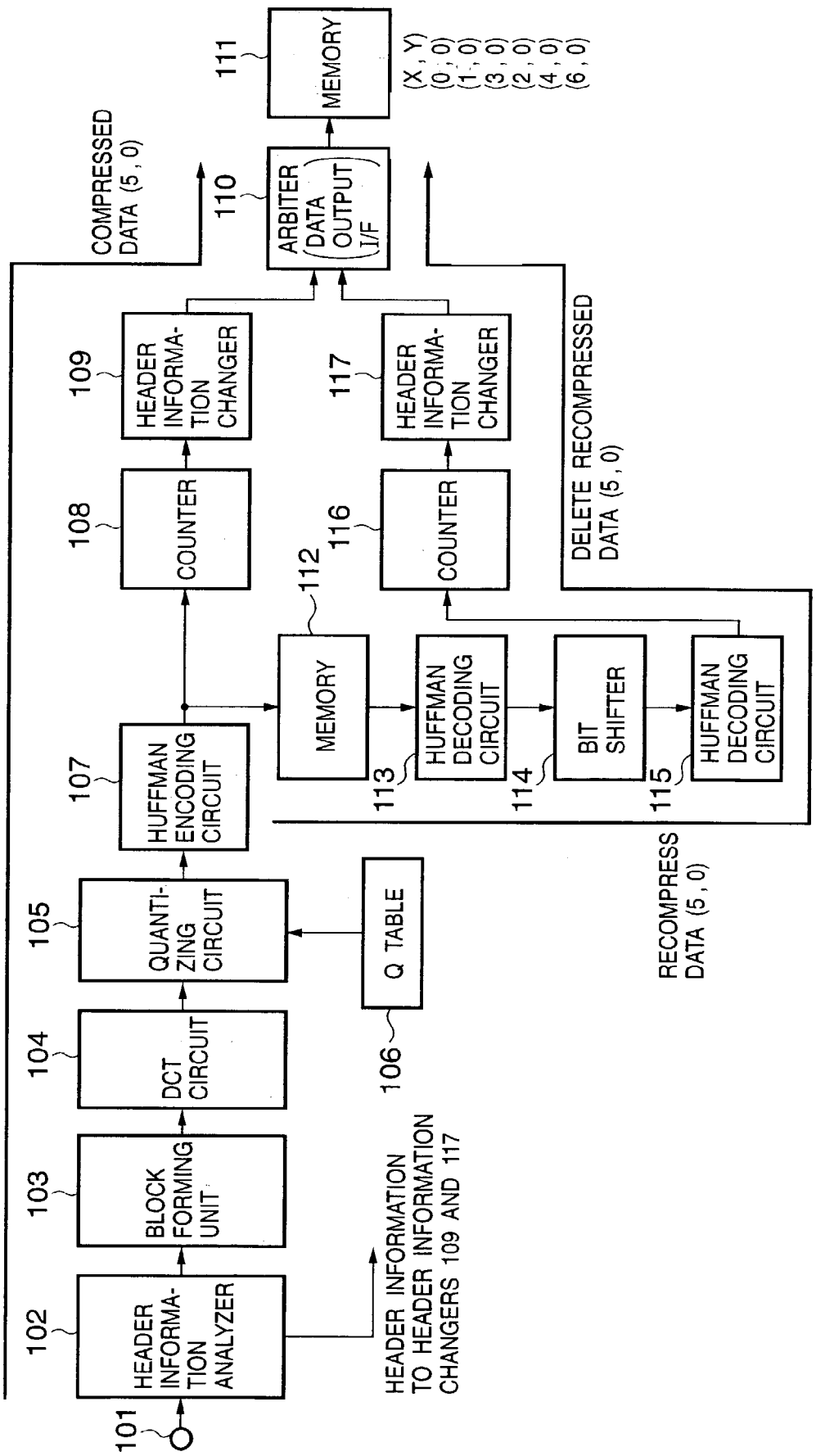
FIG. 22 is a view for explaining processing after the counter 108 determines that the compressed data (5,0) is unstorable.

FIG. 22 is a view for explaining processing after the counter 108 determines that the compressed data (5,0) is unstorable. Similar to FIG. 19, the following compression process is performed while the block (5,0) is recompressed. That is, as shown in FIG. 22, predetermined compression is performed for data of a block (6,0). If the data is compressed to 48 bytes or less, this data is stored as packet data in the memory 111.

Also, when the counter 108 determines that the compressed data of the block (5,0) is unstorable, the compressed data (5,0) compressed by the Q table whose predicted compression ratio is 1/2 and stored in the memory 112 is output to the Huffman decoding circuit 113. The decoded quantized data is shifted one bit by the bit shifter 114 to obtain a 1/2 value. After that, this recompressed data is re-encoded by the Huffman encoding circuit 115 to have a data amount smaller than that of the data compressed by the Q table whose predicted compression ratio is 1/2 and stored in the memory 112. The encoded data is output to the counter 116.

Assume that the data is compressed to 52 bytes when the counter 116 counts the size of this compressed data. In the first embodiment as described above, the compressed data amount of one block must be 48 bytes or less. Accordingly, the counter 116 discards this recompressed data (5,0) as unstorable data.

Figure 23:
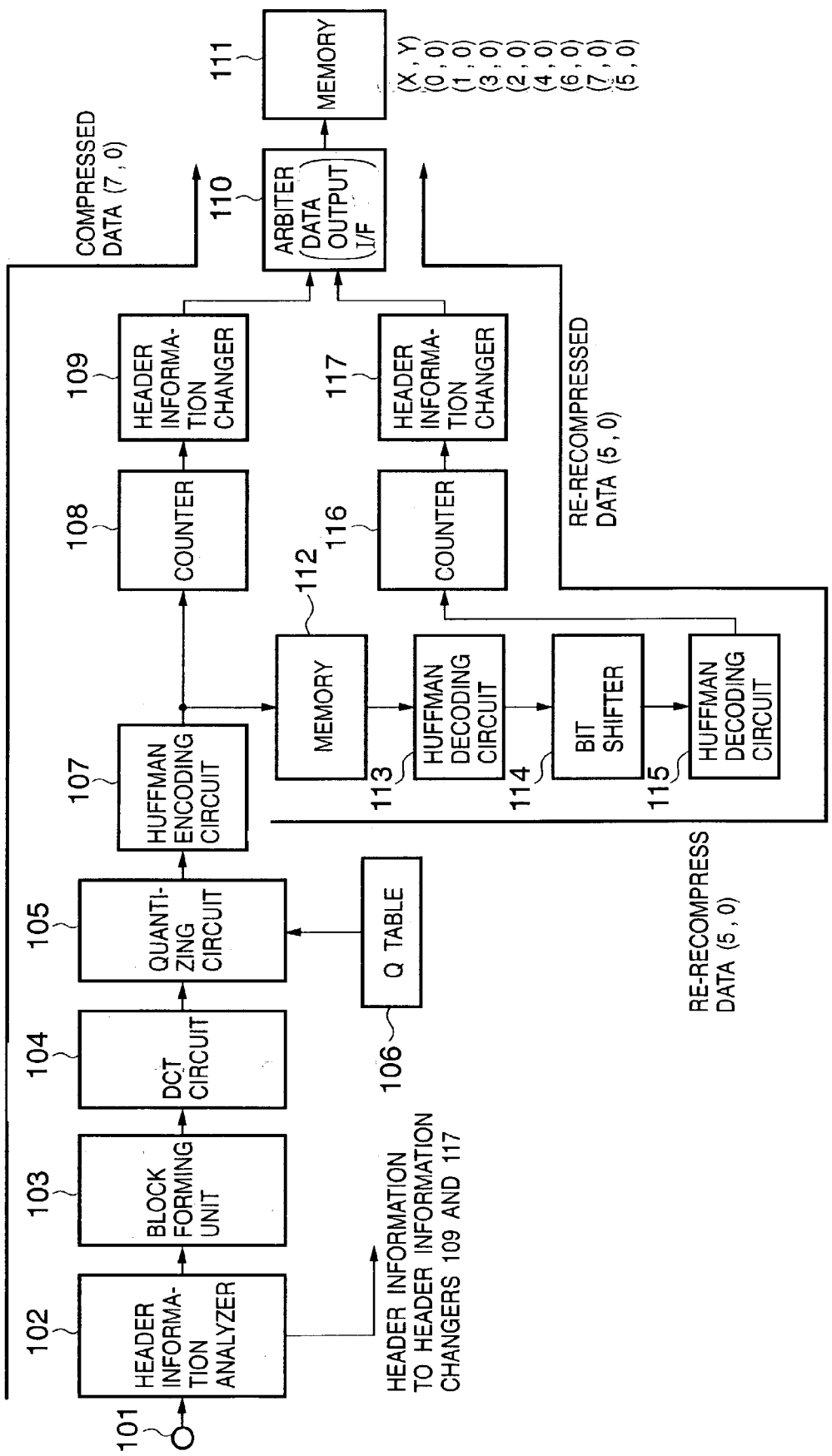
FIG. 23 is a view for explaining processing after a counter 116 determines that recompressed data (5,0) is unstorable.

FIG. 23 is a view for explaining processing after the counter 116 determines that the recompressed data (5,0) is unstorable. As shown in FIG. 23, when the counter 116 determines that the data is unstorable, the compressed data (5,0) compressed by the Q table whose predicted compression ratio is 1/2 and stored in the memory 112 is output to the Huffman decoding circuit 113. The decoded quantized data is shifted two bits by the bit shifter 114 to obtain a 1/4 value. After that, this re-recompressed data is re-encoded by the Huffman encoding circuit 115 to have a data amount smaller than that of the recompressed data previously discarded. The encoded data is output to the counter 116.

Assume that the re-recompressed data is compressed to 31 bytes when the counter 116 counts the size of this re-recompressed data. Since this value is smaller than 48 bytes, the header information changer 117 adds header information to this re-recompressed data (5,0) as storable data, and stores the data in the memory 111.

When the counter 116 determines that the re-recompressed data of the block (5,0) is storable, the compressed data (5,0) compressed by the Q table whose predicted compression ratio is 1/2 and stored in the memory 112 is discarded, and the emptied space is used as a free space for receiving the next data.

Furthermore, the following compression process is performed while the above recompression process is being performed. That is, as shown in FIG. 23, when predetermined compression is performed for data of a block (7,0) and the data is compressed to 48 bytes or less, this data is stored as packet data in the memory 111.

If the compression of (7,0) is complete earlier than the re-recompression of (5,0), this compressed data is stored in the memory 111 through the arbiter 110 earlier than the recompressed data (5,0). Accordingly, the locations of the data are switched at the addresses of the memory 111. As described previously, however, packet data in the memory 111 is managed by a packet table based on header information. Therefore, data can be output on the basis of the original block order when read out from the memory 111.

Figure 24:
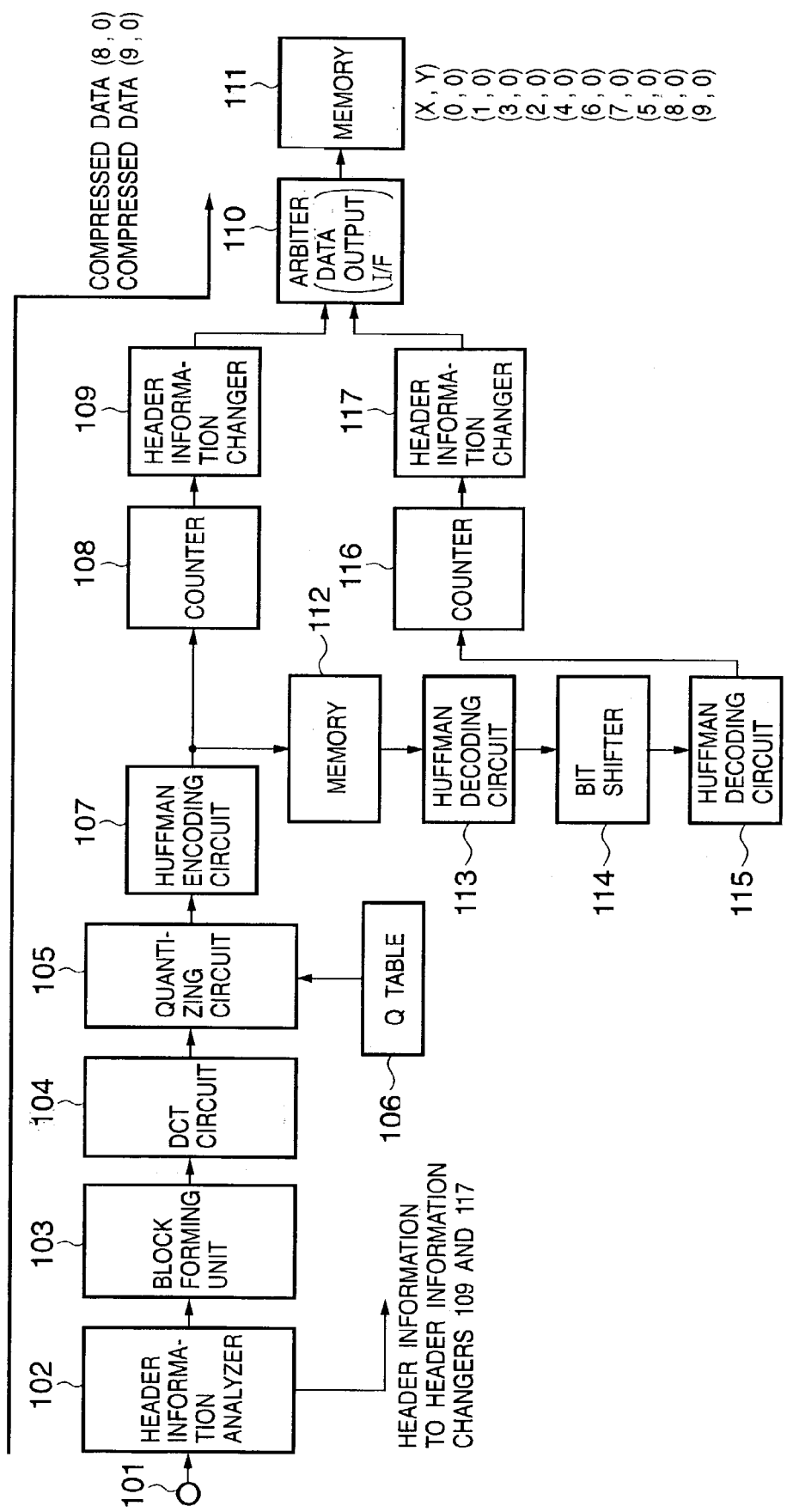
FIG. 24 is a view for explaining compression of data having (8,0) and (9,0) as (X,Y) coordinates in packet data of 8×8-pixel blocks.

FIG. 24 is a view for explaining compression of data having (X,Y) coordinates of (8,0) and (9,0), of packet data blocks each having 8 pixels×8 pixels. Referring to FIG. 24, the compression ratio meets the condition as in the case of (0,0) or (1,0), and the data is normally stored in the memory 111.

Following the procedure as described above, packet data so processed that the compression ratio of each block is 1/4 or less is stored in turn in the memory 111. Consequently, when the memory 111 has a capacity (in this embodiment, 8,000 bytes) capable of storing packet data compressed to 1/4 the original data, compressed data of one image can be reliably stored.

In the first embodiment, the arbiter 110 is included, and the memory 111 is managed using a packet table. Therefore, no processing need be performed by stopping the flow of input image data from the input terminal 101. This realizes real-time processing.

To decode JPEG encoded data compressed as described above, the same Q table as used in encoding must be used. The first embodiment uses only one Q table (predicted compression ratio 1/2) used in the quantizing circuit 105. Accordingly, information indicating how many times 1/2 shift is performed when the compression ratio is less than 1/4 after that is also necessary in decoding.

Figure 25:
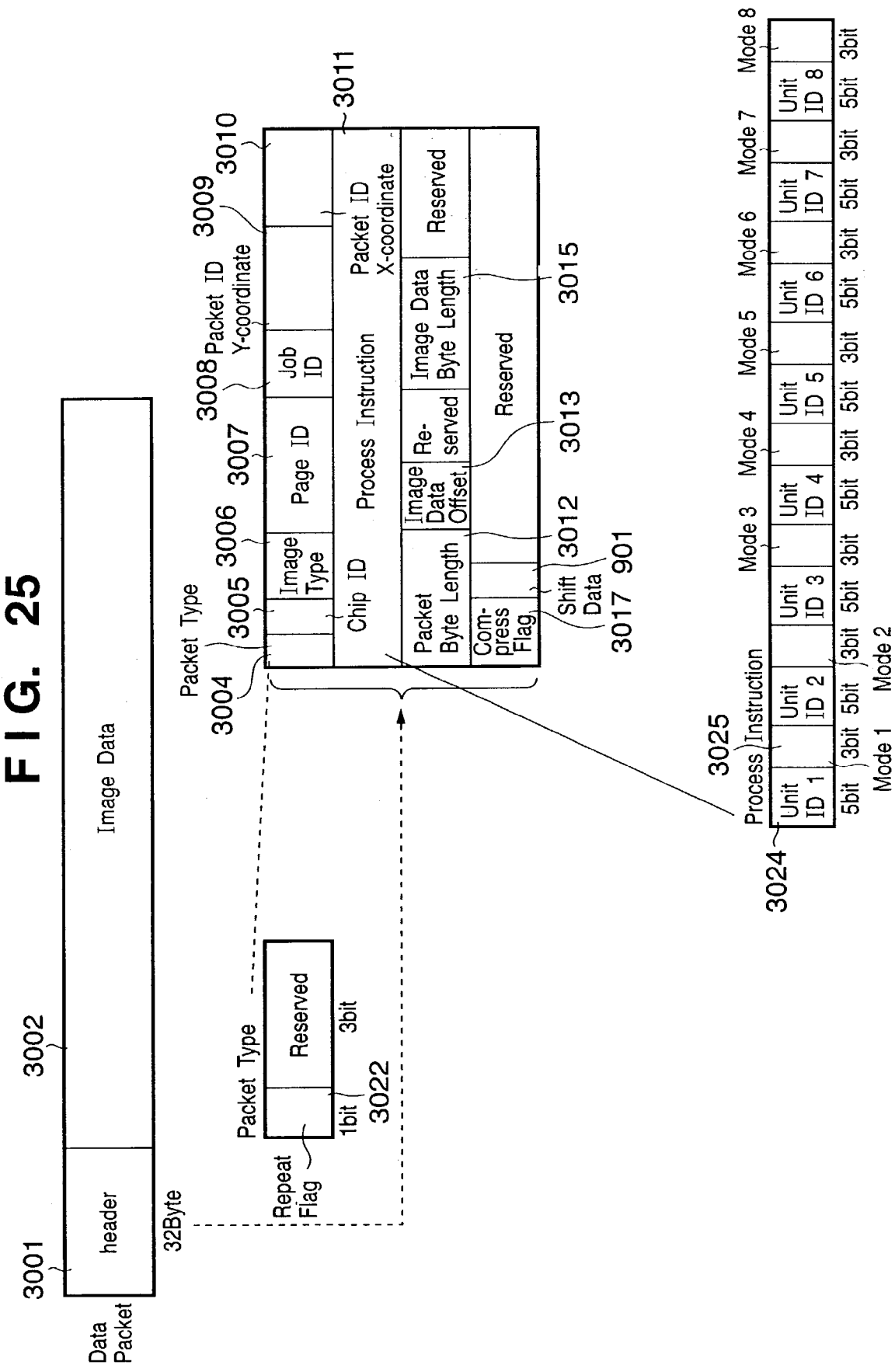
FIG. 25 is a view for explaining a header portion of packet data in the first embodiment.

In the first embodiment, therefore, this information is added to the header portion of packet data explained previously. FIG. 25 is a view for explaining the header portion of packet data in this first embodiment. Referring to FIG. 25, the same reference numerals as in FIG. 3 denote bits having the same functions as portions explained with reference to FIG. 3, and a detailed description thereof will be omitted.

As shown in FIG. 25, shift data 901 for recording the number of times of shift is newly formed as a 3-bit region in the reserved field shown in FIG. 3. To this field, information indicating how many times 1/2 shift is performed for encoded data is added. For example, in the first embodiment, when a compression ratio of 1/4 is met by using a Q table having a predicted compression ratio of 1/2, the shift data is 0. When a compression ratio of 1/4 is met by performing shift once, the shift data is 1. When a compression ratio of 1/4 is met by performing shift twice, the shift data is 2. In this way, the number of times of shift is added.

Decoding is performed by reading out the number of times of shift from the shift data of the header portion, and by using a Q table having a predicted compression ratio of 1/2.

As described above, the image processing apparatus according to the present invention is comprising an input means for inputting image data in the form of packet data, a dividing means for dividing the input image data into predetermined blocks, a compressing means for compressing the image data at a first compression ratio for each divided block, a measuring means for measuring the data amount of the compressed data, a first header information updating means for updating header information of the image data, a storage means for storing the image data, an output means for outputting the image data having the updated header information if the data amount of the image data is equal to or smaller than a predetermined value, a recompressing means for recompressing the image data stored in the storage means at a second compression ratio higher than the first compression ratio if the data amount of the image data is equal to or larger than the predetermined value, and a second header information updating means for updating header information of the recompressed image data.

The image processing apparatus according to the present invention is wherein the recompressing means comprises a decoding means for decoding the compressed image data, a bit shifting means for shifting a bit string of the decoded image data by a predetermined number of bits, and a second encoding means for encoding the image data having the bit-shifted bit string.

The image processing apparatus according to the present invention is wherein the compressing means comprises a frequency converting means for converting the frequency of the image data and calculating a conversion coefficient for each divided block, a quantizing means for quantizing the calculated conversion coefficient by using a predetermined quantization table, and a first encoding means for encoding the quantized conversion coefficient.

The image forming apparatus according to the present invention is wherein the dividing means divides the input image data into 8×8-pixel blocks. The image forming apparatus according to the present invention is wherein the frequency conversion is discrete cosine transform. The image forming apparatus according to the present invention is wherein the first encoding means performs Huffman encoding.

The image forming apparatus according to the present invention is wherein the compressing means performs JPEG compression. The image forming apparatus according to the present invention is wherein if the data amount of the image data is equal to or larger than the predetermined value, the image data stored in the storage means is discarded.

The image forming apparatus according to the present invention is wherein one of the first and second header information updating means comprises analyzing means for analyzing header information of image data, and changing means for discarding the header information and changing the header information to new header information on the basis of the result of analysis if the data amount of the image data is equal to or larger than the predetermined value.

Second Embodiment

In the first embodiment described above, recompression is performed when the compression ratio obtained by bit shift is larger than the memory capacity or when the data amount is larger than a predetermined data amount. In the second embodiment, recompression is performed using a plurality of Q tables to achieve a target compression ratio more precisely.

Figure 26:
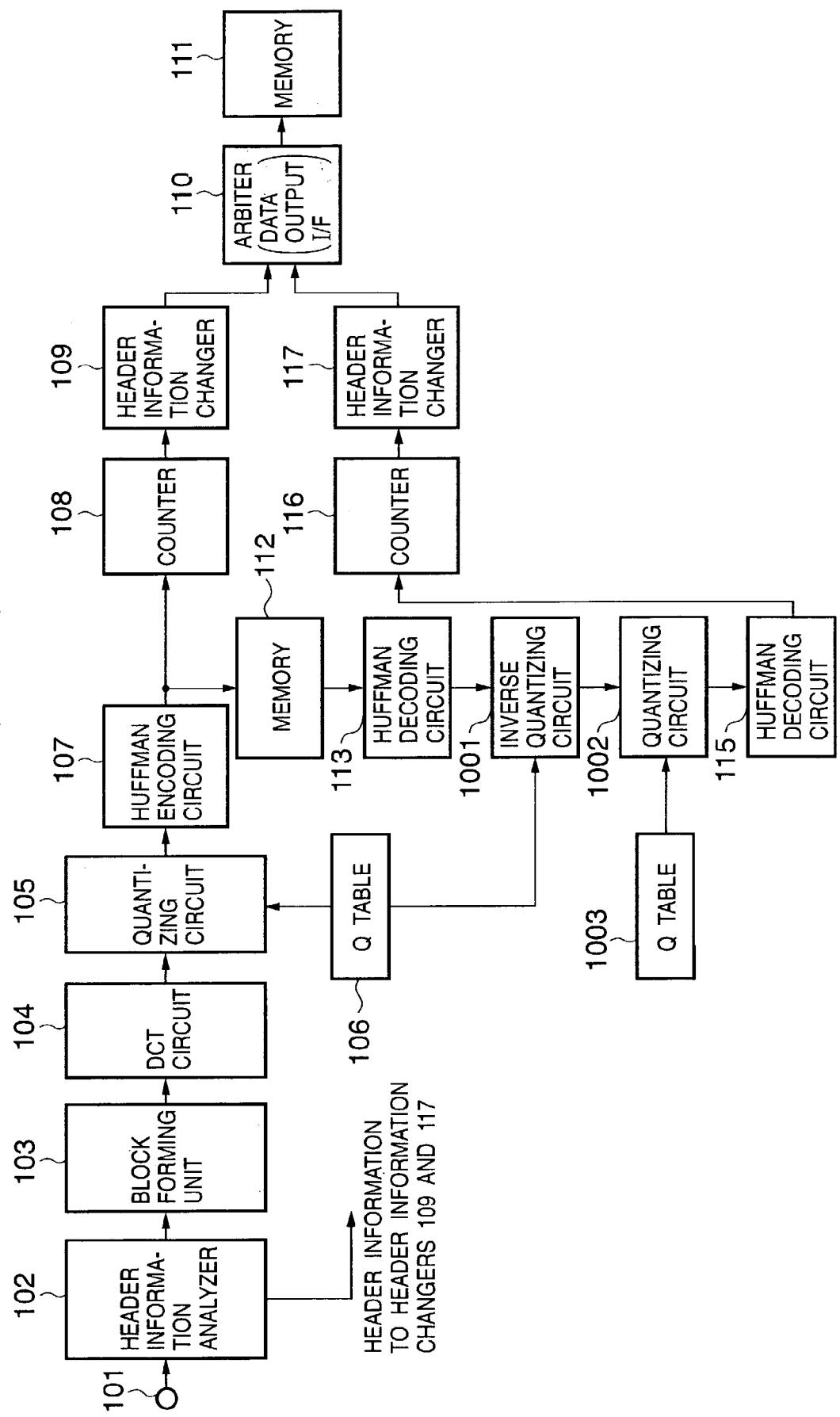
FIG. 26 is a block diagram showing details of the arrangement of a tile compressor A of tile compressors 2106 according to the second embodiment.

FIG. 26 is a block diagram showing details of the arrangement of a tile compressor A of tile compressors 2106 in the second embodiment. Referring to FIG. 26, the same reference numerals as in FIG. 15 denote blocks having the same functions as the blocks explained in the first embodiment, and a detailed description thereof will be omitted.

A memory 111 in FIG. 26 corresponds to the RAM 2002 in FIG. 1. Image ring interfaces 2102 and 2148, system bus bridge 2007, and RAM controller 2124 are omitted from FIG. 26. Referring to FIG. 26, an input terminal 101 is a data input interface for inputting image data from a tile bus 2107.

A header information analyzer 102 reads out information of a header portion of input image data from this input terminal 101, and outputs as header information to header information changers 109 and 117.

The input image data is cut into 8×8-pixel blocks by a block forming unit 103. A discrete cosine transform (DCT) circuit 104 performs discrete cosine transform for these blocks, and the transform coefficients are supplied to a quantizing circuit 105. This quantizing circuit 105 linearly quantizes the transform coefficients in accordance with quantization step information applied by a quantization table (Q table) 106.

The output quantized data from the quantizing circuit 105 is input to a Huffman encoding circuit 107 where the data is compression-coded in accordance with the coding method described previously. The quantized data encoded by this Huffman encoding circuit 107 is input to a counter 108 which counts a data amount to which the image data is compressed. If this data amount is larger than a predetermined data amount, this information is notified to a CPU 2001, the data is discarded, and the next image data is subsequently processed.

The result of counting by the counter 108 and the compressed image data are input to the header information changer 109. This header information changer 109 rewrites information such as a compress flag and image data byte length, on the basis of the header information transferred from the header information analyzer 102 beforehand. If the result of counting by the counter 108 is larger than the predetermined data amount, this information is notified to the CPU 2001, header information corresponding to the data is discarded, and the next image data is subsequently processed.

The packet data whose header is rewritten by the header information changer 109 is stored in the memory 111 via an arbiter (data output I/F) 110. The output encoded data from the Huffman encoding circuit 107 is also input to a memory 112. Note that inputting and outputting of data with respect to this memory 112 are controlled by the CPU 2001.

Output data from the memory 112 is decoded into the original quantization table by a Huffman decoding circuit 113. The decoded data is returned to the DCT data by inverse quantization performed by an inverse quantizing circuit 1001. The Q table 106 is used in this inverse quantization.

The inversely quantized DCT data is input to a quantizing circuit 1002 and re-quantized. A Q table 1003 used in this quantization has a higher compression ratio than the predicted compression ratio of the table used in the previous quantization. The data quantized by the quantizing circuit 1002 is input to a Huffman encoding circuit 115 and re-encoded.

This data encoded by the Huffman encoding circuit 115 is input to a counter 116 which counts a data amount to which this recompressed image data is compressed. If this data amount is larger than a predetermined data amount (e.g., the memory capacity), this information is notified to the CPU 2001, the data is discarded, and the next image data is subsequently processed. Note that this next image data is output from the memory 112.

The result of counting by the counter 116 and the compressed image data are input to the header information changer 117. This header information changer 117 rewrites information such as a compress flag and image data byte length, on the basis of the header information transferred from the header information analyzer 102 beforehand. The packet data whose header is written by the header information changer 117 is stored in the memory 111 via the arbiter (data output I/F) 110.

A method of compressing data in real time at a minimal compression ratio by which the compressed data can be stored in, the memory 111 of the tile compressor A of the tile compressors 2106 having the above configuration will be explained below. As in the first embodiment, an RGB multi-level color image having 80 pixels×80 pixels is processed in the second embodiment. This image data has 8-bit data per pixel for each of R, G, and B, and can express 256 gray levels.

First, a memory capacity required when this image data in an uncompressed state is stored as packet data in the memory by adding the header information described previously to the data will be explained. The image data has a data amount of eight bits per pixel for each of R, G, and B, so the data amount of one pixel is 8 bits×3=24 bits (3 bytes). Since one packet is formed by 8 pixels×8 pixels, the data amount per packet is 8×8×3 bytes=192 bytes. Also, since 32-byte header information is added as described previously, the total data amount of one packet is 224 bytes. Accordingly, an image of 80 pixels×80 pixels has data of 100 packets as a whole, so one uncompressed image data has a data amount of 224 bytes×100=22,400 bytes.

In practice, a memory having a very large capacity must be prepared because the data amount to be processed may increase when the number of gray levels per pixel or the resolution is increased, or large image data need be processed in some cases. Therefore, it is necessary to reduce the memory capacity or facilitate data handling by data compression processes represented by JPEG.

An example of calculation of a capacity necessary for a memory on the assumption that data compression by which the predicted compression ratio is 1/4 is performed by JPEG processing will be described below. As described above, the original image data is 80×80-pixel image data having an 8-bit data amount per pixel for each of R, G, and B. In this case, the data amount per pixel is 8 bits×3=24 bits (3 bytes) Since one packet is formed by 8 pixels×8 pixels, the data amount per packet is 8×8×3 bytes=192 bytes. Assume that this packet data is compressed by JPEG processing. If the predicted compression ratio is set to 1/4 and the data is exactly compressed by this compression ratio, the data amount per packet is 192 bytes/4=48 bytes.

Also, since the 32-byte header information is added to each packet as described above, the data amount per packet is 80 bytes. Accordingly, 80×80-pixel image data has data of 100 packets as a whole, so one uncompressed image data has a data amount of 80 bytes×100=8,000 bytes. That is, to store data subjected to JPEG processing by a predicted compression ratio of 1/4 into a memory, an 8,000-byte memory need only be prepared.

Figure 27:
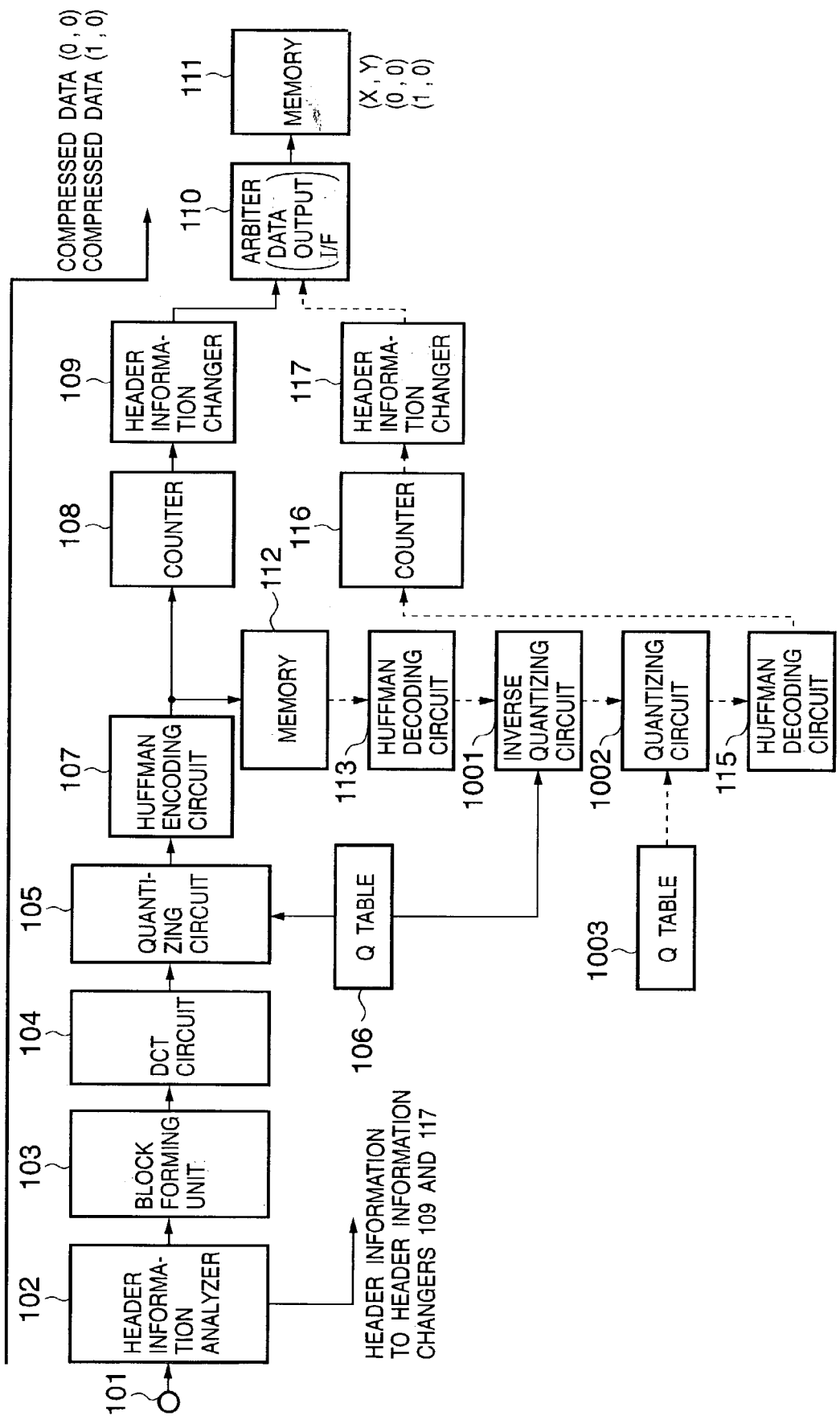
FIG. 27 is a view for explaining compression of image data having (0,0) and (1,0) as (X,Y) coordinates in packet data of 8×8-pixel blocks.

The contents of data processing in the individual blocks will be explained in turn. FIG. 27 is a view for explaining compression of image data having (X,Y) coordinates of (0,0) and (1,0), of packet data blocks each having 8 pixels×8 pixels. Referring to FIG. 27, information of a header portion of image data input from the input terminal 101 is read out, and the data is subjected to block formation and DCT. This image data is quantized by the quantizing circuit 105 by using the Q table 106 having a predicted compression ratio of 1/2. After that, the quantized data is encoded by the Huffman encoding circuit 107, and the encoded data is output to the counter 108 and memory 112.

The counter 108 counts the size of the compressed data. Assume that the block (0,0) is compressed to 45 bytes, and the block (1,0) is compressed to 39 bytes. In this embodiment, the capacity of the memory for storing compressed data is suitable for data compressed by a compression ratio of 1/4 or less. So, the compressed data amount of one block need only be 48 bytes or less. Accordingly, header information is added to each of the compressed data (0,0) and (1,0) as storable data, and the data is stored in the memory 111.

When the counter 108 determines that the compressed data is storable, the compressed data (0,0) and (1,0) compressed by the Q table whose predicted compression ratio is 1/2 and stored in the memory 112 are discarded, and the emptied spaces are used are free spaces for receiving the next data.

Figure 28:
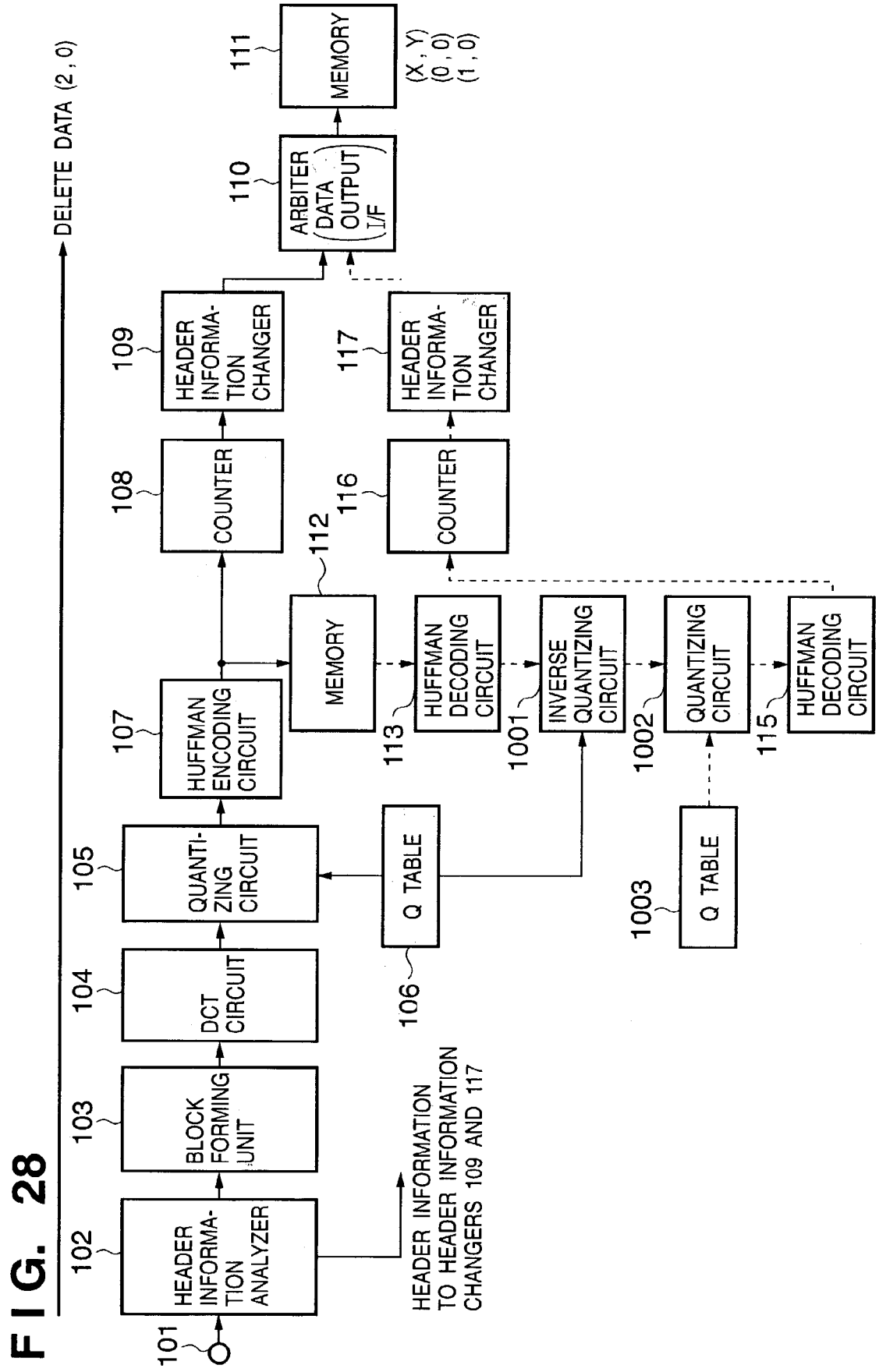
FIG. 28 is a view for explaining compression of image data having (2,0) as (X,Y) coordinates in packet data of an 8×8-pixel block.

FIG. 28 is a view for explaining compression of image data having (X,Y) coordinates of (2,0), of a packet data block having 8 pixels×8 pixels. Referring to FIG. 28, information of a header portion of image data input from the input terminal 101 is read out, and the data is subjected to block formation and DCT. This image data is quantized by the quantizing circuit 105 by using the Q table 106 having a predicted compression ratio of 1/2. After that, the quantized data is encoded by the Huffman encoding circuit 107, and the encoded data is output to the counter 108 and memory 112.

The counter 108 counts the size of the compressed data. Assume that the block (2,0) is compressed to 64 bytes. In this embodiment as described above, the compressed data amount of one block must be 48 bytes or less. Accordingly, the counter 108 discards this compressed data (2,0) as unstorable data. Also, the header information (2,0) input to the header information changer 109 is similarly discarded, and the next block is subsequently processed.

Figure 29:
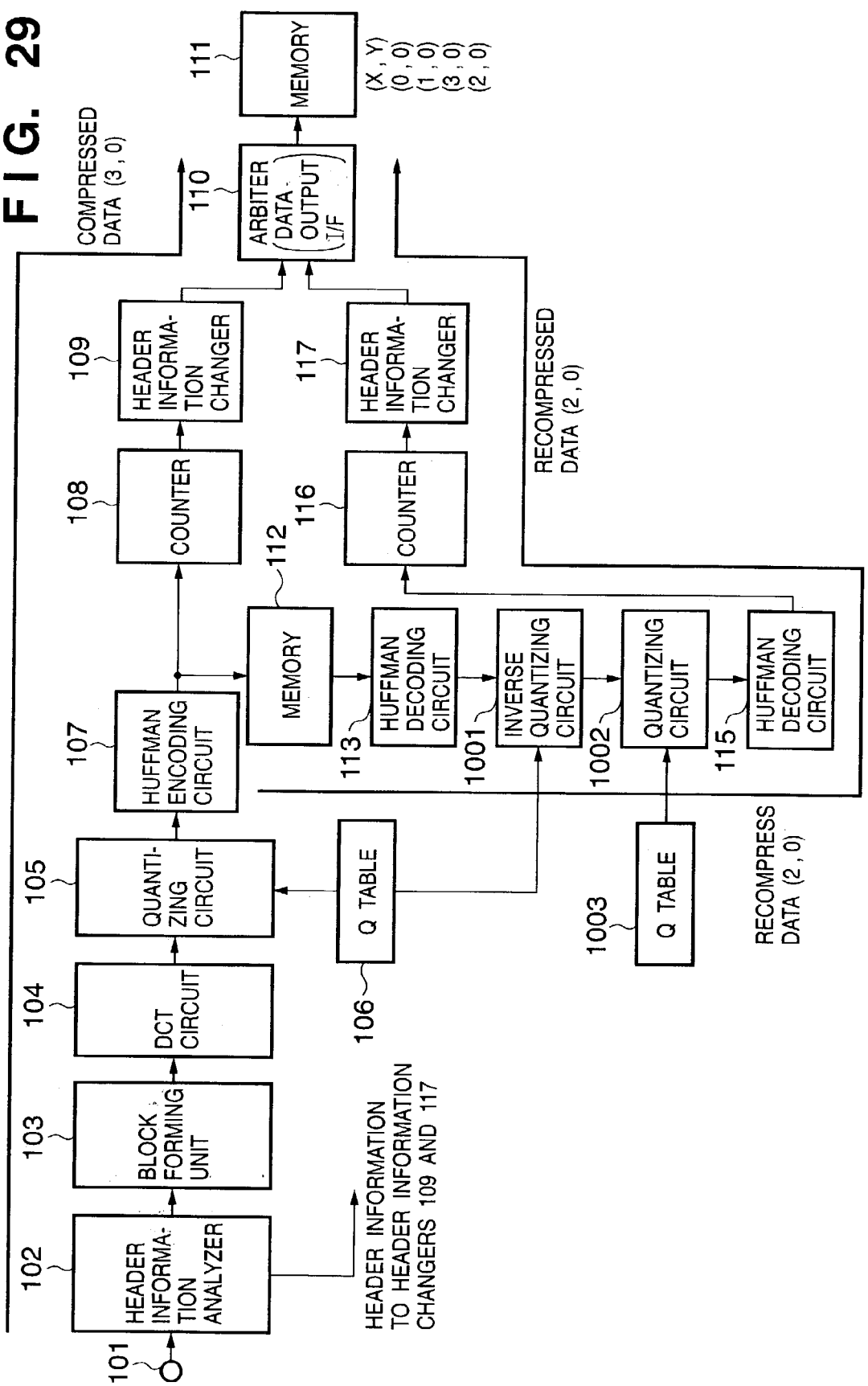
FIG. 29 is a view for explaining processing after a counter 108 determines that the compressed data (2,0) is unstorable.

FIG. 29 is a view for explaining processing after the counter 108 determines that the compressed data (2,0) is unstorable. Referring to FIG. 29, when the counter 108 determines that the compressed data is unstorable, the compressed data (2,0) compressed by the Q table whose predicted compression ratio is 1/2 and stored in the memory 112 is output to the Huffman decoding circuit 113. The decoded quantized data is input to the inverse quantizing circuit 1001, and returned to the DCT data as it is inversely quantized on the basis of the Q table used in the previous quantization.

The inversely quantized DCT data is re-quantized by the quantizing circuit 1002. The Q table used in this quantization has a predicted compression ratio of 1/3. This data re-quantized by the Q table having a predicted compression ratio of 1/3 is re-encoded by the Huffman encoding circuit 115, and output to the counter 116.

Assume that the recompressed data is compressed to 43 bytes when the counter 116 counts the size of this recompressed data. Since this value is smaller than 48 bytes, the header information changer 117 adds header information to this recompressed data (2,0) as storable data, and stores the data in the memory 111.

When the counter 116 determines that the data is storable, the compressed data (2,0) compressed by the Q table whose predicted compression ratio is 1/2 and stored in the memory 112 is cleared, and the emptied space is used as a free space for receiving the next data.

Note that the following compression process is performed while the above recompression process is being performed. That is, as shown in FIG. 29, when predetermined compression is performed for data of a block (3,0) and the data is compressed to 48 bytes or less, this packet data is stored in the memory 111.

If the compression of (3,0) is complete earlier than the recompression of (2,0), the compressed data (3,0) is stored in the memory 111 through the arbiter 110 earlier than the recompressed data (2,0). In this case, the locations of the data are switched at the addresses of the memory 111. As described previously, however, packet data in the memory 111 is managed by a packet table based on header information. Therefore, data can be output on the basis of the original block order when read out from the memory 111.

In this embodiment, a method of performing second recompression by using the Q table having a predicted compression ratio of 1/3 is explained. However, it is also possible to perform recompression by using a Q table having a predicted compression ratio of 5/12, 11/24, or the like, i.e., by using a Q table having a finer step. In this case, data can be coded at an optimal compression ratio closer to a compression ratio of 1/4. In addition, best image data within the range over which the memory capacity is satisfied can be stored in the memory.

As described above, recompression when the predicted compression ratio is not reached is performed by preparing a plurality of Q tables. Accordingly, it is possible to set finer compression ratios than in the method of recompression using bit shift as performed in the first embodiment, and to select an optimal compression ratio within the prepared memory capacity.

Also, to decode JPEG encoded data compressed as described above, the same Q table as used in encoding must be used. In this embodiment, information of the Q table (predicted compression ratio 1/2) used in the quantizing circuit 105 or the Q table used in re-encoding is necessary for decoding.

Figure 30:
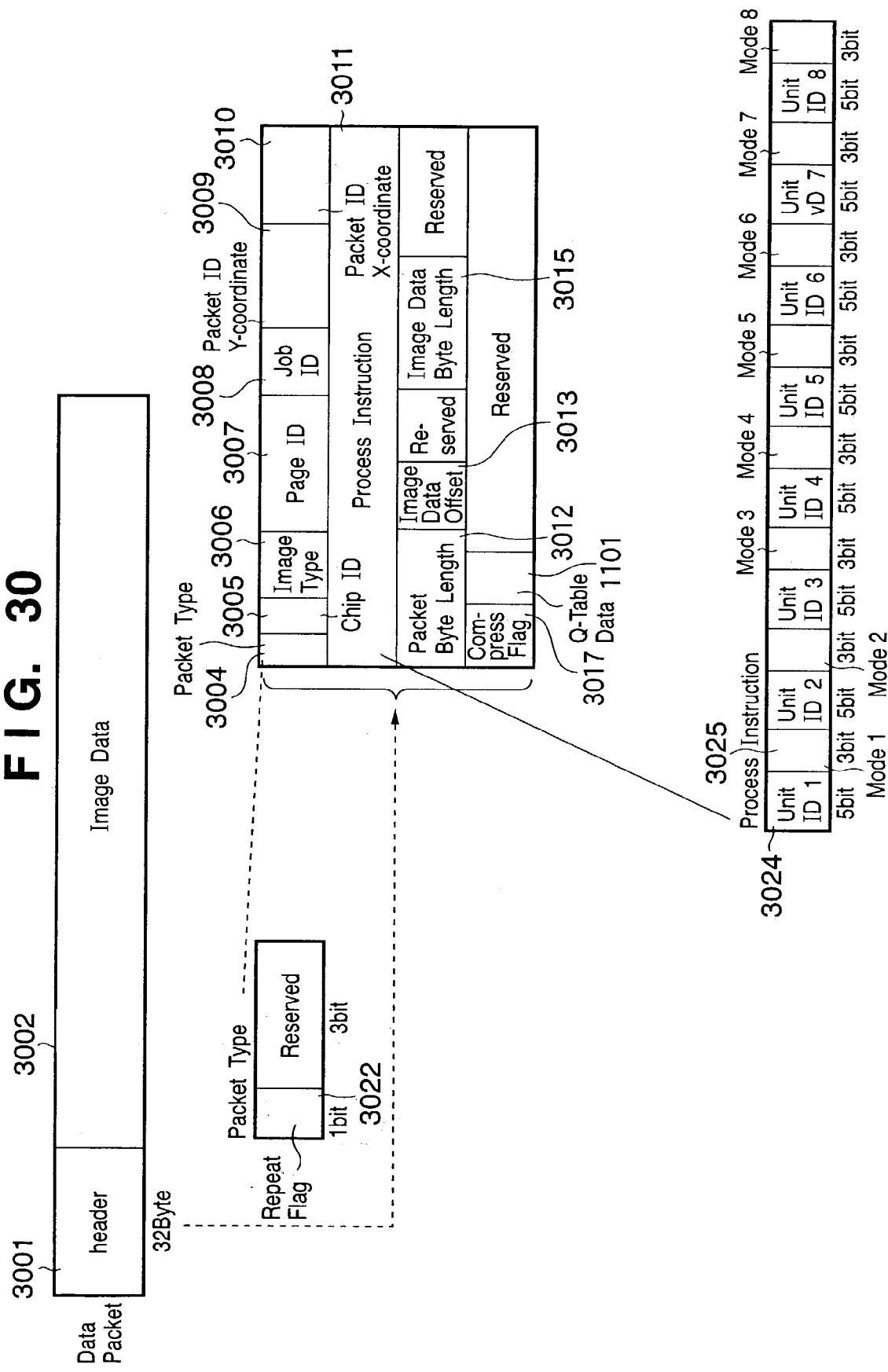
FIG. 30 is a schematic view for explaining details of the arrangement of a header portion of packet data in the second embodiment.

In this embodiment, therefore, this information is added to the header portion of the packet data explained earlier. FIG. 30 is a schematic view for explaining details of the structure of the header portion of the packet header in the second embodiment. Referring to FIG. 30, the same reference numerals as in FIG. 3 denote bits having the same functions as portions explained with reference to FIG. 3, and a detailed description thereof will be omitted.

As shown in FIG. 30, Q-table data 1101 for recording the number of times of shift is newly formed as a 3-bit region in the reserved field shown in FIG. 3. To this field, information concerning the Q table used in quantization is added. For example, in this embodiment, when a Q table having a predicted compression ratio of 1/2 is used, the value of the Q-table data is 0. Likewise, the values of the Q-table data are 1 and 2 when compression ratios of 1/3 and 1/4 are met, respectively. In this way, information is added such that the value of the Q-table data and the Q table used are related.

Decoding is performed by reading out the predicted compression ratio of the Q table used from the Q-table data in the header portion, and using the readout compression ratio in re-quantization.

As described above, an image processing apparatus according to the present invention is comprising an input means for inputting image data in the form of packet data, a dividing means for dividing the input image data into predetermined blocks, a compressing means for compressing the image data at a first compression ratio for each divided block, a measuring means for measuring the data amount of the compressed data, a first header information updating means for updating header information of the image data, a storage means for storing the image data, an output means for outputting the image data having the updated header information if the data amount of the image data is equal to or smaller than a predetermined value, a recompressing means for recompressing the image data stored in the storage means at a second compression ratio higher than the first compression ratio if the data amount of the image data is equal to or larger than the predetermined value, and a second header information updating means for updating header information of the recompressed image data, wherein the recompressing means comprises a decoding means for decoding the compressed image data, an inverse quantizing means for inversely quantizing the image data on the basis of the first compression ratio, a quantizing means for quantizing the image data by using a predetermined quantization table, and an encoding means for encoding a quantized conversion coefficient.

The image processing apparatus according to the present invention is wherein the compressing means comprises a frequency converting means for converting the frequency of the image data and calculating a conversion coefficient for each divided block, a quantizing means for quantizing the calculated conversion coefficient by using a predetermined quantization table, and a first encoding means for encoding the quantized conversion coefficient. The image processing apparatus according to the present invention is wherein the dividing means divides the input image data into 8×8-pixel blocks.

The image processing apparatus according to the present invention is wherein the frequency conversion is discrete cosine transform. The image processing apparatus according to the present invention is wherein the first encoding means performs Huffman encoding. The image processing apparatus according to the present invention is wherein the compressing means performs JPEG compression.

The image processing apparatus according to the present invention is wherein if the data amount of the image data is equal to or larger than the predetermined value, the image data stored in the storage means is discarded. The image processing apparatus according to the present invention is wherein one of the first and second header information updating means comprises an analyzing means for analyzing header information of image data, and a changing means for discarding the header information and changing the header information to new header information on the basis of the result of analysis if the data amount of the image data is equal to or larger than the predetermined value.

Third Embodiment

The whole configuration of an image processing apparatus according to this embodiment is the same as that shown in FIG. 1 explained in the first embodiment.

Figure 31:
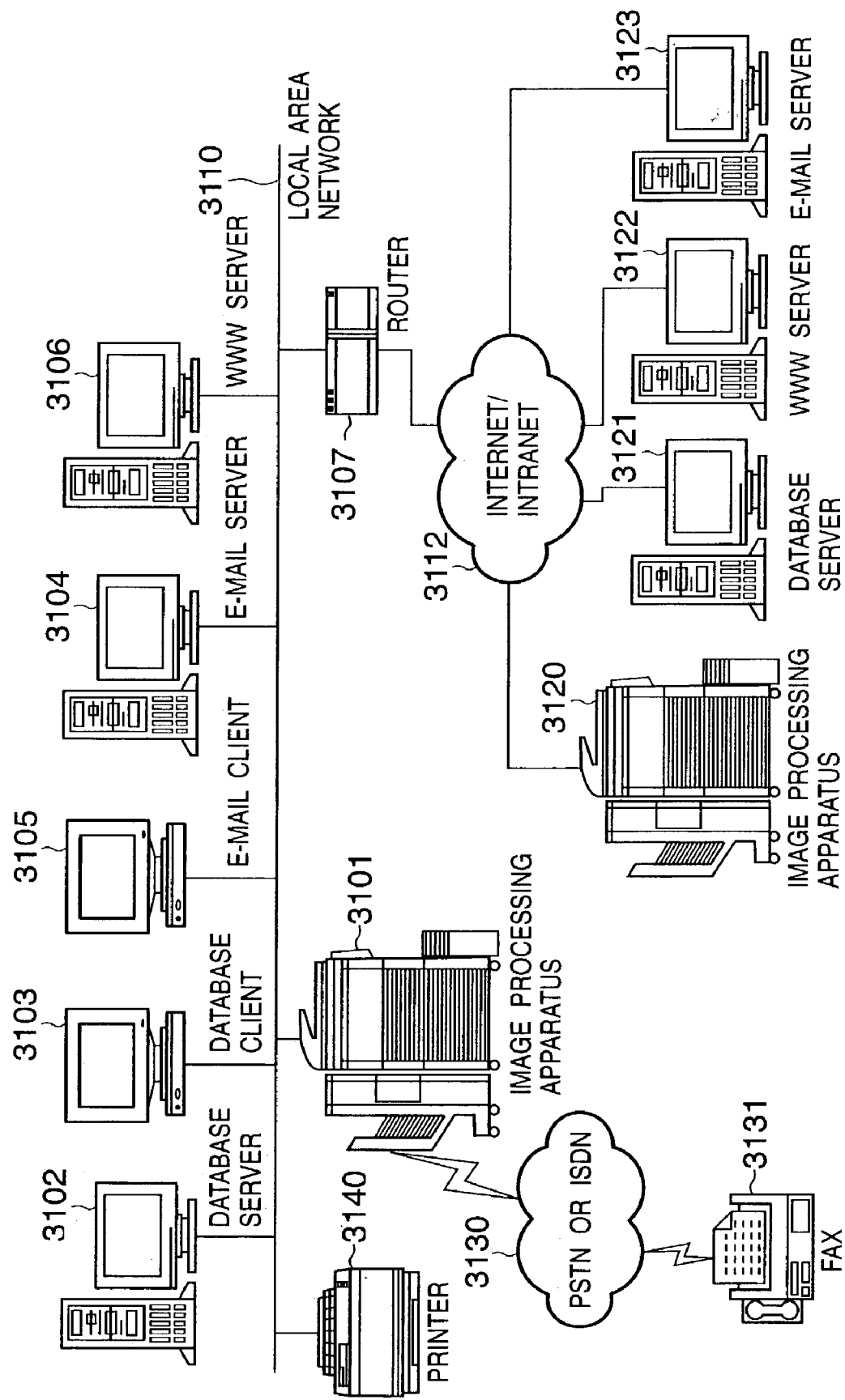
FIG. 31 is a schematic view for explaining the actual use environment of the whole system using the image processing apparatus according to the present invention.

FIG. 31 is a schematic view for explaining the environment in which the entire system using the image processing apparatus according to the present invention is actually used.

Referring to FIG. 31, an image processing apparatus 3101 according to this embodiment is connected to a scanner and printer. This image processing apparatus 3101 can supply image data read from the scanner to a local area network (LAN) 3110, and print image data received from the LAN by the printer. The image processing apparatus 3101 can also transmit an image read from the scanner to a PSTN or ISDN 3130 by a FAX transmitter (not shown), and print image data received from a FAX apparatus 3131 in a remote place or the like via the PSTN or ISDN 3130 by using the printer. A database server 3102 is a device which manages binary images and multilevel images read by the image processing apparatus 3101.

A database client 3103 is a database client device of the database server 3102, and can, e.g., browse and search for image data saved in the database 3102. An e-mail server 3104 can receive image data read by the image processing apparatus 3101 as a file attached to e-mail. An e-mail client 3105 is an e-mail client device capable of receiving and browsing mail received by the e-mail server 3104 and transmitting e-mail.

A WWW server 3106 provides HTML documents to the LAN. These HTML documents provided by the WWW server 3106 can be printed by using the image processing apparatus 3101. A router 3107 connects the LAN 3110 to an Internet/intranet 3112. This Internet/intranet 3112 is connected to a database server 3121, WWW server 3122, e-mail server 3123, and image processing apparatus 3120 having the same arrangements as the database server 3102, WWW server 3106, e-mail server 3104, and image processing apparatus 3101, respectively. Also, a printer 3140 is connected to the LAN 3110 and can print image data read by the image processing apparatus 3101.

Figure 32:
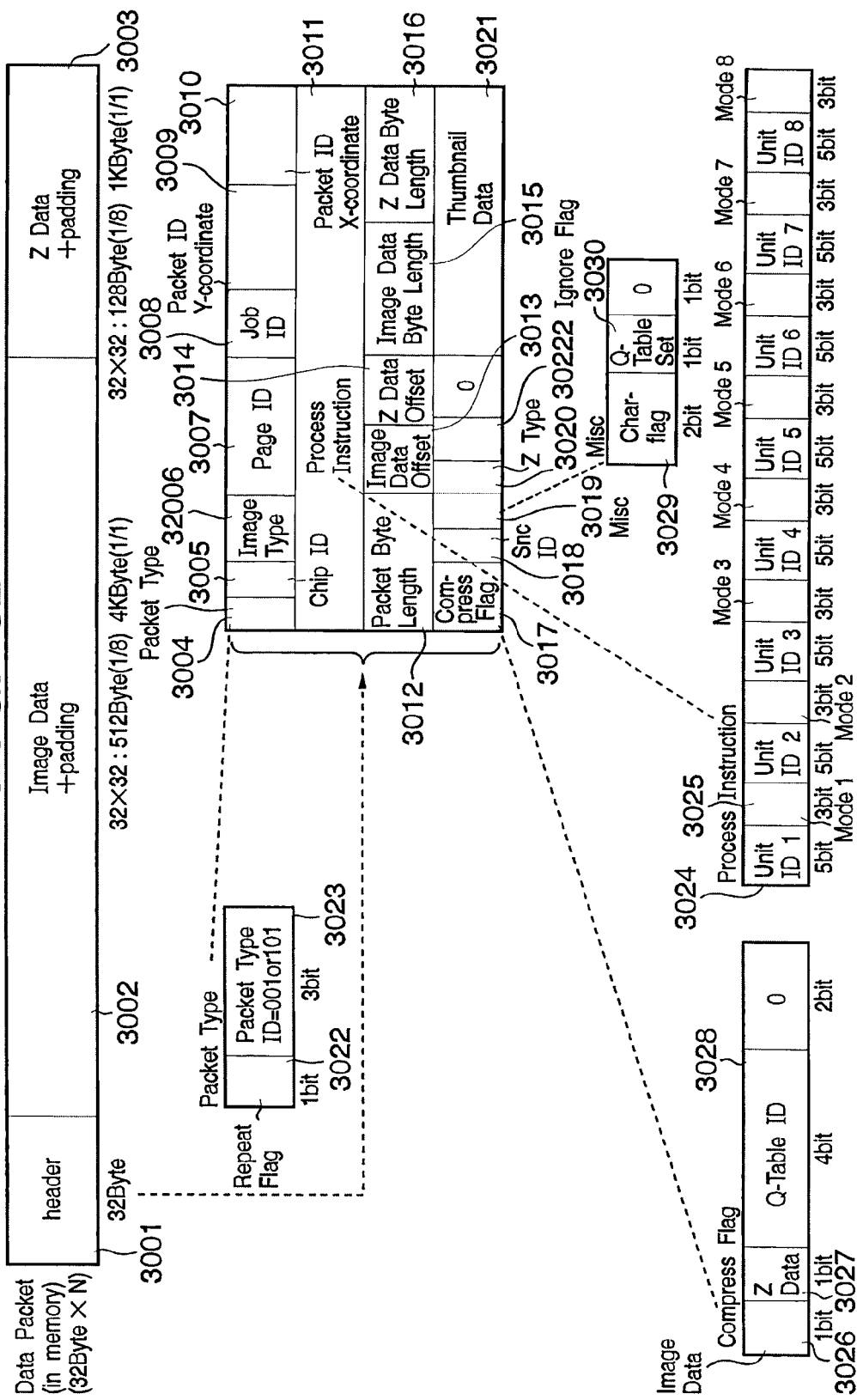
FIG. 32 is a view for explaining the data structure of a data packet.
Figure 33:
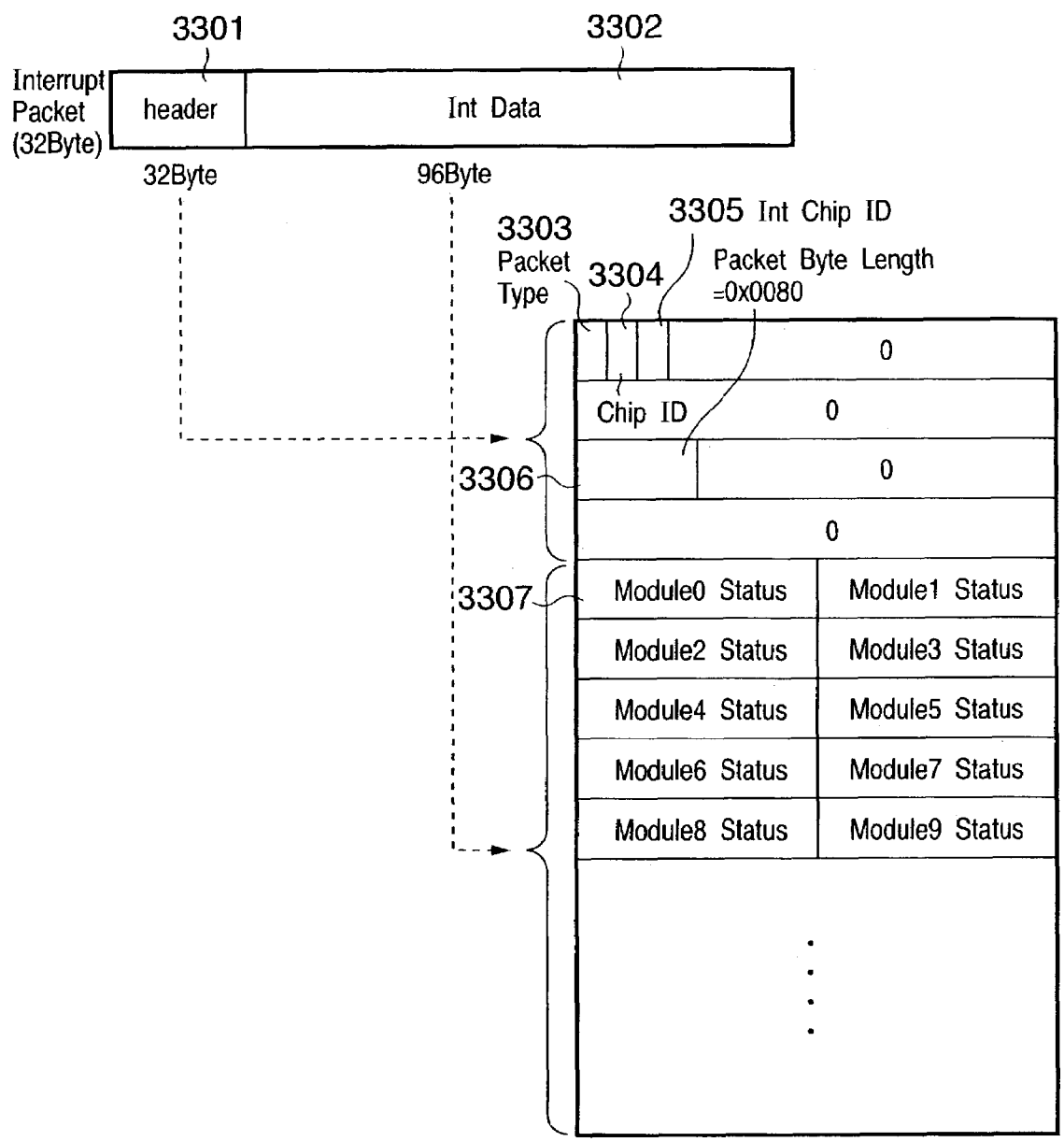
FIG. 33 is a view for explaining the data structure of an interrupt packet.

In the controller unit 2000 in the embodiment shown in FIG. 1, image data, commands from the CPU 2001, and interrupt information issued by each block are transferred in a packeted data form. This embodiment uses three different types of packets, i.e., a data packet shown in FIG. 32, a command packet shown in FIG. 34, and an interrupt packet shown in FIG. 33. FIG. 32 is a view for explaining the data structure of the data packet. FIG. 33 is a view for explaining the data structure of the interrupt packet.

First, the structure of the data packet will be explained below with reference to FIG. 32. In this embodiment, image data is divided into image data 3002 as tiles each having 32 pixels×32 pixels. A data packet is formed by adding, e.g., necessary header information 3001 and image additional information 3003 to this tile image. Padding data is added between the image data 3002 and image additional information 3003, and after the image additional information 3003.

Information contained in the header information 3001 will be described below. In this embodiment, packets are classified into a data packet, command packet, and interrupt packet in accordance with the value of packet type ID 3023 in packet type 3004 in the header information 3001. In this embodiment, 001b or 101b (data packet), 010b (command packet), or 100b (interrupt packet) is assigned to three bits of this packet type ID.

The packet type 3004 contains repeat flag 3022. If the image data 3002, the image additional information 3003, and predetermined information in the header information 3001 of a data packet match those of a data packet output to a system controller 2150 shown in FIG. 1, 1 is set in the repeat flag 3022, and only the header information 3001 is output to the system controller 2150. When this data packet in which 1 is set in the repeat flag 3022 is input, the system controller 2150 processes the data packet by assuming that the image data 3002 and image additional information 3003 of the data packet are the same as the image data and image additional information of a data packet input immediately before that. In this manner, the data transfer amount between the system controller 2150 and an image processor 2149 is reduced.

A chip ID 3005 indicates the ID of a chip as a target of packet transmission. If a plurality of image processors 2149 and a plurality of system controllers 2150 are connected, this chip ID 3005 is used to output a data packet to a desired block by indicating the target of packet transmission.

An image type 32006 indicates the type of image data. In this embodiment, upper two bits of eight bits of this image type are used to define the type of image data as follows: "00b" represents one pixel by one bit; "01b" represents one pixel by one component of 8-bit data; "10b" represents one pixel by three components of 8-bit data, i.e., a total of 24 bits; and "11b" represents one pixel by four components of 8-bit data, i.e., a total of 32 bits.

A page ID 3007 indicates a page containing a data packet. A job ID 3008 stores a job ID for management by software.

A packet ID Y-coordinate 3009 and packet ID X-coordinate 3010 indicate the position of a data packet on a page. This allows the system controller 2150 to recognize the positional relationship between data packets regardless of the order of output from the image processor 2149.

A process instruction 3011 designates an operation mode for processing data in each unit of the image processor 2149. This process instruction 3011 is set in the order of processes by individual processing units for every eight bits from the left-hand side. After performing the process, each processing unit shifts the process instruction by eight bits to the left, and transfers this process instruction to the next processing unit. The process instruction 3011 stores eight pairs of unit IDs 3024 and modes 3025. The unit ID 3024 designates each processing unit. The mode 3025 designates the operation mode of each processing unit. Accordingly, image processing can be continuously performed through eight units by one packet.

A packet byte length 3012 indicates the total number of bytes of a packet. An image data byte length 3015 and Z data byte length 3016 represent the number of bytes of the image data 3002 and the number of bytes of the image additional information 3003, respectively. An image data offset 3013 and Z data offset 3014 represent an offset value from the start of each packet to a portion where data is stored. Note that the byte lengths of the image data 3002 and image additional information 3003 do not include the lengths of padding data.

Image data 3026 and Z data 3027 in compress flag 3017 indicate, by one bit, whether the image data 3002 and image additional data 3003, respectively, are compressed or uncompressed.

A Q-table ID 3028 in the compress flag 3017 stores information when image data is compressed. In this embodiment, as will be described later, image data is compressed by the JPEG system if the upper two bits of the image type 32006 are 01b, 10b, or 11b, i.e., if one pixel is expressed by a plurality of bits. Therefore, the Q-table ID 3028 stores information indicating the quantization table used in compression.

Tile compressors 2106 and tile expanders 2103 refer to a value stored in the Q table ID 3028 to perform compression and expansion, respectively, by using a corresponding quantization table.

A source ID 3018 indicates a source from which the image data 3002 and image additional information 3003 are generated. A misc 3019 stores other information. In this embodiment, a char-flag 3029 representing additional information of the whole data packet as auxiliary information of the image additional information 3003 and a Q-table sel 3030 for switching quantization tables for individual packets are prepared in the misc 3019.

A Z type 3020 indicates the effective bit width of the image additional information 3003. In this embodiment, the image additional information 3003 except for bits indicated by this Z type 3020 is invalid information.

An ignore flag 30222 is used as a trigger for performing re-encoding. When receiving a data packet in which this ignore flag 30222 is set, the system controller 2150 clears a RAM 2002 and starts acquiring image data (data packet).

Thumbnail data 3021 sores a value (thumbnail value) representing the image data of a data packet. In this embodiment, a maximum of four values can be contained for each component in this thumbnail data 3021.

A packet table will be described below with reference to FIG. 4. As described previously, FIG. 4 shows the state in which data packets are stored in the RAM 2002. Each data packet is managed by a packet table 6001. As components of this packet table 6001, a packet start address 6002 and packet byte length (packet length) 6005 are obtained by adding five bits of 0 to the value of the table. That is, Packet Address Pointer (27 bits)+5b00000=Packet Start Address, and Packet Length (11 bits)+5b00000=Packet Byte Length.

When one data packet is input, the packet start address 6002 is increased by the value of the byte length of the input packet to indicate the start address of the next packet. Note that the packet table 6001 and a chain table 6010 are not separated.

The packet table 6001 is always arranged in the scanning direction, i.e., in the order of $Y_n/X_n$=000/000, 000/001, 000/002, .... An entry of this packet table 6001 uniquely indicates one tile. Also, an entry next to $Y_n/X_{max}$ is $Y_{n+1}/X_0$. $Y_n$ and $X_n$ have the same values as the packet ID Y-coordinate 3009 and packet ID X-coordinate 3010, respectively, of the header information 3001.

When a packet in which the repeat flag 3002 in the header information 3001 is set is input, this packet is not written on the memory, and the same packet address pointer and packet length as those of an immediately preceding entry are stored in the entry of the packet table. That is, two table entries indicate one packet data. In this case, the repeat flag 6003 of the second table entry is set.

If a packet is divided into a plurality of portions by a chain DMA, a divide flag 6004 is set, and a chain table number 6006 of a chain block containing the start portion of this packet is set. An entry of the chain table 6010 is made up of a chain block address 6011 and chain block length 6012. 0 is stored as both the address and length in the last entry of the table.

Figure 34:
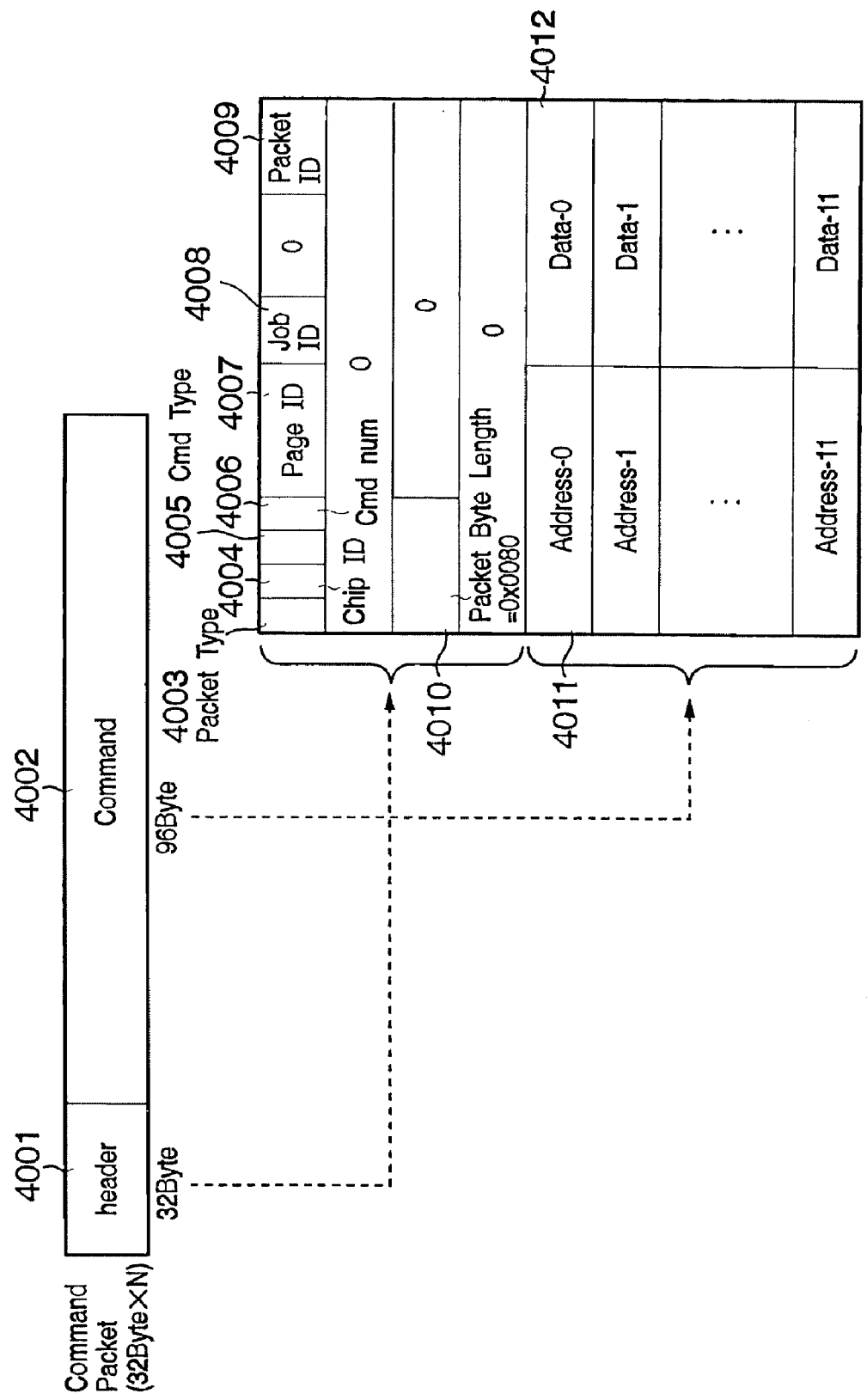
FIG. 34 is a view for explaining a command packet format.

FIG. 34 is a view for explaining a command packet format. This packet format is used to access a register setting bus 2109. By using this packet, a CPU 2001 can access an image memory 2123.

Referring to FIG. 34, a chip ID 4004 stores an ID indicating the image processor 2149 as the transmission destination of a command packet. A page ID 4007 and job ID 4008 store a page ID and job ID, respectively, for management by software. A packet ID 4009 is represented by one dimension. Only the X-coordinate of a data packet is used. A packet byte length 4010 is fixed to 128 bytes.

A packet data field (command) 4002 can store a maximum of 12 commands each of which is a pair of address 4011 and data 4012. The type of command, i.e., write or read, is indicated by a cmd type 4005. The number of commands is indicated by a cmd num 4006.

An interrupt packet format will be explained below with reference to FIG. 33. This packet format notifies an interrupt from the image processor 2149 to the CPU 2001. When transmitting this interrupt packet, a status processor 2105 cannot transmit another interrupt packet unless transmission is permitted next. A packet byte length 3306 is fixed to 128 bytes.

A packet data field (int data) 3302 stores status (module status) information 3307 of each internal module of the image processor 2149. The status processor 2105 can collect status information of the individual modules in the image processor 2149, and transmit the information to the system controller 2150 at once. As shown in FIG. 33, reference numeral 3301 denotes a header field, where information representing the packet byte length 3306 is stored. A packet type 3303 stores data representing an interrupt packet format.

A chip ID 3304 stores an ID representing the system controller 2150 as the transmission destination of the interrupt packet. An interrupt chip ID (int chip ID) 3305 stores an ID representing the image processor 2149 as the transmission destination of the interrupt packet.

Figure 35:
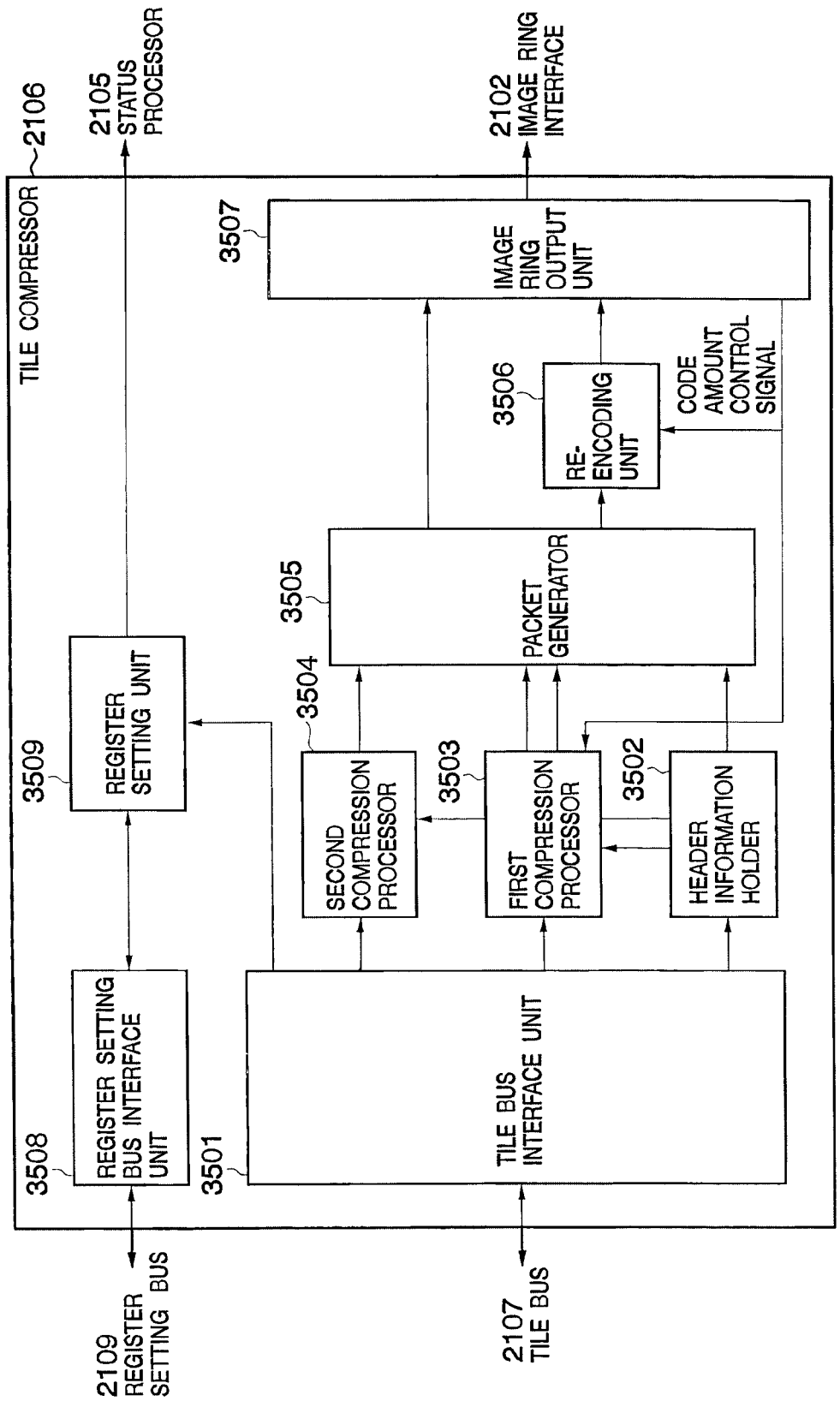
FIG. 35 is a block diagram showing details of the arrangement of a tile compressor 2106 according to the third embodiment.

FIG. 35 is a block diagram showing details of the arrangement of the tile compressor 2106 according to the third embodiment. Referring to FIG. 35, a tile bus interface unit 3501 performs handshake with a tile bus 2107 to receive input data packets from the tile bus 2107, and outputs the data to processing blocks connected after this tile bus interface unit 3501.

Also, the tile bus interface unit 3501 analyzes the header information 3001 supplied from the tile bus 2107. If the header information has a conflict, the tile bus interface unit 3501 outputs an interrupt signal to a register setting unit 3509 (to be described later), and stops the acquisition of data packets from the tile bus 2107 until a reset signal (not shown) is input.

If the header information 3001 has no conflict, the tile bus interface unit 3501 outputs the header information to a header information holder 3502, and acquires the image data 3002 and image additional information 3003 from the tile bus 2107. By referring to the image type 32006 of the header information, the image data 3002 and image additional information 3003 are output to a first compression processor 3503 (which performs compression by the JPEG system in this embodiment) or a second compression processor 3504 (which performs compression by a pack bits system in this embodiment).

More specifically, if the upper two bits of the image type in the header information are 00b (if the image data has one bit), this image data 3002 is output to the second compression processor 3504. In this case, the image additional information 3003 is discarded by the tile bus interface unit 3501. If the upper two bits of the image type are other than 00b, the image data 3002 is output to the first compression processor 3503, and the image additional information 3003 is output to the second compression processor 3504. However, if the Z type 3020 indicates the absence of image additional information, no image additional information 3003 is output to the second compression processor 3504, so this second compression processor 3504 performs no compression.

The header information holder 3502 holds the header information while the first and second compression processors 3503 and 3504 are compressing the image data 3002 and image additional information 3003, respectively. Also, from the stored header information, the header information holder 3502 outputs information necessary for compression to the first and second compression processors 3503 and 3504. In addition, the header information holder 3502 compares a predetermined portion of input header information from the tile bus interface unit 3501 with a predetermined portion of the header information of a data packet input immediately before that. The header information holder 3502 outputs the comparison result and the held header information to a packet generator 3505 (to be described later) in response to a request from this packet generator 3505.

The first compression processor 3503 compresses data by the JPEG system in this embodiment. This first compression processor 3503 compares input image data from the tile bus interface unit 3501 with the image data of a data packet input immediately before that. The first compression processor 3503 outputs the comparison result and the compressed encoded image data to the packet generator 3505 in response to a request from the packet generator 3505. Depending on the setting, the image data can also be output to the packet generator 3505 without being compressed by the first compression processor 3503.

In this embodiment, the first compression processor 3503 generates first image data to be output to the system controller 2150, and second image data to be re-encoded by a re-encoding unit 3506 (to be described later), and outputs the two encoded image data to the packet generator 3505.

In this embodiment, the second compression processor 3504 compresses data by a compression system having no information loss, more specifically, a pack bits system. Also, this second compression processor 3504 compares input image additional information from the tile bus interface unit 3501 with the image additional information of a data packet input immediately before that. The second compression processor 3504 outputs the comparison result and the compressed encoded image additional information to the packet generator 3505 in response to a request from the packet generator 3505.

In a special case, i.e., if the upper two bits of the image type 32006 in the header information are 00b (if mage data has one bit), this image data is compressed by the second compression processor 3504. Depending on the setting, the image additional information or image data can also be output to the packet generator 3505 without being compressed by the second compression processor 3504.

The packet generator 3505 acquires process information, image data, and image additional information from the header information holder 3502 and the first and second compression processors 3503 and 3504. After setting a predetermined value in the header information, the packet generator 3505 generates data packets shown in FIG. 32 and outputs the data packets to an image ring output unit 3507 and the re-encoding unit 3506.

The data packets which the packet generator 3505 outputs to the re-encoding unit 3506 and image ring output unit 3507 have the same header information and image additional information, i.e., these data packets are different only in image data. The packet generator 3505 generates a data packet by using the first image data generated by the first compression processor 3503, and outputs this data packet to the image ring output unit 3507. Likewise, the packet generator 3505 generates a data packet by using the second image data and outputs this data packet to the re-encoding unit 3506.

The re-encoding unit 3506 stores the data packet supplied from the packet generator 3505 into a memory. Also, when a request is issued from the image ring output unit 3507, the re-encoding unit 3506 supplies the data packet stored in the memory, recompresses image data contained in the data packet, and restores the recompressed image data into the memory.

The image ring output unit 3507 outputs the data packets supplied from the packet generator 3505 and re-encoding unit 3506 to the image ring interface 2102. Also, this image ring output unit 3507 adds the byte amounts of a data packet supplied to the RAM 2002 by refeffing to the header information of the data packet. If the sum exceeds a predetermined value, the image ring output unit 3507 sets the ignore flag 30222 in the header information 3001 of the data packet and outputs it to the system controller 2150. In addition, the image ring output unit 3507 outputs a code amount control signal to the re-encoding unit 3506 and first compression processor 3503.

The register setting unit 3509 performs various settings concerning internal processing of the tile compressors 2106. To cause the tile compressors 2106 to perform a predetermined compression process, a predetermined value must be set in this register setting unit 3509. These settings are supplied, by using the command packet shown in FIG. 34, from the system controller 2150 to a command processor 2104 of the image processor 2149, and from the command processor 2104 to the tile compressors 2106 via the register setting bus 2109.

The values set in the register setting unit 3509 are supplied to the first and second compression processors 3503 and 3504, and these compression processors perform predetermined processes by referring to these set values. Note that not only values can be set in the register setting unit 3509 by using the command packet, but also set values held in this register setting unit 3509 can be output to the system controller 2150.

Furthermore, the register setting unit 3509 has a register for storing header information. When an interrupt signal is input from the tile bus interface unit 3501, the register setting unit 3509 loads header information from the tile bus interface unit 3501 and sets this header information in the register. In addition, the register setting unit 3509 outputs an interrupt signal for notifying the occurrence of interrupt and a status signal representing the error state to the status processor 2105. A register setting bus interface unit 3508 converts formats between the register setting bus 2109 and register setting unit 3509.

Figure 36:
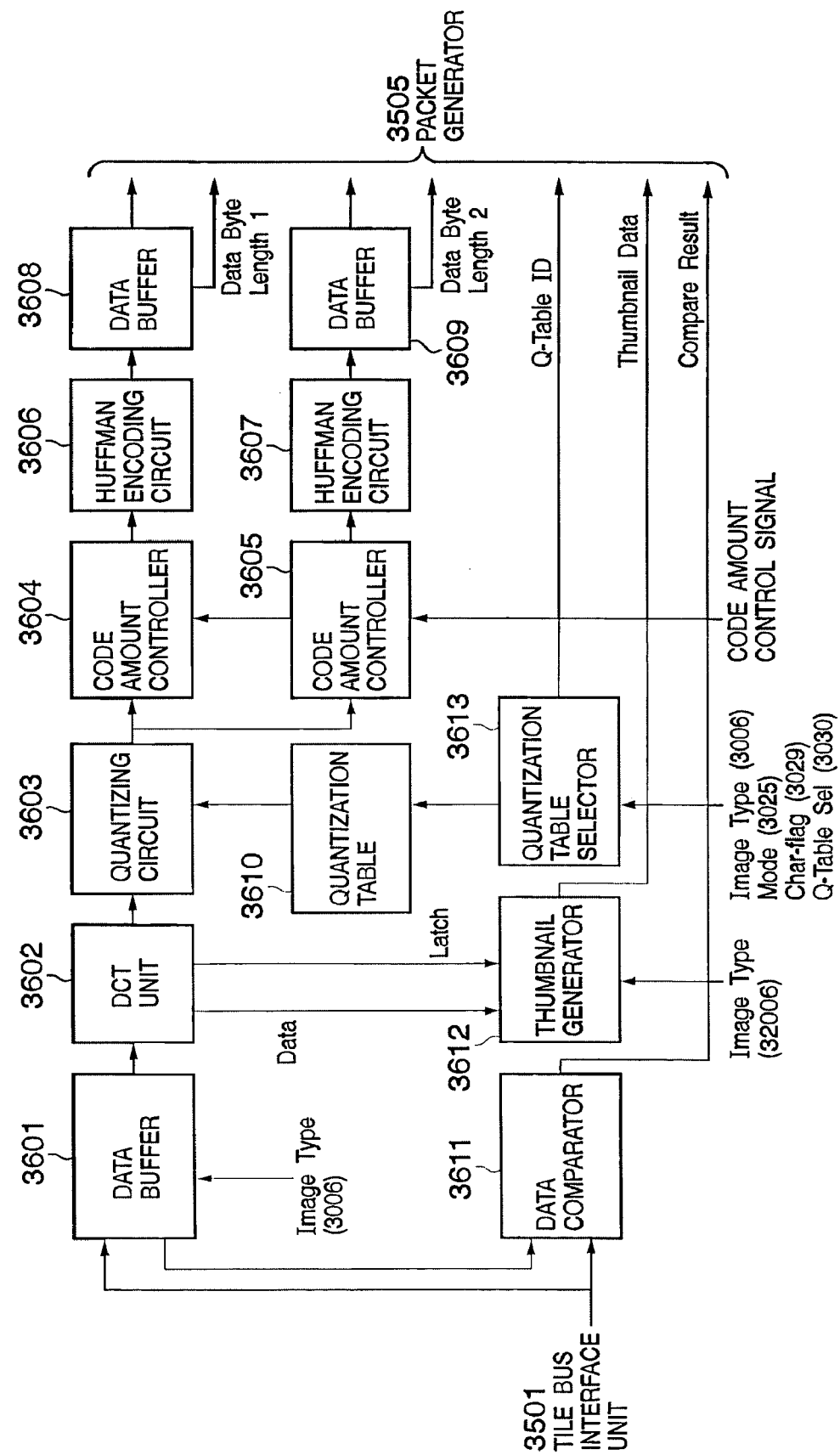
FIG. 36 is a block diagram showing details of the arrangement of a first compression processor 3503.

The first compression processor 3503 will be described in detail below. FIG. 36 is a block diagram showing details of the arrangement of this first compression processor 3503. Referring to FIG. 36, a data buffer 3601 stores image data supplied from the tile bus interface unit 3501. When a predetermined amount of data is supplied, this data buffer 3601 outputs the data in a predetermined order to a DCT unit 3602 connected to the output of the data buffer 3601.

Note that the image type 32006 of header information is input from the header information holder 3502 to the data buffer 3601, and the order of data output from the data buffer 3601 to the DCT unit 3602 is controlled by this image type.

When data is input from the data buffer 3601, the DCT unit 3602 performs discrete cosine transform to transform the data into frequency component data. Also, the DCT unit 3602 outputs the DC component value generated by the discrete cosine transform and a latch signal to a thumbnail generator 3612 (to be described later). The DCT unit 3602 outputs these latch signal and DC component value whenever performing discrete cosine transform in order to generate a thumbnail value (to be described later).

A quantizing circuit 3603 quantizes the output frequency component data from the DCT unit 3602 by using a predetermined quantization value. This value used in quantization is input from a quantization table (to be described later). This quantization table for use in quantization is determined by referring to header information.

Coding amount controllers 3604 and 3605 control the frequency component data quantized by the quantizing circuit 3603, so that the code amount reduces when encoding is performed by Huffman encoding circuits (to be described later). In this embodiment, the code amount is controlled by dividing the data input to the code amount controllers 3604 and 3605 by $2^n$ (n=0, 1, . . . ) Note that the value of n can be independently set by the register value of the register setting unit 3509 and the code amount control signal input from the image ring output unit 3507.

Huffman encoding circuits 3606 and 3607 perform predetermined encoding for the output data from the code amount controllers 3604 and 3605, respectively, thereby generating encoded data. Data buffers 3608 and 3609 store the data encoded by these Huffman encoding circuits 3606 and 3607, respectively. When inputting of the encoded data from the Huffman encoding circuit 3606 is complete, the data buffer 3608 outputs the encoded data amount as data byte length 1, and outputs the stored data in response to a request from the packet generator 3505.

Likewise, when inputting of the encoded data from the Huffman encoding circuit 3607 is complete, the data buffer 3609 outputs the encoded data amount as data byte length 2, and outputs the stored data in response to a request from the packet generator 3505.

A data comparator 3611 compares the input image data from the tile bus interface unit 3501 with the image data of a data packet input immediately before that. In this comparison, data remaining in the data buffer 3601 is used as the image data of the immediately preceding data packet.

When image data is input from the tile bus interface unit 3501, image data stored in that portion of the data buffer 3601, in which the input image data is to be stored, is read out and compared by the data comparator 3611. All image data is compared by performing this operation for all input image data. When completing comparison of image data of one packet, the data comparator 3611 outputs a comparison result (compare result) to the packet generator 3505.

A thumbnail generator 3612 generates a thumbnail value for each tile by using the DC component value output in synchronism with the latch signal from the DCT unit 3602, and outputs the thumbnail value to the packet generator 3505. The generated thumbnail value is output as thumbnail data to the packet generator 3505, and stored in a predetermined format into the thumbnail data 3021 of the header information.

A quantization table 3610 stores quantization values for performing quantization in the quantizing circuit 3603. The quantization table 3610 of this embodiment stores a plurality of quantization tables. This quantization table 3610 selects a predetermined quantization table in accordance with a selection signal input from a quantization table selector 3613 (to be described below), and outputs a quantization value to the quantizing circuit 3603.

The quantization table selector 3613 outputs a quantization selection signal to the quantization table 3610, thereby selecting a predetermined table from the plurality of tables stored in the quantization table 3610. To this quantization table selector 3613, the image type 32006 mode 3025, char-flag 3029, and Q-table sel 3030 are input from the header information holder 3502. The quantization table selector 3613 selects a quantization table to be used on the basis of these pieces of information.

When determining a quantization table to be used, the quantization table selector 3613 outputs a quantization table selection signal to the quantization table 3610 so as to select the predetermined quantization table. Also, the quantization table selector 3613 outputs a Q-table ID representing the selected quantization table to the packet generator 3505.

The data byte length 1, data byte length 2, Q-table ID, thumbnail data, and compare result explained above are referred to when the packet generator 3505 generates header information.

Figure 37:
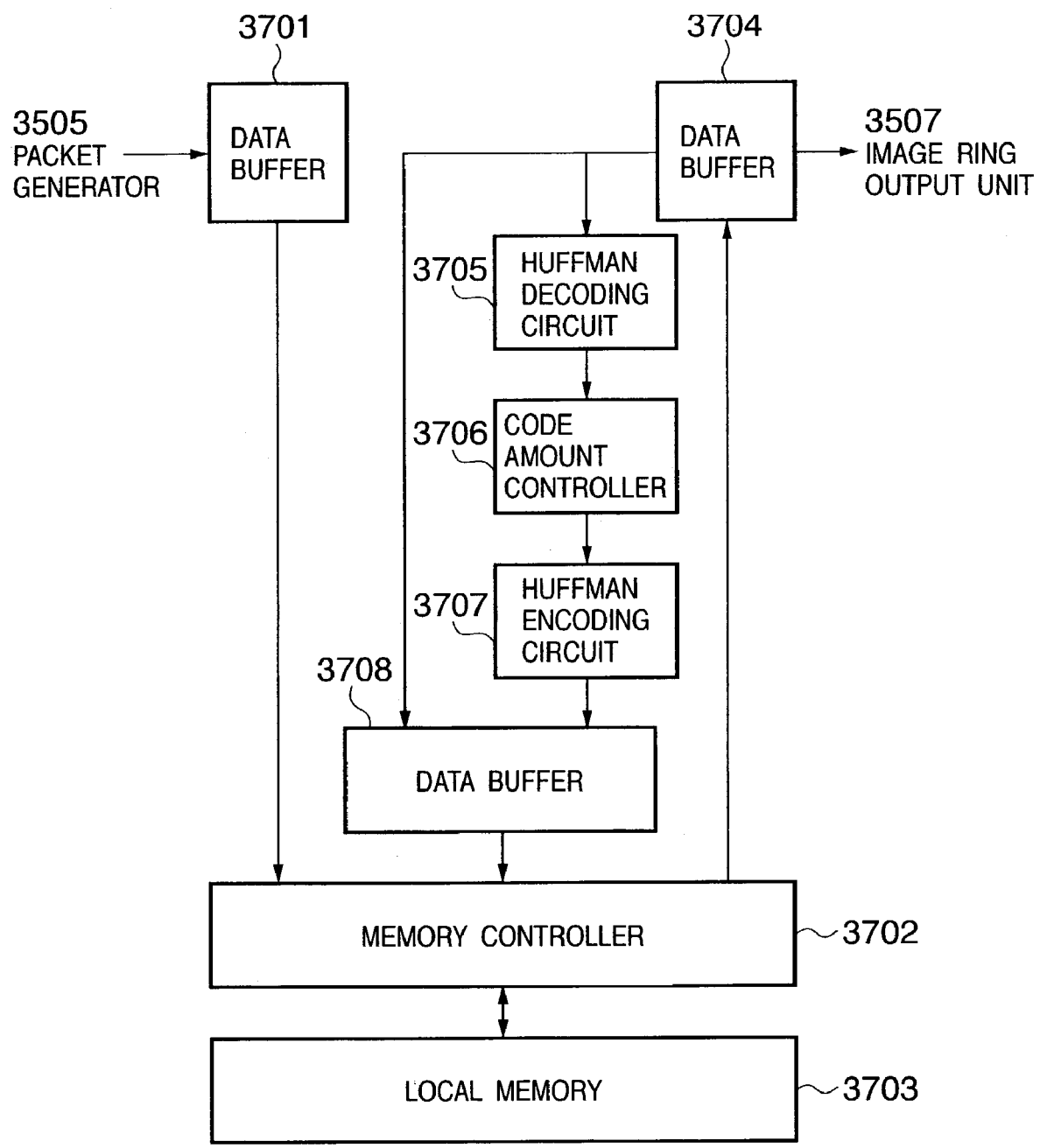
FIG. 37 is a block diagram showing details of the arrangement of a re-encoder 3506.

FIG. 37 is a block diagram showing details of the arrangement of the re-encoding unit 3506. Referring to FIG. 37, a data buffer 3701 temporarily stores a data packet supplied from the packet generator 3505, and has a capacity for one data packet. This data buffer 3701 stores packet data generated by using the encoded data stored in the data buffer 3609.

A data packet stored in the data buffer 3701 is output to a memory controller 3702 so as to be stored in a local memory of the re-encoding unit 3506. The memory controller 3702 controls read and write operations to the local memory. This memory controller 3702 is connected to the data buffer 3701 and data buffers 3704 and 3708 (to be described later). The memory controller 3702 performs read/write to a predetermined address of the local memory in accordance with a read/write request from each data buffer.

The input data packet from the packet generator 3505 is stored in a local memory 3703 of the re-encoding unit 3506 via the data buffer 3701 and memory controller 3702. In response to a request from the memory controller 3702, this local memory 3703 outputs the stored data to the data buffer 3704 via the memory controller 3702. In addition, data subjected to a re-encoding process (to be described later) is restored in the local memory 3703 via the memory controller 3702.

The data buffer 3704 outputs the data packet stored in the memory 3703 to the image ring output unit 3607 in response to a request from the image ring output unit 3607, and has a capacity of one data packet. The data packet stored in this data buffer 3704 is supplied to the image ring output unit 3607. The header information and image additional information are supplied to the data buffer 3708, and the encoded image data is supplied to a Huffman decoding circuit 3705 so as to be re-encoded.

The Huffman decoding circuit 3705 decodes the encoded image data supplied from the data buffer 3704 to generate quantized frequency component data, and supplies this quantized frequency component data to a code amount controller 3706.

The code amount controller 3706 controls the quantized frequency component data generated by the Huffman decoding circuit 3705, so as to reduce the code amount. In this embodiment, as in the code amount controllers 3604 and 3605 shown in FIG. 36, the code amount is controlled by dividing the input data to the code amount controller by $2^n$ (n=0, 1, . . . ) Note that the value of n can be set by a code amount control signal supplied from a register (not shown) or the image ring output unit 3507.

A Huffman encoding circuit 3707 performs a predetermined encoding process for the output data from the code amount controller 3706, thereby generating encoded data. In this embodiment, this Huffman encoding circuit 3707 performs an operation similar to those of the Huffman encoding circuits 3606 and 3607 shown in FIG. 36.

The data buffer 3708 has a capacity of one data packet. This data buffer 3708 acquires the header information and image additional information from the data buffer 3704, and the encoded image data from the Huffman encoding circuit 3707. After setting predetermined information in the header information, the data buffer 3708 generates a new data packet from the encoded image data and image additional information.

The thus generated data packet is stored in the memory 3703 via the memory controller 3702.

Figure 38:
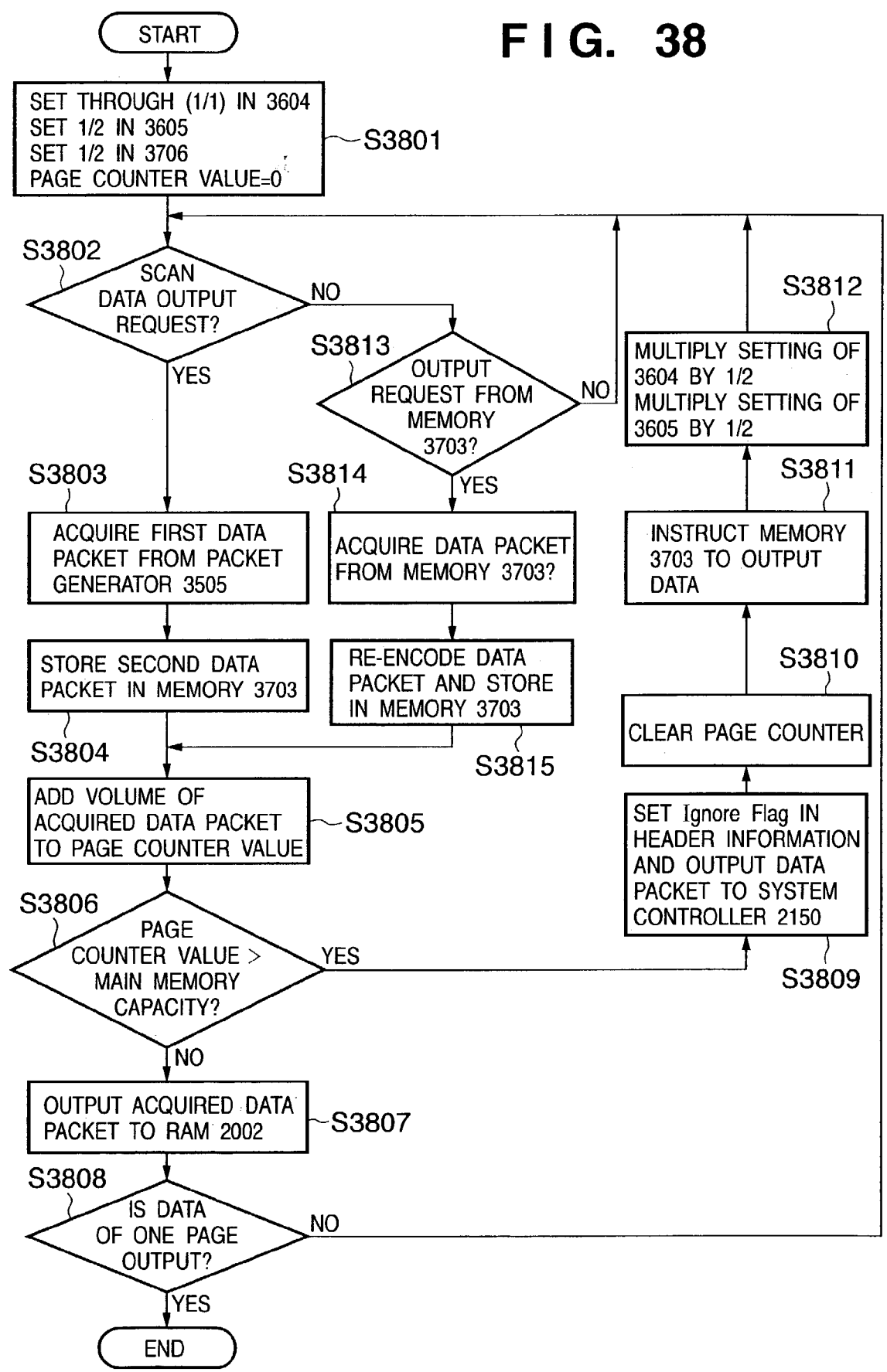
FIG. 38 is a flow chart for explaining the operation procedure of an image ring output unit 3507 in the embodiment.

FIG. 38 is a flow chart for explaining the operation procedure of the image ring output unit 3507 of this embodiment. For the sake of convenience, FIG. 38 shows the operation when scan data having a plurality of bits is input from a scanner 2070. However, similar processing can be performed if image data input to the tile compressors 2106 is a data packet having a plurality of bits. The operation will be described with reference to FIG. 38.

First, initialization is performed before the tile compressors 2106 receive a data packet. That is, n=0 (input data is output) is set in the code amount controller 3604, n=1 (input data is output after divided by 2) is set in the code amount controller 3605, and n=1 (the same as the code amount controller 3605) is set in the code amount controller 3706. Also, the value of an internal page counter of the image ring output unit 3507 is cleared to 0 (step S3801).

When a data packet of image data obtained by scanning an original is input from the scanner 2070 to the tile compressors 2106, the image data is supplied to the first image compression processor 3503. This image data is subjected to DCT and quantization, code amount control by the code amount controllers 3604 and 3605, and JPEG conversion by Huffman coding.

Since "through (1/1)" is set in the code amount controller 3604 in step S3801, the image data converted by JPEG through this code amount controller 3604 is first image encoded data generated by performing Huffman coding for data quantized by a quantization value set by the quantizing circuit 3603.

On the other hand, the code amount controller 3605 is so set as to output input data by ½ in step S3801. Therefore, the image data converted by JPEG through this code amount controller 3605 is second image encoded data generated by performing Huffman coding for data quantized by a value twice the quantization value set in the quantizing circuit. The volume of this second image encoded data is smaller than that of the first image encoded value, because the second image encoded data is quantized by a larger value.

When predetermined data is input from the header information unit 3502 and first and second compression processors 3503 and 3504, the packet generator 3505 generates, from these data, a first data packet using the first image encoded data and a second data packet using the second image encoded data. The packet generator 3505 then issues a data output request to the image ring output unit 3507.

The image ring output unit 3507 checks whether there is a data output request from the packet generator 3505 (step S3802). If a data output request is present (YES), the image ring output unit 3507 receives the first data packet from the packet generator 3505 (step S3803), and stores the second data packet in the local memory 3703 (step S3804).

The image ring output unit 3507 acquires the volume of the first data packet by referring to the header information of the first data packet, and adds this volume to the page counter (step S3805). After that, the image ring output unit 3507 compares the value of the page counter with the main memory capacity (the data packet storage capacity of the RAM 2002) (step S3806).

If the value of the page counter is equal to or smaller than the main memory capacity in step S3806 (NO), this main memory has an enough capacity to store the data packet acquired by the image ring output unit. Therefore, the data packet is output from the image ring output unit to the system controller 2150 and stored in the RAM 2002 (step S3807), and data transfer of one packet is complete.

When data transfer of one packet is thus complete, the image ring output unit checks whether data packets of one page are output (step S3808). If transfer of data packets of one page is complete (YES), the operation is terminated. If this data packet transfer has not been complete yet (NO), the flow returns to step S3802 to repeat the operation from step S3802 to step S3807 described above.

If the value of the page counter is larger than the main memory capacity in step S3806, this main memory cannot store data packets of one page. Hence, data having a high compression ratio and a small data volume must be restored in the main memory from the beginning of the page. To this end, the image ring output unit 3507 first sets the ignore flag 30222 in the header information of a data packet acquired from the packet generator 3505, and outputs this data packet to the system controller 2150 to clear the main memory (step S3809). In addition, the page counter value is cleared to 0 (step S3810).

When the system controller 2150 receives the data packet in which the ignore flag is set, a RAM controller 2124 clears the RAM 2002 (more specifically, data packets stored in this RAM 2002 up to the point are nullified by clearing the packet address pointer shown in FIG. 4 to 0).

When the main memory and page counter are cleared, the image ring output unit 3507 instructs the local memory 3703 to output the stored data packets (step S3811). Accordingly, the local memory 3703 keeps issuing an output request to the image ring output unit 3507 until all the data packets stored in this local memory 3703 so far are completely output to the image ring output unit 3507.

Also, the image ring output unit 3507 outputs a code amount control signal to the code amount controllers 3604 and 3605 to control the code amount. When receiving the code amount control signal from the image ring output unit 3507, the code amount controllers 3604 and 3605 set their values of division to values ½ the respective previous values (step S3812). Consequently, the output frequency component data from the DCT unit 3602 is quantized by a value twice the previous value before Huffman coding.

The value newly set in the code amount controller 3604 in step S3811 is the value previously set in the code amount controller 3605. Accordingly, a data packet output from the Huffman encoding circuit 3606 to the main memory via the packet generator 3505 and image ring output unit 3507 after step S3811 and a data packet output from the Huffman encoding circuit 3607 to the local memory 3703 via the packet generator 3505 before step S3811 are image data quantized by the same quantization value.

When the set values of the code amount controllers 3604 and 3605 are changed in step S3812, the flow returns to step S3802, and the image ring output unit 3507 checks whether there is a scan data output request from the packet generator 3505. If this scan data output request is present (YES), scan data is reacquired and a data packet is stored in the main memory and the local memory 3703 in steps S3803 to S3805.

If there is no scan data output request from the packet generator 3505 in step S3802 (NO), the flow advances to step S3813. If an output request is issued from the local memory 3703, a data packet is acquired from this local memory 3703 (step S3814). In addition, image data of the acquired data packet is re-encoded by the Huffman decoding circuit 3705, code amount controller 3706, and Huffman encoding circuit 3707, thereby generating a data packet and storing this data packet in the local memory 3703 (step S3815). If there is no output request from the local memory in step S3813 (NO), the flow returns to step S3802 to redetect a scan data output request.

FIGS. 39 to 42 are views for explaining the flow of image data in the tile compressor according to this embodiment. Note that FIGS. 39 to 42 illustrate only main portions.

Figure 39:
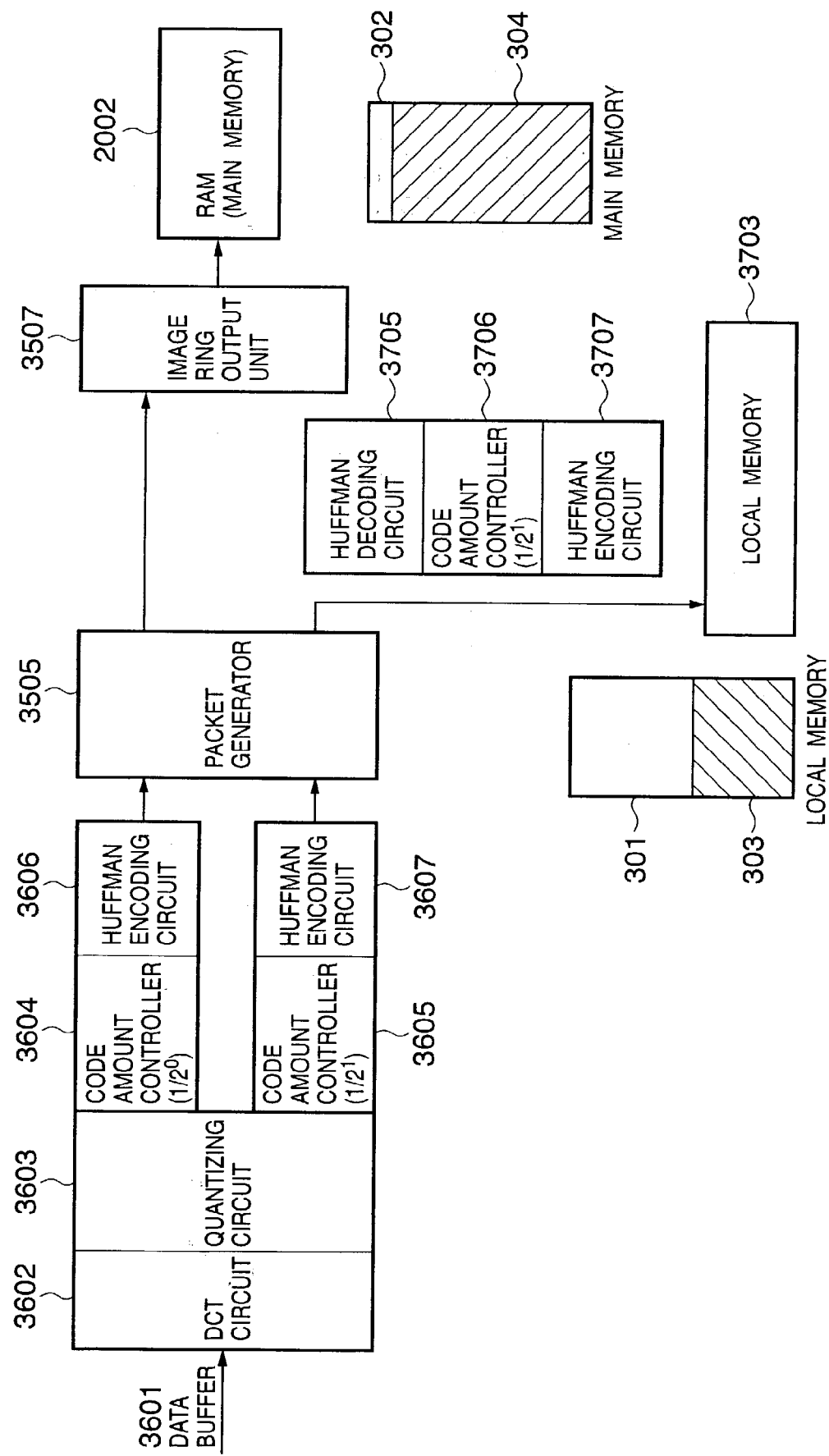
FIG. 39 is a view showing the state before a page counter value exceeds a main memory capacity after a scan operation is started.

FIG. 39 is a view showing the state before the page counter value exceeds the main memory capacity after a scan operation is started. Referring to FIG. 39, the code amount controllers 3604 and 3605 operate by the values set in step S3801. Accordingly, encoded image data quantized by the quantizing circuit 3603 is stored in the main memory 2002. Also, encoded image data quantized by the quantizing circuit 3603 and further reduced to ½ (quantized by a value twice the value set in the quantizing circuit 3606) is stored in the local memory 3703.

In FIG. 39, reference numeral 301 denotes the interior of the local memory 3703; and 302, the interior of the RAM 2002. Encoded image data 304 quantized by the quantizing circuit 3603 is stored in the main memory. Encoded image data 303 quantized by the value twice the value set in the quantizing circuit 3603 is stored in the local memory.

Figure 40:
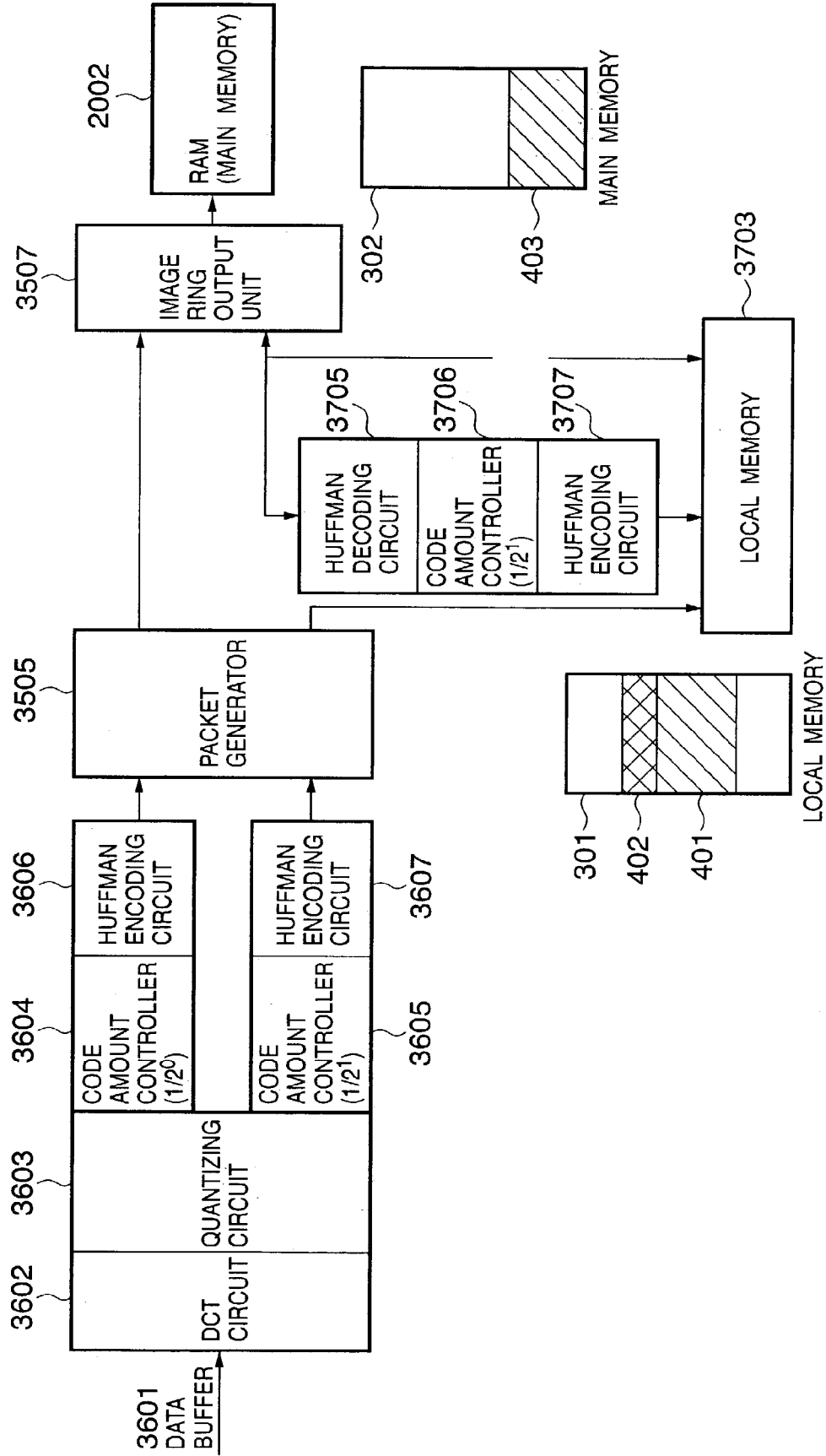
FIG. 40 is a view showing the state after the page counter value exceeds the main memory capacity in step S3806.

FIG. 40 is a view showing the state after the page counter value exceeds the main memory capacity in step S3806. In step S3812, ½ is set in the code amount controller 3604, and ¼ is set in the code amount controller 3605. Encoded image data quantized by the value twice the value set in the quantizing circuit 3603 is stored in the main memory 2002. Image data quantized by the quantizing circuit 3603 and then reduced to ¼ (quantized by a value four times the value set in the quantizing circuit 3603) is stored in the local memory 3703.

Also, the local memory 3703 outputs image data stored up to the point (quantized by the value twice the value set in the quantizing circuit 3603) to the main memory 2002. In addition, the Huffman decoding circuit 3705, code amount controller 3706 (set to ½ in step S3801), and Huffman encoding circuit 3707 generate encoded image data quantized by the value four times the value set in the quantizing circuit 3603. This encoded image data is stored in the local memory 3703.

By the above operation, the local memory 3703 stores, as indicated by reference numeral 301, encoded image data 401 which is quantized by the value twice the value set in the quantizing circuit 3603 and to be output to the main memory, and encoded image data 402 which is generated by the Huffman encoding circuits 3607 and 3707 and quantized by the value four times the value set in the quantizing circuit 3603. Also, as indicated by reference numeral 302, the main memory 2002 stores the encoded image data which is quantized by the value twice the value set in the quantizing circuit 3603 and stored in the local memory 3703, and encoded image data 403 which is generated by the Huffman encoding circuit 3606 and quantized by the value twice the value set in the quantizing circuit 3603.

As the image data stored in the main memory 2002 in FIG. 40, the output image data from the local memory 3703 and the input scan data from the packet generator 3505 are stored in no special order. Also, as the image data quantized by the value four times the value set in the quantizing circuit 3603 and stored in the local memory 3703, the output image data from the Huffman encoding circuit 3607 and the output image data from the Huffman encoding circuit 3707 are stored in no special order. The positions of these images on the original and the printing order of the images are managed by the packet IDs 3009 and 3010 of the header information 3001.

Figure 41:
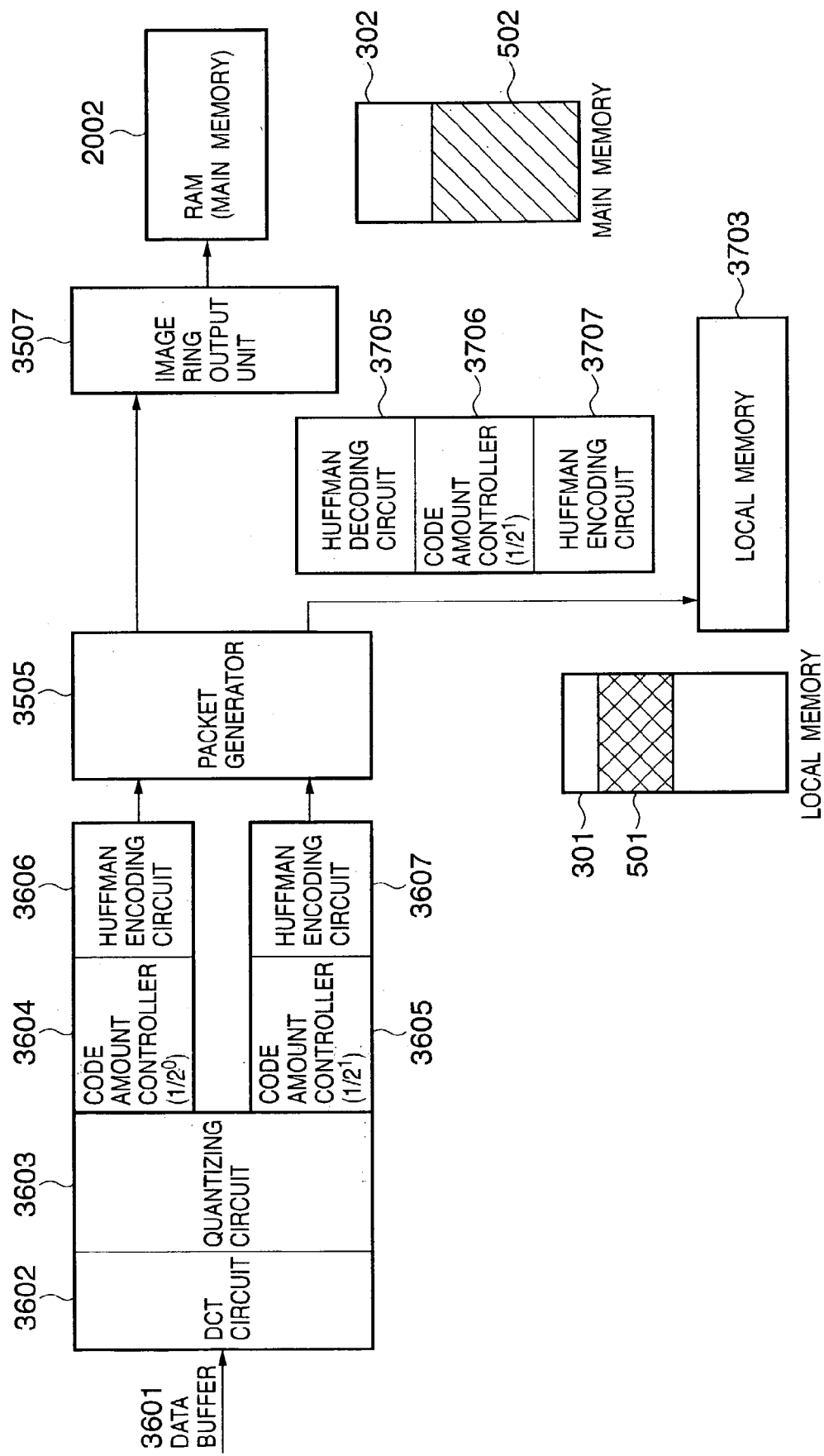
FIG. 41 is a view showing the state after encoded image data which is quantized by a value twice a value set in a quantizing circuit 3603 is entirely stored from a local memory into a main memory 2002 in FIG. 40.

FIG. 41 is a view showing the state after all the encoded image data quantized by the value twice the value set in the quantizing circuit 3603 is stored from the local memory into the main memory 2002 in FIG. 40. In FIG. 41, no image data is transferred from the local memory to the main memory, and the Huffman decoding circuit 3705, code amount controller 3706, and Huffman encoding circuit 3707 stop operating. Encoded image data 502 quantized by the value twice the value set in the quantizing circuit is stored in the main memory. Encoded image data 501 quantized by the value four times the value set in the quantizing circuit is stored in the local memory.

Figure 42:
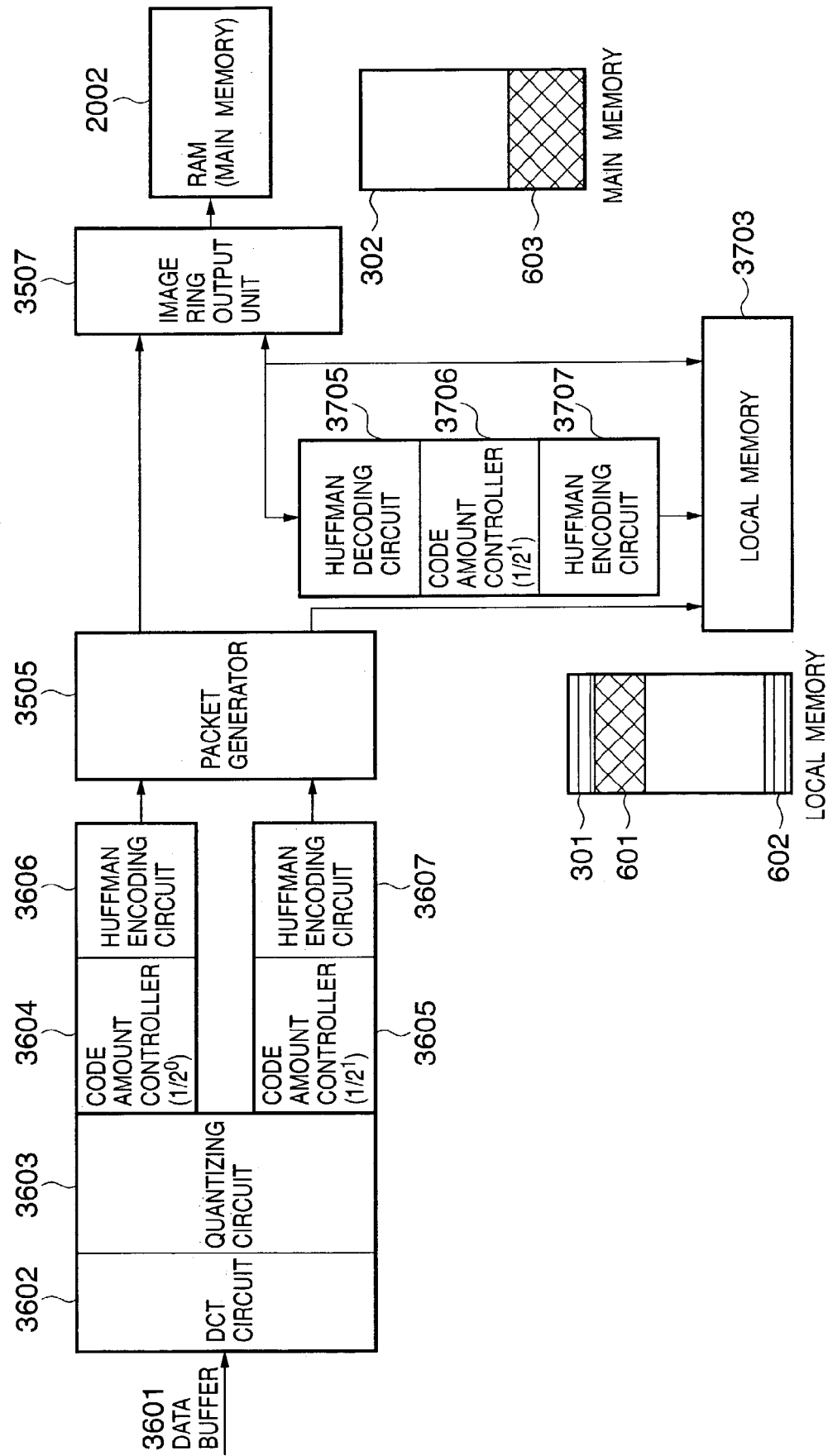
FIG. 42 is a view showing the state after the page counter value exceeds the main memory capacity again in step S3806 from the state shown in FIG. 41.

FIG. 42 is a view showing the state in which the page counter value exceeds the main memory capacity again in step S3806 from the state shown in FIG. 41. ¼ and ⅛ are set in the code amount controllers 3604 and 3605, respectively, in step S3812. Encoded image data quantized by the value four times the value set in the quantizing circuit 3603 is stored in the main memory 2002. Encoded image data quantized by a value eight times the value set in the quantizing circuit 3603 is stored in the local memory 3703.

At the same time, the local memory 3703 outputs the image data stored up to the point to the main memory 2002. In addition, the Huffman decoding circuit 3705, code amount controller 3706, and Huffman encoding circuit 3707 generate encoded image data quantized by the value eight times the value set in the quantizing circuit 3603. This encoded image data is stored in the local memory 3703. By the above operation, the local memory 3703 stores, as indicated by reference numeral 301, encoded image data 601 which is quantized by the value four times the value set in the quantizing circuit 3603 and to be output to the main memory, and encoded image data 602 which is generated by the Huffman encoding circuits 3607 and 3707 and quantized by the value eight times the value set in the quantizing circuit 3603. Also, as indicated by reference numeral 302, the main memory 2002 stores the encoded image data which is quantized by the value four times the value set in the quantizing circuit 3603 and stored in the local memory 3703, and encoded image data 603 which is generated by the Huffman encoding circuit 3606 and quantized by the value four times the value set in the quantizing circuit 3603.

By repeating the above operation until inputting of data from the scanner is complete, images can be stored in the main memory at an optimal compression ratio by which the data is storable in the main memory.

As described above, the image processing apparatus according to the present invention is comprising an input means for inputting packeted image data, a dividing means for dividing the input image data into predetermined blocks, a first compressing means for compressing the image data at a first compression ratio for each divided block, a first storage means for storing the image data compressed at the first compression ratio for each block, a second compressing means for compressing the image data at a second compression ratio for each divided block, a second storage means for storing the image data compressed at the second compression ratio for each block, a measuring means for measuring the data amount of the image data compressed at the first compression ratio, a data discarding means for discarding the image data stored in the first storage means if the data amount of the image data compressed at the first compression ratio is equal to or larger than a predetermined value, and an image data transfer means for storing the image data stored in the second storage means into the first storage means, wherein the first compressing means keeps compressing the image data at the second compression ratio, and the second compressing means compresses the image data at a third compression ratio higher than the second compression ratio for each divided block.

The image processing apparatus according to the present invention is wherein the input means is an image reading means for optically reading an original. The image processing apparatus according to the present invention is wherein the first compressing means performs compression by a JPEG system. The image processing apparatus according to the present invention is wherein one of the first and second compressing means freely changes the compression ratio.

The image processing apparatus according to the present invention is wherein if the data amount of the image data stored in the first storage means reaches the storage capacity of the first storage means, the data discarding means discards the stored image data.

In the above explanation, code amount control is performed by dividing input data by a predetermined value by the code amount controller. However, the data volume is reduced by the Huffman encoding circuit connected after this code amount controller. That is, the compression ratio improves when JPEG compression is performed, so the operation of the code amount controller is not restricted.

Also, in the above explanation, the JPEG system is used as an image data compression method. However, the present invention is not limited to this JPEG compression system. That is, image data can be compressed by the pack bits system or another compression method as long as the compression ratio can be changed by setting.

Furthermore, in the above explanation, the compression ratio at which data is stored in the main memory 2002 is changed by comparing the page counter value with the main memory capacity. However, the page counter value can also be compared with another value. In addition, the compression ratio can be changed in accordance with the ratio of loaded image data to all image data to be loaded.

From the foregoing, two image data having different compression ratios are held, and, if one image data exceeds a predetermined value, compression is performed by changing the set compression ratio. In this manner, the image data can be stored in a memory at an optimal compression ratio. It is also possible to perform the above operation and store the image data in the main memory without transmitting the same data from the scanner or network a plurality of number of times.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a recoding medium (or storage medium) recording program codes of software for implementing the functions of the above embodiments to a system or apparatus, and reading out and executing the program codes stored in the storage medium by a computer (or a CPU or MPU) of the system or apparatus. In this case, the program codes read out from the recording medium implement the functions of the present invention, and the recording medium recording these program codes constitutes the invention. Also, besides the functions of the above embodiments are implemented by executing the readout program codes by the computer, the present invention includes a case where an operating system (OS) or the like running on the computer performs part or the whole of actual processing in accordance with designations by the program codes and thereby implements the functions of the above embodiments.

Furthermore, the present invention also includes a case where the program codes read out from the recording medium are written in a memory of a function expansion card inserted into the computer or of a function expansion unit connected to the computer, and, in accordance with designations by the program codes, a CPU or the like of the function expansion card or function expansion unit performs part or the whole of actual processing and thereby implements the functions of the above embodiments.

When the present invention is applied to the recording medium described above, this recording medium stores program codes corresponding to the flow chart explained earlier.

In the present invention as has been explained above, image data can be processed as packet data and compressed in real time to a data amount within the storage capacity of a memory.

The present invention is not limited to the above embodiments and various changes and modifications can be made within the spirit and scope of the present invention. Therefore, to apprise the public of the scope of the present invention the following claims are made.

What is claimed is:

1. An image processing method executed by an image processing apparatus having a first memory and a second memory, comprising:
   an input step of inputting, for each tile of an image, packet data including an image data and header data;
   an extraction step of extracting the image data from the packet data input in the input step;
   a first compression step of compressing the extracted image data at a first compression ratio to generate first compressed data, and storing the generated first compressed data into the first memory;
   a first updating step of extracting the header data from the packet data input in the input step, and updating the extracted header data based on the compression processing executed in the first compression step;
   a step of, if a data size of the first compressed data is equal to or less than a predetermined value, generating a first packet data by combining the updated header data and the first compressed data;
   a step of storing the generated first packet data into the second memory;
   a second compression step of, if the data size of the first compressed data is not less than the predetermined value, recompressing the first compressed data stored in the first memory at a second compression ratio, which is higher ratio than the first compression ratio, to generate second compressed data;
   a second updating step of extracting the header data from the packet data input in the input step, and updating the extracted header data based on the recompression processing executed in the second compression step;
   a step of, if the data size of the second compressed data is equal to or less than the predetermined value, generating a second packet data by combining the header data updated in the second updating step and the second compressed data;
   a step of storing the generated second packet data into the second memory; and
   a step of, instead of the packet data input in the input step, outputting data, which is the first packet data or the second packet data, stored in the second memory.

2. The method according to claim 1, wherein the second compression step comprises:
   a decoding step of decoding the first compressed image data;
   a bit shifting step of shifting a bit string of the decoded image data by a predetermined number of bits; and
   a second encoding step of encoding the data having the bit-shifted bit string.

3. The method according to claim 1, wherein the first compression step comprises:

a frequency conversion step of converting a frequency of the extracted image data and calculating a conversion coefficient;
a quantization step of quantizing the calculated conversion coefficient by using a predetermined quantization table; and
a first encoding step of encoding the quantized conversion coefficient.

4. The method according to claim 1, wherein the image data included in the input packet is 8×8-pixel blocks.

5. The method according to claim 3, wherein the frequency conversion is discrete cosine transform.

6. The method according to claim 3, wherein in the first encoding step, Huffman encoding is performed.

7. The method according to claim 1, wherein in the first compression step, JPEG compression is performed.

8. The method according to claim 1, wherein if the data size of the first compressed data is not less than the predetermined value, the first compressed data stored in the first memory is discarded after the recompression processing executed in the second compression step.

9. The method according to claim 1, wherein the first updating step comprises:
an analyzing step of analyzing the header data; and
a changing step of changing the header to a new header on the basis of the result of analysis, if the data size of the first compressed data is equal to or less than the predetermined value.

10. An image processing method executed by an image processing apparatus having a first memory and a second memory, comprising:
an input step of inputting, for each tile of an image, packet data including image data and header data;
an extraction step of extracting the image data from the packet data input in the inputting step;
a first compression step of compressing the extracted image data at a first compression ratio to generate first compressed data, and storing the generated first compressed data into the first memory;
a first updating step of extracting the header data from the packet data input in the input step, and updating the extracted header data based on the compression processing executed in the first compression step;
a step of, if a data size of the first compressed data is equal to or less than a predetermined value, generating first packet data by combining the updated header data and the first compressed data;
a step of storing the generated first packet data into the second memory;
a second compression step of, if the data size of the first compressed data is not less than the predetermined value, recompressing the first compressed data stored in the first memory at a second compression ratio, which is a higher ratio than the first compression ratio, to generate second compressed data;
a second updating step of extracting the header data from the packet data input in the input step, and updating the extracted header data based on the recompression processing executed in the second compression step;
a step of, if the data size of the second compressed data is equal to or less than the predetermined value, generating second packet data by combining the header data updated in the second updating step and the second compressed data;
a step of storing the generated second packet data into the second memory; and a step of, instead of the packet data input in the input step, outputting data, which is the first packet data or the second packet data, stored in the second memory, and
wherein the second compression step comprises:
a decoding step of decoding the first compressed data;
an inverse quantization step of inversely quantizing the decoded data at the second compression ratio;
a quantization step of quantizing the inversely quantized data by using a predetermined quantization table; and
an encoding step of encoding the data quantized in the quantization step.

11. The method according to claim 10, wherein the first compression step comprises:
a frequency conversion step of converting a frequency of the extracted image data and calculating a conversion coefficient;
a quantization step of quantizing the calculated conversion coefficient by using the predetermined quantization table; and
a first encoding step of encoding the quantized conversion coefficient.

12. The method according to claim 10, wherein the image data included in the input packet is 8×8-pixel blocks.

13. The method according to claim 11, wherein the frequency conversion is discrete cosine transform.

14. The method according to claim 11, wherein in the first encoding step, Huffman encoding is performed.

15. The method according to claim 10, wherein in the first compression step, JPEG compression is performed.

16. The method according to claim 10, wherein if the data size of the first compressed data is not less than the predetermined value, the first compressed data stored in the first memory is discarded after the recompression processing executed in the second compression step.

17. The method according to claim 10, wherein the first updating step comprises:
an analyzing step of analyzing the header data; and
a changing step of changing the header to a new header on the basis of the result of analysis, if the data size of the first compressed data is equal to or less than the predetermined value.

18. An image processing apparatus having a first memory and a second memory, comprising:
input means for inputting, for each tile of an image, packet data including image data and header data;
extraction means for extracting the image data from the packet data input by the input means;
first compressing means for compressing the extracted image data at a first compression ratio to generate first compressed data, and storing the generated first compressed data into the first memory;
first updating means for extracting the header data from the packet data input by the input means, and updating the extracted header data based on the compression processing executed by the first compression means;
first packet generating means for, if a data size of the first compressed data is equal to or less than a predetermined value, generating a first packet data by combining the updated header data and the first compressed data, and storing the generated first packet data into the second memory;
second compression means for, if the data size of the first compressed data is not less than the predetermined value, recompressing the first compressed data stored in the first memory at a second compression ratio, which is a higher ratio than the first compression ratio, to generate second compressed data;

second updating means for extracting the header data from the packet data input by the input means, and updating the extracted header data based on the recompression processing executed by the second compression means;

second packet generating means for, if the data size of the second compressed data is equal to or less than the predetermined value, generating a second packet data by combining the header data updated by the second updating means and the second compressed data, and storing the generated second packet data into the second memory; and output means for, instead of the packet data input by the input means, outputting data, which is the first packet data or the second packet data, stored in the second memory.

19. A computer-readable storage medium on which is stored a computer executable program for controlling an image processing apparatus having a first memory and a second memory, the program comprising:

an input step of inputting, for each tile of an image, packet data including an image data and header data;

an extraction step of extracting the image data from the packet data input in the input step;

a first compression step of compressing the extracted image data at a first compression ratio to generate first compressed data, and storing the generated first compressed data into the first memory;

a first updating step of extracting the header data from the packet data input in the input step, and updating the extracted header data based on the compression processing executed in the first compression step;

a step of, if a data size of the first compressed data is equal to or less than a predetermined value, generating a first packet data by combining the updated header data and the first compressed data;

a step of storing the generated first packet data into the second memory;

a second compression step of, if the data size of the first compressed data is not less than the predetermined value, recompressing the first compressed data stored in the first memory at a second compression ratio, which is higher than the first compression ratio, to generate second compressed data;

a second updating step of extracting the header data from the packet data input in the input step, and updating the extracted header data based on the recompression processing executed in the second compression step;

a step of, if the data size of the second compressed data is equal to or less than the predetermined value, generating a second packet data by combining the header data updated in the second updating step and the second compressed data;

a step of storing the generated second packet data into the second memory; and a step of, instead of the packet data input in the input step, outputting data, which is the first packet data or the second packet data, stored in the second memory.

20. An image processing apparatus having a first memory and a second memory, comprising:

input means for inputting, for each tile of an image, packet data including image data and header data;

extraction means for extracting the image data from the packet data input by the input means;

first compression means for compressing the extracted image data at a first compression ratio to generate first compressed data, and storing the generated first compressed data into the first memory;

first updating means for extracting the header data from the packet data input by the input means, and updating the extracted header data based on the compression processing executed by the first compression means;

first packet generating means for, if a data size of the first compressed data is equal to or less than a predetermined value, generating first packet data by combining the updated header data and the first compressed data, and storing the generated first packet data into the second memory;

second compression means for, if the data size of the first compressed data is not less than the predetermined value, recompressing the first compressed data stored in the first memory at a second compression ratio, which is a higher ratio than the first compression ratio, to generate second compressed data;

second updating means for extracting the header data from the packet data input by the input means, and updating the extracted header data based on the recompression processing executed by the second compression means;

second packet generating means for, if the data size of the second compressed data is equal to or less than the predetermined value, generating second packet data by combining the header data updated by the second updating means and the second compressed data, and storing the generated second packet data into the second memory; and output means for, instead of the packet data input in the input step, outputting data, which is the first packet data or the second packet data, stored in the second memory, and wherein the second compression means comprises:

decoding means for decoding the first compressed data;

inverse quantization means for inversely quantizing the decoded data at the second compression ratio;

quantization means for quantizing the inversely quantized data by using a predetermined quantization table; and encoding means for encoding the data quantized by the quantization means.

21. A computer readable storage medium on which is stored a computer executable program for controlling an image processing apparatus having a first memory and a second memory, the program comprising:

an input step of inputting, for each tile of an image, packet data including image data and header data;

an extraction step of extracting the image data from the packet data input in the inputting step;

a first compression step of compressing the extracted image data at a first compression ratio to generate first compressed data, and storing the generated first compressed data into the first memory;

a first updating step of extracting the header data from the packet data input in the input step, and updating the extracted header data based on the compression processing executed in the first compression step;

a step of, if a data size of the first compressed data is equal to or less than a predetermined value, generating first packet data by combining the updated header data and the first compressed data;

a step of storing the generated first packet data into the second memory;

a second compression step of, if the data size of the first compressed data is not less than the predetermined value, recompressing the first compressed data stored in the first memory at a second compression ratio, which is a higher ratio than the first compression ratio, to generate second compressed data;

a second updating step of extracting the header data from the packet data input in the input step, and updating the extracted header data based on the recompression processing executed in the second compression step;

a step of, if the data size of the second compressed data is equal to or less than the predetermined value, generating second packet data by combining the header data updated in the second updating step and the second compressed data;

a step of storing the generated second packet data into the second memory; and a step of, instead of the packet data input in the input step, outputting data, which is the first packet data or the second packet data, stored in the second memory, and wherein the second compression step comprises:

a decoding step of decoding the first compressed data;

an inverse quantization step of inversely quantizing the decoded data at the second compression ratio;

a quantization step of quantizing the inversely quantized data by using a predetermined quantization table; and an encoding step of encoding the data quantized in the quantization step.

* * * * *